(12) United States Patent
Kuramoto et al.

(10) Patent No.: US 11,907,341 B2
(45) Date of Patent: Feb. 20, 2024

(54) DIAGNOSTIC ASSISTANCE SYSTEM AND METHOD THEREFOR

(71) Applicant: SkymatiX, Inc., Tokyo (JP)

(72) Inventors: Yasutaka Kuramoto, Tokyo (JP); Zentaro Watanabe, Tokyo (JP); Masaki Enomoto, Tokyo (JP); Houari Sabirin, Tokyo (JP)

(73) Assignee: SkymatiX, Inc., Tokyo (JP)

( * ) Notice: Subject to any disclaimer, the term of this patent is extended or adjusted under 35 U.S.C. 154(b) by 434 days.

(21) Appl. No.: 17/283,504

(22) PCT Filed: Oct. 9, 2019

(86) PCT No.: PCT/JP2019/039905
§ 371 (c)(1),
(2) Date: Apr. 7, 2021

(87) PCT Pub. No.: WO2020/075782
PCT Pub. Date: Apr. 16, 2020

(65) Prior Publication Data
US 2021/0397888 A1    Dec. 23, 2021

(30) Foreign Application Priority Data
Oct. 9, 2018    (JP) .................................. 2018-190610

(51) Int. Cl.
*G06K 9/00* (2022.01)
*G06F 18/40* (2023.01)
(Continued)

(52) U.S. Cl.
CPC ............ *G06F 18/41* (2023.01); *G06T 7/0002* (2013.01); *G06V 20/188* (2022.01);
(Continued)

(58) Field of Classification Search
CPC ..... G06F 18/41; G06V 20/188; G06T 7/0002; G06T 2207/10032; G06T 2207/20081; G06T 2207/30188; G08G 5/0034
(Continued)

(56) References Cited

U.S. PATENT DOCUMENTS

| 2010/0322489 A1 | 12/2010 | Tizhoosh et al. |
| 2014/0292814 A1 | 10/2014 | Tsujimoto et al. |

(Continued)

FOREIGN PATENT DOCUMENTS

| CN | 103631788 A | 3/2014 |
| CN | 103767691 A | 5/2014 |

(Continued)

OTHER PUBLICATIONS

Barrington, Luke, et al. "Crowdsourcing earthquake damage assessment using remote sensing imagery." Annals of Geophysics 54.6 (2011). (Year: 2011).*

(Continued)

*Primary Examiner* — Jonathan S Lee
(74) *Attorney, Agent, or Firm* — Procopio, Cory, Hargreaves & Savitch LLP

(57) ABSTRACT

The present invention makes an efficient diagnosis of an object. A general server 3 of a diagnostic assistance system 1 provides data (a large volume of photographic images) concerning an object managed by each client, to said client and a plurality of analysts and experts, and allows such diagnosers to diagnose the object and enables sharing of diagnosis results among the diagnosers. The plurality of analysts each partially contribute in viewing the large volume of photographic images so as to find an abnormal site in the object. The client and the experts then conduct a more detailed diagnosis on the abnormal site discovered by the analysts. An AI server 5 of the diagnostic assistance system (Continued)

1 creates training data from the diagnosis results provided by the plurality of diagnosers, performs machine learning on the diagnosis results, and carries out automated diagnosis using the learned method.

32 Claims, 26 Drawing Sheets

(51) Int. Cl.
  *G06V 20/10* (2022.01)
  *G06T 7/00* (2017.01)
  *G08G 5/00* (2006.01)

(52) U.S. Cl.
  CPC .. *G08G 5/0034* (2013.01); *G06T 2207/10032* (2013.01); *G06T 2207/20081* (2013.01); *G06T 2207/30188* (2013.01)

(58) Field of Classification Search
  USPC .......................................................... 382/159
  See application file for complete search history.

(56) References Cited

U.S. PATENT DOCUMENTS

| | | |
|---|---|---|
| 2016/0026848 A1 | 1/2016 | Hamid et al. |
| 2017/0030877 A1 | 2/2017 | Miresmailli et al. |
| 2019/0156202 A1 | 5/2019 | Falk et al. |
| 2019/0263524 A1 | 8/2019 | Sugaya |

FOREIGN PATENT DOCUMENTS

| | | |
|---|---|---|
| CN | 106991619 A | 7/2017 |
| JP | 2013-152699 A | 8/2013 |
| JP | 2016-198197 A | 12/2016 |
| JP | 6307680 B1 | 4/2018 |
| WO | 2010/145007 A1 | 12/2010 |
| WO | 2017/190743 A1 | 11/2017 |
| WO | 2018/078863 A1 | 5/2018 |

OTHER PUBLICATIONS

Li, Zhanghua, et al. "Home damage estimation after disasters using crowdsourcing ideas and Convolutional Neural Networks." 2016 5th International Conference on Measurement, Instrumentation and Automation (ICMIA 2016). Atlantis Press, 2016. (Year: 2016).*
International Search Report for related Japanese Patent Application No. PCT/JP2019/039905 dated Dec. 24, 2019 (8 pages).
Corresponding CN Office Action (CN201980066979.3) dated Jan. 29, 2022. 26 pages.

* cited by examiner

DIAGNOSTIC ASSISTANCE SYSTEM AND METHOD THEREFOR

TECHNICAL FIELD

The present invention relates to a computer-aided system for assisting in performing diagnosis of an object and a method therefor.

BACKGROUND ART

Hitherto, a diagnostic task of using data obtained from an object such as a form field, a building, or a living body, for example, a photographic image to find abnormal sites (disease, degradation, and damaged part) of the object, identify abnormality details of each abnormal site, and identify a measure (pesticide type, fertilizer type, repair method, or remedy) to be applied to each abnormal site has been performed. Besides, a computer-aided system for assisting in performing such a diagnostic task is proposed.

In this type of diagnostic assistance system, there is proposed a computer system (referred to as "learning model" in this specification) having a machine learning function as represented by a neural network, which is caused to learn a diagnostic method and automatically output a diagnosis result by using a learning model that has finished learning.

For example, PTL 1 discloses a system for diagnosing the health condition of a plant. According to the disclosure, a health diagnosis server apparatus receives, from an expert terminal device, images of plants and health conditions thereof and growth environment information thereof, which are to be learned, and uses the images of plants, the health conditions, and the growth environment information to learn a diagnostic method for determining the health condition of a plant or determining an appropriate measure based on the images. Then, the health diagnosis server apparatus performs diagnosis for an image of a plant to be diagnosed, which is received from a user terminal device, based on the diagnostic method, and transmits, for example, the health condition of the plant to be diagnosed or the appropriate measure to the user terminal device as a diagnosis result.

For example, PTL 2 discloses a system for assisting in performing medical diagnosis. In this system, a first terminal transmits, to a server, an affected-area image given by a user. The server, which has received the affected-area image, derives a disease name corresponding to the affected-area image, and transmits the disease name to the first terminal. Furthermore, when the server has received a request from the first terminal, the server also transmits the affected-area image to a second terminal. The second terminal receives, from a doctor, information on a disease name indicating a diagnosis result corresponding to the affected-area image and given by the doctor, and transmits the information to the server. The server transmits the information on the disease name given by the doctor to the first terminal. The server then uses the information on the disease name corresponding to the affected-area image received from the second terminal and given by the doctor to perform machine learning, to thereby improve the accuracy of image analysis for deriving a disease name.

CITATION LIST

Patent Literature

[PTL 1]
Japanese Patent No. 6307680

[PTL 2]
Japanese Patent Application Publication No. 2016-198197

SUMMARY OF INVENTION

Technical Problem

In order to cause a learning model to perform learning so that the inference accuracy reaches a practical level, a large amount of training data need to be prepared to train the learning model. It takes a substantial amount of time to prepare a sufficient amount of training data. Especially in the field of diagnosis of an abnormality of a form field, the growth cycle of a crop is a long period such as half a year or one year, and thus it takes a long period of time to collect a necessary amount of data indicating various abnormalities of the form field. Furthermore, it also takes a substantial amount of labor and time to create an appropriate diagnosis result for collected abnormality data. Therefore, it takes an extremely long period of time to prepare a necessary amount of training data.

The diagnosis result of a learning model is not reliable during a long period until learning by the learning model as described above is finished, and thus a customer of the diagnostic assistance system can obtain an appropriate diagnosis result only by checking and diagnosing data of an object by himself or herself or by asking an expert to check and diagnose the data.

However, when it is necessary to investigate a large amount of data in a diagnostic task, a customer (or expert) bears an extremely large burden of the diagnostic task. For example, when an image obtained by photographing a form field by a camera drone is used to diagnose the form field, one form field is sometimes divided into several hundreds or thousands of sub-areas, so that a high-definition picture is photographed for each sub-area. Thus, the customer needs to carefully investigate several hundreds or thousands of high-definition pictures in order to diagnose his or her form field. This task puts a heavy burden on the customer.

An object of the present invention is to alleviate the work load of a person when the person investigates data of an object and diagnoses the object.

Solution to Problem

According to one embodiment of this disclosure, there is provided a diagnostic assistance system for assisting a person in performing diagnosis of an object, the diagnostic assistance system including: target data storage means for storing target data indicating a state of the object; diagnostic task means for providing each of a first user and a second user with the target data to enable each of the first user and the second user to perform a diagnostic task of the object; diagnostic result means for receiving a result of diagnosis of the object by each of the first user and the second user; sharing means for enabling the first user and the second user to share the result of diagnosis by each of the first user and the second user; an artificial intelligence adapted to learn a diagnostic method by using the result of diagnosis by the first user or the second user to perform automated diagnosis of the object; and automated diagnosis result provision means for providing the first user with a result of automated diagnosis of the object by the artificial intelligence.

In one embodiment, the first user is a customer who requests or requires diagnosis of the object, and the second user is an analyst who performs preliminary diagnosis of the object prior to the customer.

In one embodiment, the diagnostic task includes a first sub-task of investigating the target data to input a first diagnostic result and a second sub-task of using the first diagnostic result to input a second diagnostic result. The diagnostic task means is adapted to enable the second user to perform at least the first sub-task of the diagnostic task, and to enable the first user to perform at least the second sub-task of the diagnostic task. The sharing means is adapted to enable the first user and the second user to share the first diagnostic result obtained by the second user.

In one embodiment, the first sub-task is to investigate the target data to find an abnormal site in the object, and to input the found abnormal site as the first diagnostic result. The second sub-task is to identify an abnormality name or measure for the abnormal site found in the first sub-task.

In one embodiment, the sharing means is adapted to enable the first user and the second user to share the second diagnostic result obtained by the first user.

In one embodiment, the diagnostic assistance system further includes first progress notification means for providing the first user with progress information on whether the first sub-task has already been performed for the object.

In one embodiment, the diagnostic assistance system further includes second progress notification means for providing the second user with progress information on whether the first sub-task has already been performed for the object.

In one embodiment, the diagnostic assistance system is capable of communicating with a plurality of the second user. The object includes a plurality of different parts, and the target data includes a plurality of part data records representing respective states of the different parts of the object. The diagnostic task means is adapted to distribute the plurality of part data records to the plurality of second users to enable the plurality of second users to perform diagnostic tasks for the different parts of the object in a shared manner.

In one embodiment, the diagnostic assistance system further includes third progress notification means for providing each of the plurality of second users with progress information on whether the diagnostic task has already been performed for each of the different parts of the object.

In one embodiment, the diagnostic task means is adapted to provide the first user with the plurality of part data records, and enable the first user to perform diagnostic tasks for the different parts of the object.

In one embodiment, the diagnostic assistance system further includes fourth progress notification means for providing the first user with progress information on whether the diagnostic task has already been performed for each of the different parts of the object.

In one embodiment, the diagnostic task means is adapted to provide not only the first user and the second user but also a third user with the target data to enable each of the first user, the second user, and the third user to perform a diagnostic task of the object. The diagnostic result means is adapted to receive a result of diagnosis of the object by each of the first user, the second user, and the third user. The sharing means is adapted to enable the first user, the second user, and the third user to share the result of diagnosis by each of the first user, the second user, and the third user. The artificial intelligence is adapted to learn the diagnostic method by using the results of diagnosis by the first user, the second user, and the third user.

In one embodiment, the third user is an expert who assists the first user in a case in which the first user has a difficulty in performing diagnosis.

In one embodiment, the diagnostic assistance system further includes operation terminal communication means for communicating with one or more communication terminals capable of communicating with a drone; geographic region storage means for storing a position of a geographic region of the object; movement plan creation means for creating, based on the position of the geographic region, a movement plan for controlling the drone such that the drone acquires the target data while moving in the geographic region; movement plan storage means for storing the movement plan; movement plan provision means for providing at least one of the communication terminals with the movement plan to enable the at least one of the communication terminals to input the movement plan to the drone; and target data acquisition means for acquiring the target data acquired by the drone.

In one embodiment, the diagnostic assistance system includes one or more CPUs; one or more storages; a computer program stored in the one or more storages. The CPU executes the computer program to execute the following processing of: preparing target data indicating a state of the object; providing each of a first user and a second user with the target data, and enabling each of the first user and the second user to perform a diagnostic task of the object; receiving a result of diagnosis of the object by each of the first user and the second user; enabling the first user and the second user to share the result of diagnosis by each of the first user and the second user; learning a diagnostic method by using the result of diagnosis by the first user or the second user; performing automated diagnosis of the object by using the learned diagnostic method; and providing the first user with the automated diagnosis result.

According to another embodiment of this disclosure, there is provided a diagnostic assistance system for assisting a person in performing diagnosis of an object, the diagnostic assistance system including: target data storage means for storing target data indicating a state of the object; sample data selection means for selecting, from the target data, sample data indicating a state of a sample part being a part of the object; sample data transmission means for transmitting the sample data to one or more users, and enabling the one or more users to perform first manual diagnosis being diagnosis of the sample data; first manual diagnosis result reception means for receiving a result of the first manual diagnosis from the one or more users; diagnostic method calculation means for calculating a diagnostic method for automatically diagnosing the object by using the result of the first manual diagnosis; automated diagnosis means for applying the diagnostic method to the target data, and automatically diagnosing all of the object or a part wider than the sample part; automated diagnosis result transmission means for transmitting a result of the automated diagnosis to the one or more users, and enabling the one or more users to be satisfied with the result of the automated diagnosis or to perform second manual diagnosis of finding an unsatisfactory part from at least a part of the result of the automated diagnosis and correcting the unsatisfactory part; and second manual diagnosis result reception means for receiving a result of the second manual diagnosis from the one or more users. When a result of correcting the unsatisfactory part is included in the result of the second manual diagnosis, the diagnostic method calculation means is adapted to recalculate the diagnostic method by using the result of correcting the unsatisfactory part. The automated diagnosis means is adapted to perform the automated diagnosis again by using the recalculated diagnostic method. The automated diagnosis result transmission means is adapted to transmit the result of automated diagnosis performed again to the one or more users.

In one embodiment, the one or more users include a first user and a second user. The diagnostic assistance system is adapted to enable the first user to perform the first manual diagnosis, and enables the second user to perform the second manual diagnosis.

In one embodiment, the diagnostic assistance system further includes an artificial intelligence adapted to learn a second diagnostic method by using the result of the second manual diagnosis to perform second automated diagnosis of the object by using the learned second diagnostic method; and automated diagnosis result provision means for providing the one or more users with a result of the second automated diagnosis by the artificial intelligence.

In one embodiment, the diagnostic assistance system further includes data grouping means for classifying a plurality of pieces of part data included in the object data into one or more data groups based on a characteristic of each of the plurality of pieces of part data. The diagnostic method calculation means is adapted to calculate the one or more diagnostic methods associated with each of the one or more data groups. The automated diagnosis means is adapted to perform automated diagnosis for each of the one or more data groups by using the one or more diagnostic methods associated with each of the one or more data groups.

In one embodiment, the diagnostic assistance system further includes operation terminal communication means for communicating with one or more communication terminals capable of communicating with a drone; geographic region storage means for storing a position of a geographic region of the object; movement plan creation means for creating, based on the position of the geographic region, a movement plan for controlling the drone such that the drone acquires the target data while moving in the geographic region; movement plan storage means for storing the movement plan; movement plan provision means for providing at least one of the communication terminals with the movement plan, and enabling the at least one of the communication terminals to input the movement plan to the drone; and target data acquisition means for acquiring the target data acquired by the drone.

In one embodiment, the diagnostic assistance system includes one or more CPUs; one or more storages; and a computer program stored in the one or more storages. The CPU executes the computer program to execute the following processing of: storing target data indicating a state of the object; selecting, from the target data, sample data indicating a state of a sample part being a part of the object; transmitting the sample data to one or more users to enable the one or more users to perform first manual diagnosis being diagnosis of the sample data; receiving a result of the first manual diagnosis from the one or more users; calculating a diagnostic method for automatically diagnosing the object by using the result of the first manual diagnosis; applying the diagnostic method to the target data, and automatically diagnosing all of the object or a part wider than the sample part; transmitting a result of the automated diagnosis to the one or more users, and enabling the one or more users to be satisfied with the result of the automated diagnosis or to perform second manual diagnosis of finding an unsatisfactory part from at least a part of the result of the automated diagnosis and correcting the unsatisfactory part; receiving a result of the second manual diagnosis from the one or more users; recalculating, when a result of correcting the unsatisfactory part is included in the result of the second manual diagnosis, the diagnostic method by using the result of correcting the unsatisfactory part; performing the automated diagnosis again by using the recalculated diagnostic method; and transmitting the result of automated diagnosis performed again to the one or more users.

DESCRIPTION OF EMBODIMENTS

Now, description is given of a diagnostic assistance system according to one embodiment of the present invention.

Figure 1:
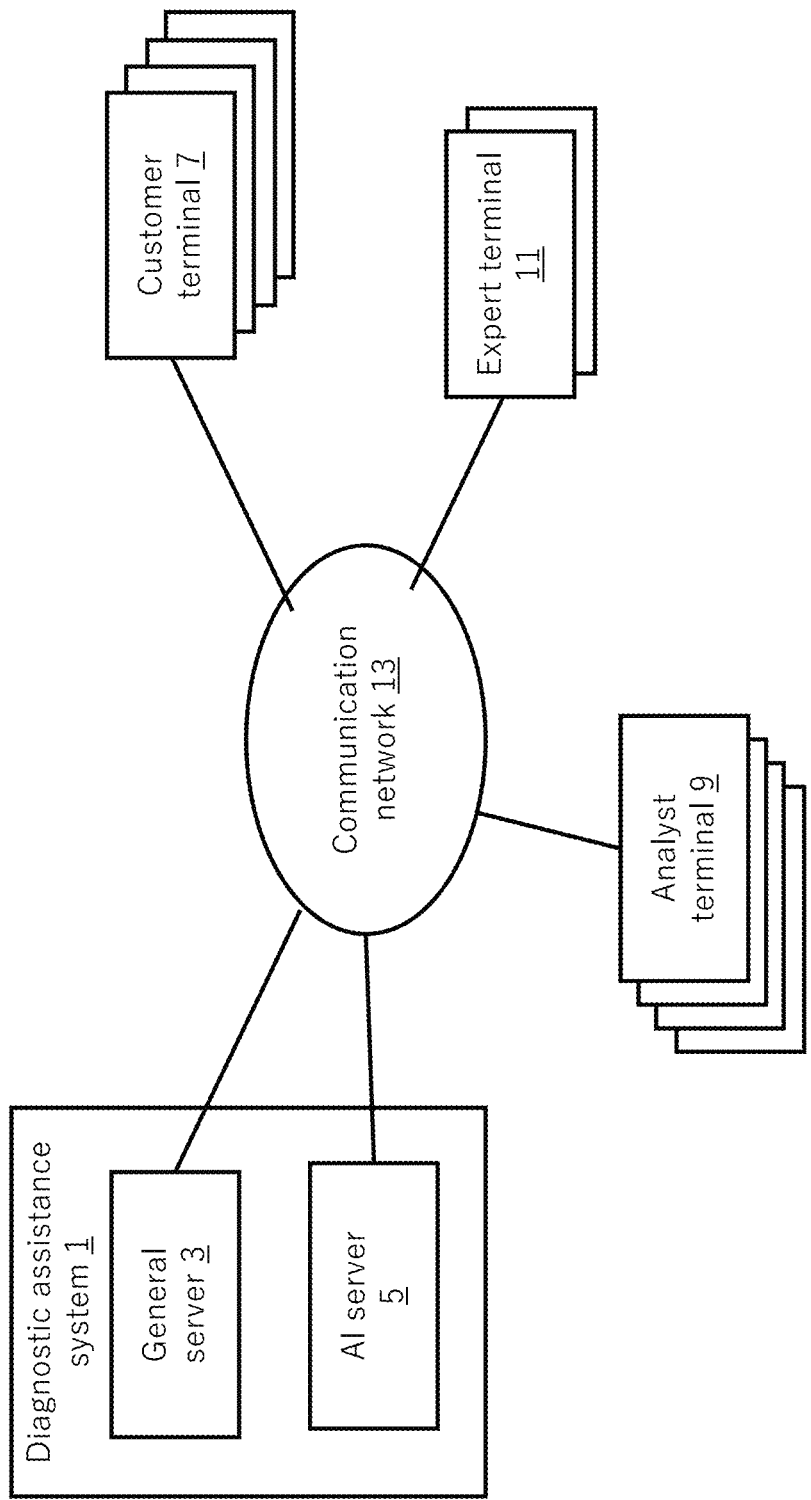
FIG. 1 is a block diagram illustrating an overall system configuration according to one embodiment of the present invention.

As illustrated in FIG. 1, the diagnostic assistance system 1 according to one embodiment includes a general server 3 and an AI server 5. The general server 3 and the AI server 5 are communicably connected to each other through a communication network 13, for example. The general server 3 executes and controls various kinds of primary functions for providing people with a diagnostic assistance service. The AI server 5 serves as an AI (artificial intelligence) for learning a diagnostic method by machine learning and performing automated diagnosis to execute and control various kinds of functions.

The general server 3 of the diagnostic assistance system 1 can communicate with, through the communication network 13, for example, a plurality of terminal computers (for example, personal computer and smartphone) (hereinafter collectively referred to as "user terminal") 7, 9, and 11 used by a plurality of types of people (hereinafter collectively referred to as "user") involved in the diagnostic assistance service.

The general server 3 of the diagnostic assistance system 1 can transmit target data representing the state of an object to be diagnosed to the user terminals 7, 9, and 11 of the plurality of users involved in diagnosis of the object, and display the target data on monitor screens of the user terminals 7, 9, 11. Each user can check the target data displayed on each user terminal to diagnose the object. The result of diagnosing the object by each user is input to each user terminal, and is received by the general server 3.

Furthermore, the general server 3 can transmit the target data to the AI server 5, and cause the AI server to diagnose the object. Then, the general server 3 receives the result of diagnosis by the AI server 5.

Various kinds of data obtained from an object may be adopted as the target data (for example, a picture image obtained by photographing the object by a camera or a sensor signal obtained by investigating the object by some sensor). For example, when a form field is diagnosed, several hundreds or thousands of picture images obtained by photographing the form field by, for example, a camera drone may be adopted as the target data.

The general server 3 can transmit the result of diagnosis of the object by each user, which has been received from each user terminal, and the result of diagnosis of the same object by the AI server 5, which has been received from the AI server 5, to the user terminals of other users involved in diagnosis of the same object. As a result, the plurality of users involved in diagnosis of the same object can share the results of diagnosis by other users and the AI server 5, and use the results as a reference for performing each diagnostic task.

The general server 3 can also transmit the result of diagnosis of the object input by each user to the AI server 5. The AI server 5 can use the object data and the results of diagnosis of the same object by the users to create training data for machine learning, and use the training data to learn a diagnostic method for an object. The machine learning by the AI server 5 advances along with increase in amount of training data, which improves the accuracy of diagnosis.

The users involved in diagnosis of each object include at least two types of users, namely, a customer and an analyst. Furthermore, the users may include an expert as a third type of user. In this specification, in order to distinguish between user terminals to be used by different types of users, the user terminal 7 to be used by the customer is referred to as "customer terminal", the user terminal 9 to be used by the analyst is referred to as "analyst terminal", and the user terminal 11 to be used by the expert is referred to as "expert terminal". The customer, analyst, and expert can use the customer terminal 7, the analyst terminal 9, and the expert terminal 11, respectively, to diagnose an object while at the same time communicating with the diagnostic assistance system 1.

The customer is, for example, a person who requests diagnosis of an object, namely, people who need diagnosis of the object. In the case of diagnosis of an abnormality of a form field, a typical example of the customer is assumed to be a former who runs a form in the form field, or a manager or owner of the form field. Furthermore, in the case of diagnosis of an abnormality of a building, a typical example of the customer is assumed to be a manager or owner of the building. The customer can use the diagnostic assistance system 1 to diagnose an object (owned, managed, or used, for example) in which the customer is involved.

The analyst is a person different from the customer, who diagnoses an object by using the diagnostic assistance system 1. The primary role of the analyst is to perform preliminary diagnosis before the customer in order to alleviate the task amount of diagnosis by the customer, which means that the analyst is an assistant for the customer. The analyst is desired to be people who have a certain level or more of knowledge that enables identification of an abnormality of an object to some extent. The analyst may be people (so-called crowd-worker) who receive an order of a diagnosis task through crowdsourcing, for example.

The expert is a person who is not a customer nor an analyst, who diagnoses an object by using the diagnostic assistance system 1. The primary role of the expert is to help the customer in a case of diagnosis difficult for the customer in order to improve the quality of diagnosis of the customer, which means that the expert is an advisor for the customer. The expert is desired to be a person who has more sophisticated diagnostic capabilities than the customer or analyst. For example, in the case of diagnosis of a form field, the expert is a staff member or researcher of an agricultural specialized agency such as an agricultural experiment station, agricultural cooperative, or agricultural university of each region in Japan, and a person who has sufficient knowledge or experience of a disease of a form field or a measure used therefor may be adopted as the expert.

There are usually at least one customer and a plurality of analysts for one object. Furthermore, there may not be an expert for one object, but there are preferably one or more experts. For example, in the case of diagnosis of a form field, a former who makes a crop in the form field is a typical customer, and a plurality of agricultural knowledgeable persons may be adopted as the analyst. Furthermore, a staff member of the agricultural cooperative to which the customer subscribes or a staff member of the agricultural experiment station who manages a region including the form field may be adopted as the expert.

As described above, there are four types of entities that are involved in the diagnostic assistance system 1 to diagnose an object, namely, the AI server 5, the customer, the analyst, and the expert. These four types of entities that perform diagnosis are different from one another in terms of capabilities and situation of diagnosis. The diagnostic assistance system 1 according to this embodiment is designed with focus on a difference in the following situation of each of the different entities that perform diagnosis.

The AI server 5 can output a diagnosis result accurately, and is reliable to the customer after learning of the diagnostic method is finished. However, while learning is not finished, in particular, while the learning level is low due to insufficient amount of training data, the accuracy of diagnosis by the AI server 5 is extremely low, which is not useful to the customer.

While the AI server 5 is not useful, the customer is basically required to check and diagnose data of an object by himself or herself. However, when the amount of data of an object to be checked for diagnosis is large, it is difficult for the customer to perform diagnosis by himself or herself. For example, in some cases, several hundreds or thousands of images need to be checked to diagnose one form field. In addition, the customer may not be able to perform accurate diagnosis by himself or herself because the diagnostic capabilities of the customer are insufficient.

There are a plurality of analysts for one object, and thus the plurality of analysts can share a diagnostic task. For example, when 100 analysts share diagnosis of one form field, the work load of one analyst becomes one hundredth compared to a case in which the customer performs diagnosis by himself or herself. The results of diagnosis by the analysts can be given to the customer, so that the analysts can assist the customer and the work load of the customer can be alleviated. The diagnostic capabilities of each analyst may be lower than those of the customer, but the analyst can at least serve to assist the customer.

The expert has higher diagnostic capabilities than the analyst and the customer, and can assist or teach the customer by compensating for insufficient diagnostic capabilities of the customer and improving the accuracy of diagnosis. In general, the number of experts is smaller than that of the customer or the analyst, and thus it is difficult to expect the expert to perform a large amount of tasks. However, the results of diagnosis by the analyst and the customer can be given to the expert, and with this, the expert can select only a part in which the expert is to be involved from the results of diagnosis, and the risk of bearing an excessive amount of tasks for the expert is avoided.

The result of diagnosis by the analyst, the customer, and the expert can be used as training data for machine learning by the AI server 5. In that case, the result of diagnosis in which a person with higher diagnostic capabilities is involved is more useful for creating training data. In other words, in general, the result of diagnosis in which the customer is involved is assumed to be more accurate than the result of diagnosis in which only the analyst is involved, and the result of diagnosis in which the expert is involved is assumed to be still more accurate than the other results.

As described above, different entities that perform diagnosis are different from one another in terms of diagnostic characteristic and situation. It is possible to improve the work efficiency of each entity that performs diagnosis and alleviate the work load by utilizing the difference and causing the different entities that perform diagnosis to cooperate with one another and assist one another so as to utilize each strength and compensate for each weakness. Now, description is given of functions mounted on the general server 3 and the AI server 5 of the diagnostic assistance system 1 in order to achieve the purpose.

Figure 2:
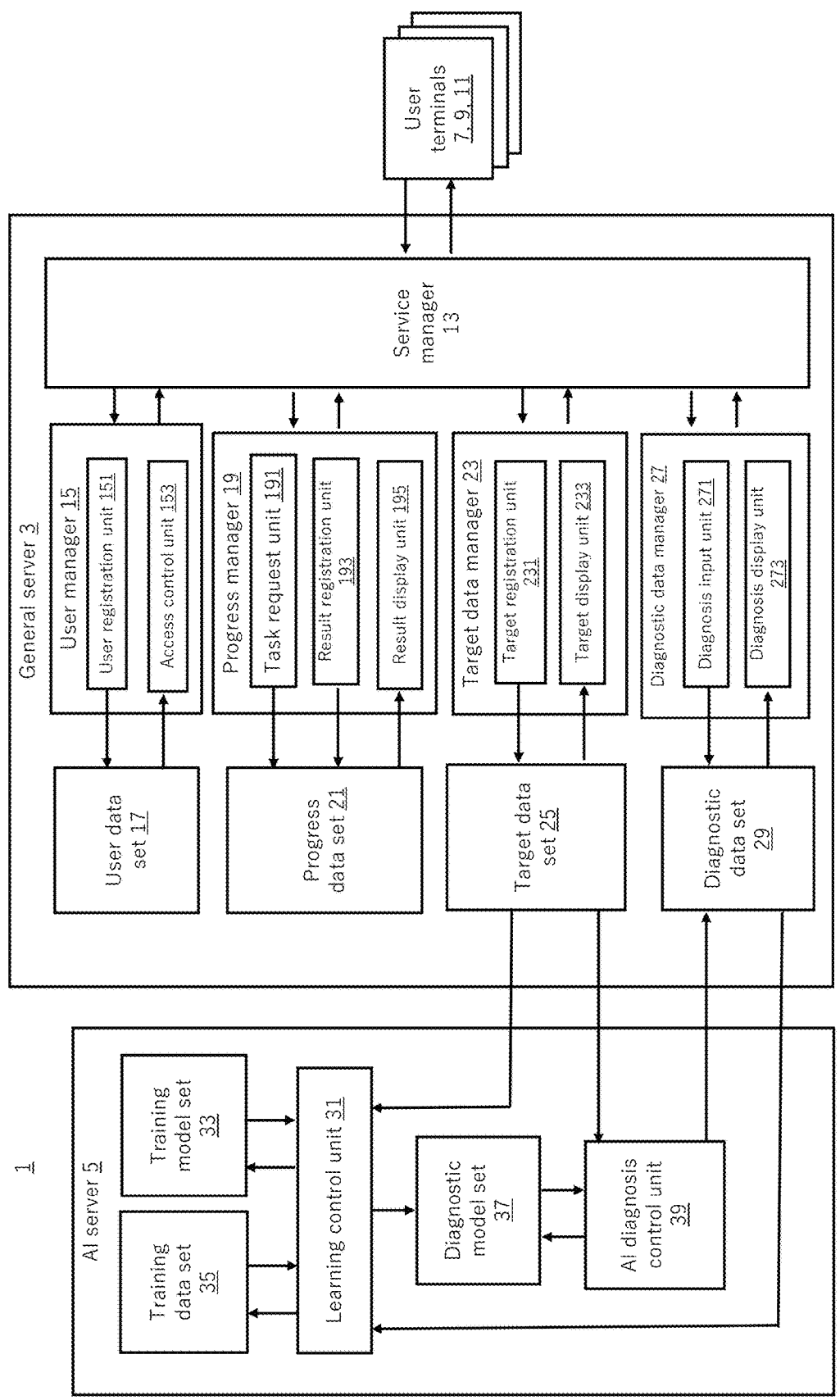
FIG. 2 is a block diagram illustrating a specific functional configuration of the diagnostic assistance system.
Figure 3:
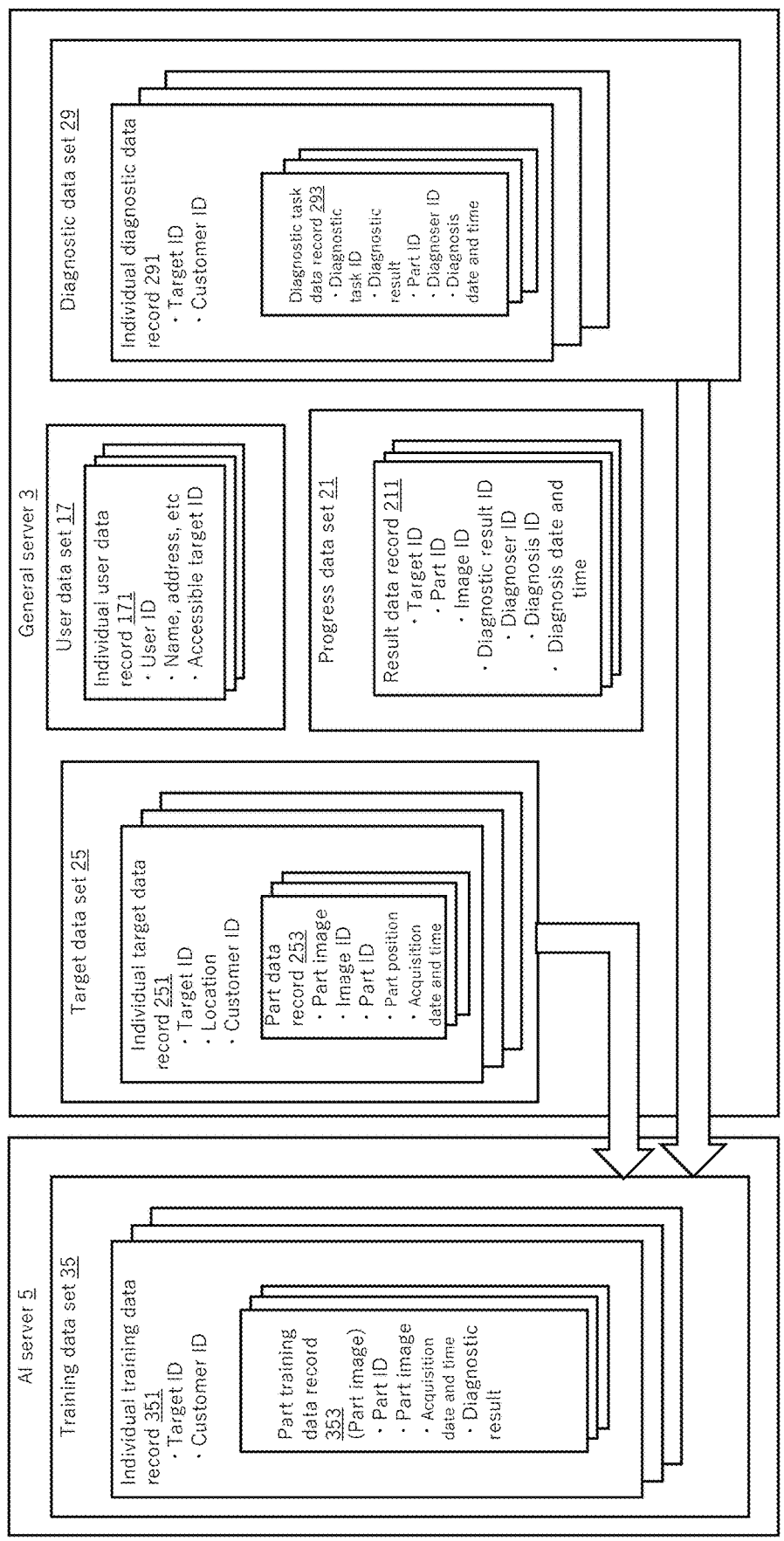
FIG. 3 is a block diagram illustrating an exemplary configuration of data managed by each of a general server and an AI server.

FIG. 2 illustrates functional configurations of the general server 3 and the AI server 5. FIG. 3 illustrates an exemplary configuration of data managed by each of the general server 3 and the AI server 5. The exemplary configuration of data illustrated in FIG. 3 is an example of a case in which object data is an image (for example, a case in which the object is a form field, and the object data is a large number of picture images obtained by photographing the form field).

As illustrated in FIG. 2, the general server 3 includes a service manager 13, a user manager 15, a user data set 17, a progress manager 19, a progress data set 21, a target data manager 23, a target data set 25, a diagnostic data manager 27, and a diagnostic data set 29. The AI server 5 includes a learning control unit 31, a learning model set 33, a training data set 35, a diagnostic model set 37, and an AI diagnosis control unit 39.

The service manager 13 of the general server 3 accesses the user data set 17, the progress data set 21, the target data set 25, and the diagnostic data set 29 via the user manager 15, the progress manager 19, the target data manager 23, and the diagnostic data manager 27, respectively, and creates, based on the result of access, several types of graphical user interfaces (hereinafter abbreviated as "GUI") for each user to check the progress of diagnosis of each object or diagnose each object (specific examples of GUI are described later).

The service manager 13 transmits the above-mentioned GUI to each of the user terminals 7, 9, and 11, and then, each of the user terminals 7, 9, and 11 displays the received GUI on the monitor screen. Each user investigates data of each object through the GUI, and then, inputs the result of diagnosing each object to each of the user terminals 7, 9, and 11. The service manager 13 receives, from each of the user terminals 7, 9, and 11, the result of diagnosing each object input by each user, and then stores the received diagnosis result into the diagnostic data set 29 via the diagnostic data manager 27, or updates the progress data set 29 via the progress manager 19.

The user manager 15 of the general server 3 manages the user data set 17. As illustrated in FIG. 3, the user data set 17 includes a plurality of individual user data records 171 relating to a respective plurality of users. The individual user data record 171 of each user records various kinds of attributes of the user. Such attributes may include, for example, a user ID for identifying the user, the name and address of the user, and an accessible target ID indicating an object accessible by the user.

Referring back to FIG. 2, the user manager 15 includes a user registration unit 151 and an access control unit 153.

The user registration unit 151 receives a user registration request from the user terminal 7, 9, or 11 of each user, creates the individual user data record 171 of the user, and registers the individual user data record 171 in the user data set 17.

In response to a data access request (for example, request for performing a diagnostic task of an object) for the target data set 25 received from the user terminal 7, 9, or 11 of each user, the access control unit 153 refers to the accessible target ID recorded in the individual user data record 171 of the user to determine an object accessible by the user. In response to the result of determination, the service manager 13 controls target data of which object is allowed to be accessed or prohibited from being accessed by each user.

A typical example of access control for each user is as follows.

Each customer can access only the target data of an object managed or held by the customer, but cannot access target data of an object managed or held by another customer. The customer who can access target data of each object (that is, who can diagnose the object) is limited to a customer who manages or holds the object, and another customer cannot access data of that object. Each analyst can access pieces of target data of different objects managed or held by respective different customers (it is to be understood that an object that can be diagnosed by a specific analyst may be limited to a specific object). There are a plurality of analysts who can access target data of each object (that is, who can diagnose the object). Each expert can access pieces of target data of different objects managed or held by respective different customers (it is to be understood that an object that can be diagnosed by a specific expert may be limited to a specific object). It is preferred that there be one or more experts who can access target data of each object (that is, who can diagnose the object), but there may be zero experts depending on the object. The AI server 5 can access pieces of target data of all the objects (can diagnose all the objects).

The progress manager 19 of the general server 3 uses the progress data set 21 to manage the progress states of diagnostic tasks of various kinds of objects. As illustrated in FIG. 3, the progress data set 21 includes a plurality of result data records 211 indicating results (for example, which part of which object is diagnosed by who at what time, and which data record of the diagnostic data set 29 records the diagnosis result) of diagnosis by each user. Each result data record 211 records various kinds of attributes of the diagnosis result. Such attributes may include, for example, a target ID for identifying a diagnosed object, a part ID for identifying a part of the diagnosed object, an image ID for identifying an image of the part used for diagnosis, an diagnoser ID for identifying an entity (AI, analyst, customer, or expert) who has performed diagnosis, and a diagnosis result ID for identifying the result of diagnosis by each diagnoser, and a diagnosis date and time indicating a date and time at which diagnosis has been performed.

Referring back to FIG. 2, the progress manager 19 includes a task request unit 191, a result registration unit 193, and a result display unit 195.

When the task request unit 191 has received, from the user terminal 7, 9, or 11 of each user, a diagnostic task request requesting a diagnostic task of one object, the task request unit 191 creates the result data record 211 corresponding to the requested diagnostic task in the progress data set 21.

When the general server 3 has received, from the user terminal 7, 9, or 11 of each user, the result of diagnosing each diagnostic task, the result registration unit 193 records the diagnosis result ID of the diagnosis result and the diagnosis date and time into the result data record 211 corresponding to the diagnostic task.

When the result display unit 195 has received, from the user terminal 7, 9, or 11 of each user, a progress display request asking about the progress of diagnosis of one object, the result display unit 195 reads, from the progress data set 21, the result data record 211 of diagnosis of the object since the past until the current time point, the result display unit 195 provides, based on the result data record 211, the service manager 13 with progress display information necessary for creating a GUI for displaying the progress state of diagnosis of the object. The service manager 13 uses the progress display information to create the above-mentioned progress display GUI.

The target data manager 23 of the general server 3 manages the target data set 25. As illustrated in FIG. 3, the target data set 25 includes an individual target data record 251 corresponding to each of a plurality of objects. The individual target data record 251 of each object records various kinds of attributes of the object. Such attributes may include, for example, a target ID for identifying the object, a location of the object, and a customer ID for identifying a customer of the object.

The individual target data record 251 of each object further includes a plurality of part data records 253 corresponding to a plurality of parts (for example, a large number of sub-areas obtained by dividing a form field finely when the object is a form field) forming the object. The part data record 253 of each part includes, for example, target part data (for example, picture image of the sub-area in the form field) corresponding to the part in object data, a part ID for identifying the part, a part position indicating the position of the part in the object, and a date and time (for example, data and time at which the picture image of the sub-area has been photographed) of the target part data.

Referring back to FIG. 2, the target data manager 23 of the general server 3 includes a target registration unit 231 and a target display unit 233.

When the target registration unit 233 has received, from the user terminal 7, 9, or 11 (typically, the customer terminal 7 used by the customer), a target registration request and target data (for example, a set of an image and position information of each of a large number of parts forming the target) for one object, the target registration unit 233 creates the individual target data record 251 of the object, and registers the individual target data record 251 in the target data set 25.

When the target display unit 233 has received, from the user terminal 7, 9, or 11 of each user, a progress display request requesting checking of the progress of diagnosis of one object or a diagnostic task request requesting diagnosis of the object, the target display unit 233 reads the individual target data record 251 of the object from the target data set 25, and provides, based on the individual target data record 251, the service manager 13 with target display information necessary for creating a GUI for displaying the progress or a GUI for performing diagnosis. The service manager 13 uses the target display information to create the above-mentioned progress display GUI or diagnosis GUI.

Referring back to FIG. 2, the diagnostic data manager 27 of the general server 3 manages the diagnostic data set 29. As illustrated in FIG. 3, the diagnostic data set 29 includes an individual diagnostic data record 291 corresponding to each of a plurality of objects. The individual diagnostic data record 291 of each object records, for example, a target ID for identifying a corresponding object and a customer ID for identifying a customer of the object.

The individual diagnostic data record 291 of each object further includes a plurality of diagnostic task data records 293 corresponding to a plurality of diagnostic tasks performed by different diagnosers for the object. The diagnostic task data record 293 of each diagnostic task includes information such as a diagnostic task ID for identifying the diagnostic task, a diagnosis result obtained in the diagnostic task, a part ID for identifying a part of the object diagnosed in the diagnostic task, a diagnoser ID for identifying a diagnoser (customer, analyst, expert, or AI server 5) who has performed the diagnostic task, and a date and time at which the diagnostic task has been performed.

Referring back to FIG. 2, the diagnostic data manager 27 of the general server 3 includes a diagnosis input unit 271 and a diagnosis display unit 273.

When the diagnosis input unit 271 has received, from the user terminal 7, 9, or 11, a diagnosis input request indicating that a diagnostic result is input in a diagnostic task for a part of one object, and an input diagnostic result, the diagnosis input unit 271 creates the diagnostic task data record 293 corresponding to the diagnostic task, and registers the diagnostic task data record 293 in the individual diagnostic data record 291 of the object in the diagnostic data set 29.

When the diagnosis display unit 273 has received, from the user terminal 7, 9, or 11 of each user, a diagnostic task request requesting a diagnostic task of one object, the diagnosis display unit 273 reads the individual diagnostic data record 291 of the object from the diagnostic data set 29, and provides, based on the diagnostic task data record 293 stored in the individual diagnostic data record 291, the service manager 13 with diagnosis display information necessary for creating a GUI for performing diagnosis of the object. The service manager 13 uses the diagnosis display information to create the above-mentioned diagnosis GUI.

As illustrated in FIG. 2, the AI server 5 includes the learning control unit 31, the learning model set 33, the training data set 35, the diagnostic model set 37, and the AI diagnosis control unit 39.

The learning control unit 31 of the AI server 5 prepares the learning model set 33. The learning model set 33 includes at least one learning model, desirably, a plurality of learning models. Each learning model is a computing system capable of learning a diagnostic method by machine learning, for example, a neural network. Different learning models may be adapted to learn different diagnostic methods for different purposes (for example, diagnosis of a different object present at a different location or region, diagnosis of a different type of object, or diagnosis of the same object for a different purpose). In other cases, different learning models may learn a diagnostic method for the same purpose but have different structures or functions.

The learning control unit 31 creates the training data set 35, and uses the training data set 35 to cause each learning model described above to learn a diagnostic method.

As illustrated in FIG. 3, the training data set 35 includes a plurality of (usually, a large number of) individual training data records 35. Each individual training data record 351 is a set of training data representing each of a plurality of ideal examples of diagnosis of each object, and records, for example, the target ID and customer ID of the object. Furthermore, each individual training data record 351 includes a plurality of part training data records 353 corresponding to different parts of the object.

Each part training data record 353 corresponding to each part is one unit of training data representing one ideal example of diagnosis of the part. Each part training data record 353 includes, for example, a part ID of the part, part data (for example, picture image of the part) of the part, a date and time at which the part data has been acquired, and an ideal diagnostic result for the part data.

As illustrated in FIG. 2 and FIG. 3, the learning control unit 31 uses the target data set 25 and the diagnostic data set 29 in the general server 3 to create the training data set 35. That is, the learning control unit 31 uses the part target data record 253 at a date and time at which a part of an object stored in the target data set 25 has been acquired, and the diagnostic task data record 293 relating to the part target data stored in the diagnostic data set 29, to create the part training data record 353 relating to the same part target data.

As described above, when the part training data record 353 (namely, training data) is created as described above, the diagnostic data set 29 serving as its sources may include a plurality of diagnostic task data records 253 each indicating a different diagnostic result obtained by a different diagnoser (customer, analyst, or expert) for the same part target data (for example, a case in which an analyst diagnoses a part of a form field as "abnormality", a customer diagnoses the part as "rice blight", and an expert diagnoses a measure for the rice blight as "apply pesticide ABC"). In such a case, the learning control unit 31 may create a diagnostic result for training data by integrating those different diagnostic results so as to match one another (for example, the learning control unit 31 creates a diagnostic result indicating that the part of the form field is "rice blight and apply the pesticide ABC").

In the above case, when different diagnostic results do not match one another (contradict one another) (for example, a case in which an analyst diagnoses a part of a form field as "abnormality", but a customer diagnoses the part as "normal" and an expert diagnoses the part as "fertilization is required"). When training data is created from different diagnostic results contracting one another, depending on the priority (for example, the expert has the highest priority, the customer has an intermediate priority, and the analyst has the lowest priority) of a diagnoser set in advance, the learning control unit 31 may adopt a diagnostic result of a diagnoser having a higher priority preferentially (for example, the diagnostic result "fertilization is required" of the expert having the highest priority and the diagnostic result "abnormal" of the analyst matching the diagnostic result of the expert are adopted), to thereby create a diagnostic result for training data.

Referring to FIG. 2, the learning control unit 31 further prepares the diagnostic model set 37. That is, the learning control unit 31 selects a learning model that may be adopted for actual diagnosis from among a plurality of learning models in the learning model set 33, and adopts a copy of the selected learning model as a diagnostic model for performing actual diagnosis. One or more diagnostic models adopted in this manner are included in the diagnostic model set 37. A selection condition for selecting a learning model as a diagnostic model can be set arbitrarily. For example, only the learning model that has finished learning in a sophisticated manner until a satisfactorily high diagnostic accuracy is obtained, or a learning model for which training data used for learning has reached a predetermined amount may be selected as the diagnostic model.

The AI diagnosis control unit 39 uses each diagnostic model in the diagnostic model set 37 to cause the diagnostic model to perform automated diagnosis of an actual object. That is, the AI diagnosis control unit 39 inputs target data of various kinds of objects in the target data set 25 into at least one diagnostic model for diagnosis of the object. Then, the AI diagnosis control unit 39 transmits an automated diagnosis result obtained from the diagnostic model to the general server 1. Similarly to the diagnostic result of a diagnostic task performed by a customer, an analyst, or an expert, the general server 1 registers the automated diagnosis result received from the AI server 5 in the diagnostic data set 29 as the diagnostic task data record 293 illustrated in FIG. 2.

Figure 4:
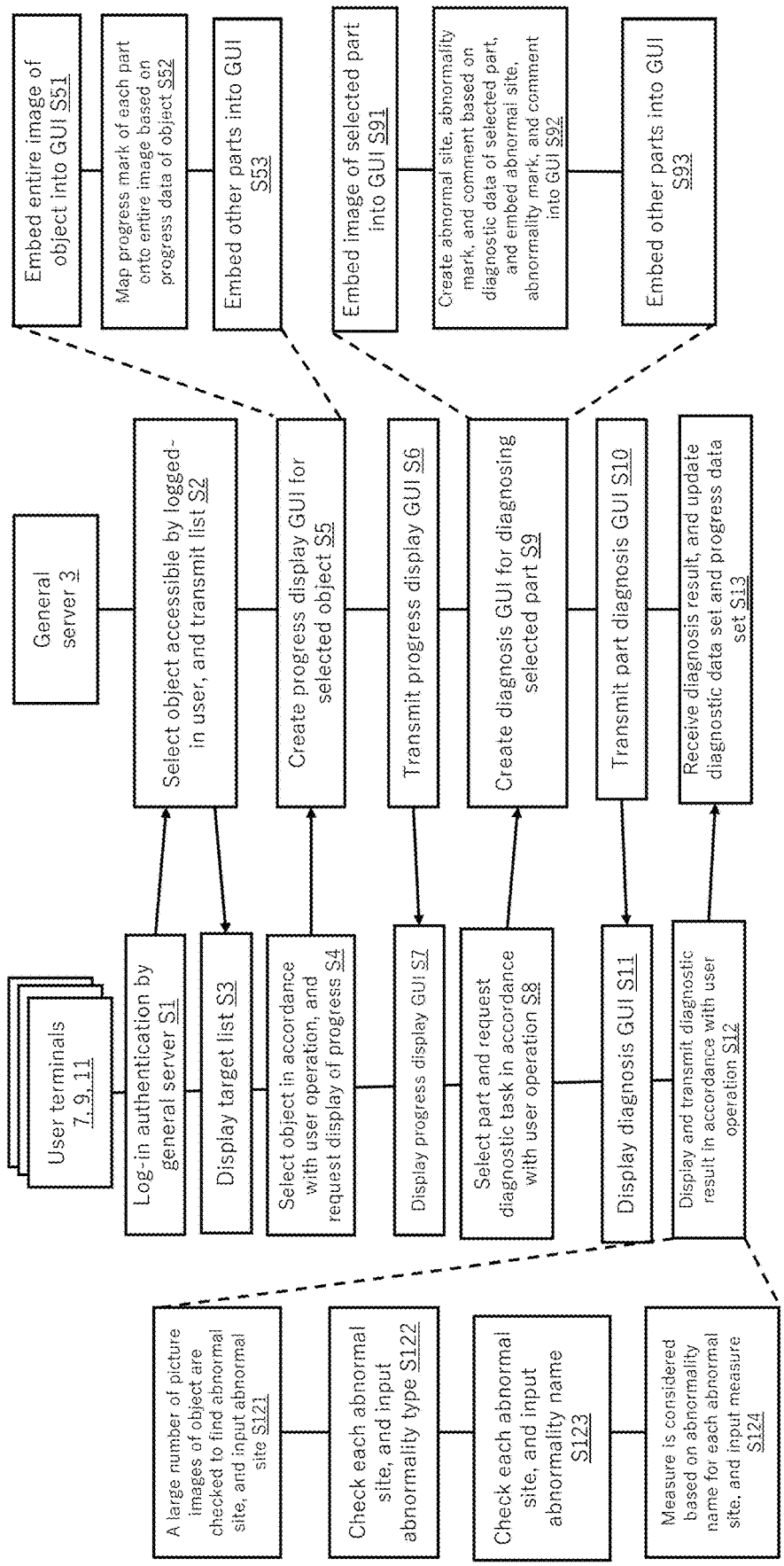
FIG. 4 is a flow chart illustrating a process of communication and control between each user terminal and the general server at a time when each user diagnoses an object.

FIG. 4 illustrates a process of communication and control between each user terminal 7, 9, or 11 and the general server 3 at a time when each user (each of customer, analyst, and expert) diagnoses an object.

The process of communication and control is basically similar to that for any type of user of the customer, the analyst, and the expert. However, the range of an object that can be diagnosed may differ depending on the user.

Referring to FIG. 4, each user logs in to the general server 3 via the user terminal 7, 9, or 11 (Step S1). The general server 3 selects an object accessible by the logged-in user, and transmits a list of selected accessible objects to the user terminal 7, 9, or 11 of the user (S2). The user terminal 7, 9, or 11 displays the list of accessible objects (S3).

When the user has selected any object from the displayed list of objects, the user terminal 7, 9, or 11 requests the general server 3 to display the progress of diagnosis of the selected object (S4). The general server 3, which has received the progress display request, creates a GUI for displaying the progress of the selected object (S5).

Figure 5:
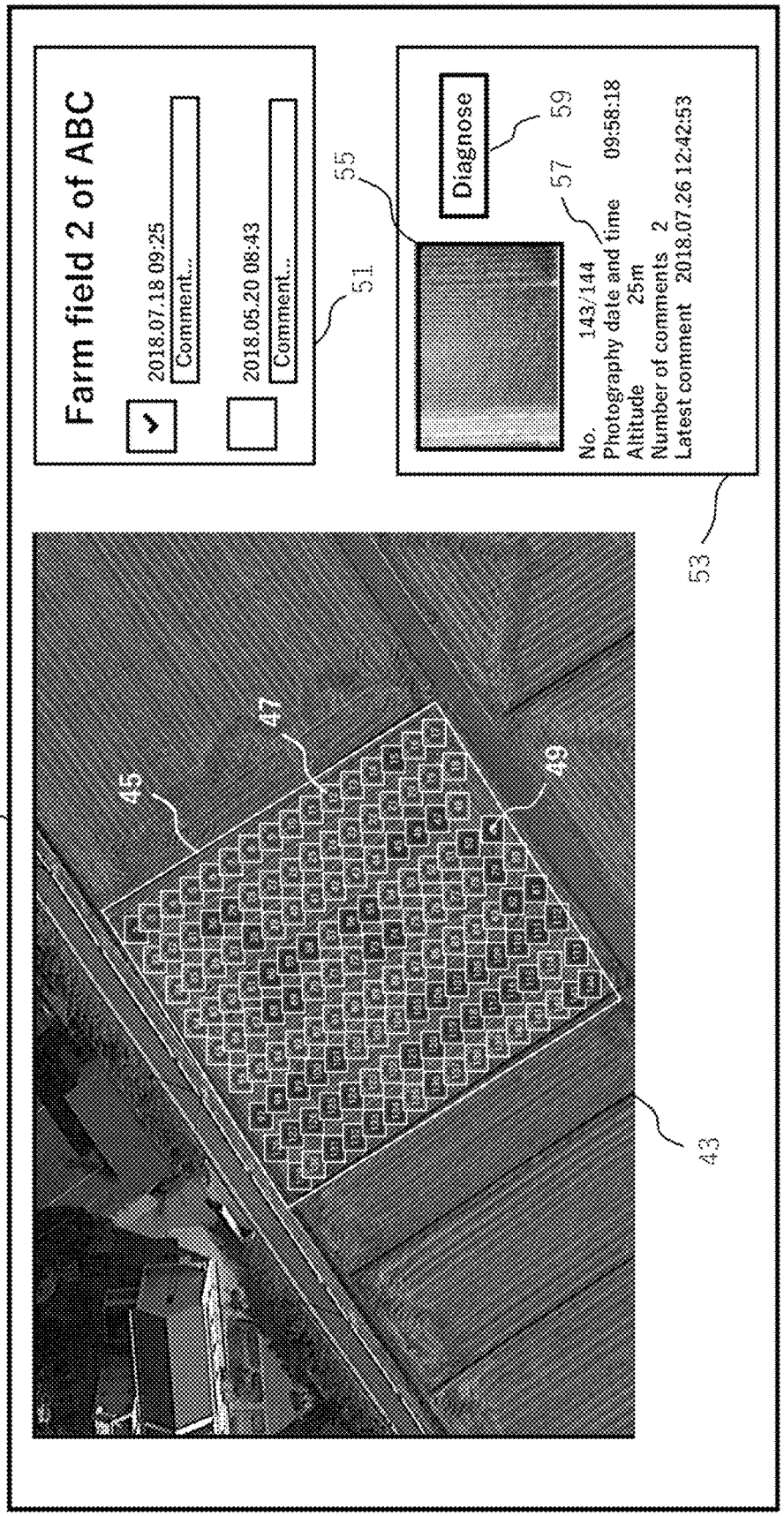
FIG. 5 is a diagram illustrating an example of a GUI for displaying progress of an object.

FIG. 5 illustrates an example of the GUI for displaying the progress of an object.

The progress display GUI 41 illustrated in FIG. 5 displays an entire image 43 that overlooks the entire view of the selected object 45 (for example, one form field). Progress marks 47 and 49 indicating an identification number of each of a large number of parts (for example, a large number of sub-areas obtained by partitioning one form field finely) forming the object and a color that depends on the degree of the progress of diagnosis are mapped onto the entire image 43. For example, a part assigned with a progress mark 47 of a first color indicates that no one has diagnosed the part, namely, "undiagnosed", and a part assigned with a progress mark 49 of a second color indicates that someone has already diagnosed the part (input a diagnostic result), namely, "diagnosed". In addition, when the user has clicked the progress mark 47 or 49 of any part on the entire image 43, the clicked part is selected as a diagnosis candidate.

The progress marks are not limited to two types of states as described above, namely, "undiagnosed" and "diagnosed", and for example, the progress marks may be categorized into a larger number of types of states such as "undiagnosed", "diagnosed by analyst", "diagnosed by customer", and "diagnosed by expert".

The progress display GUI 41 further includes an object outline display column 51 that displays overview information such as the name of the object 45 and a comment already input by some diagnoser. Furthermore, the progress display GUI 41 includes a part display column 53 that displays overview information of a part selected as a diagnosis candidate. The part display column 53 includes, for example, a part image 55 of the selected part, an overview description 57 of the part, and a diagnosis button 59. When the user has clicked the diagnosis button 59, the user can start to perform a diagnostic task of the selected part.

Referring back to FIG. 4, in Step S5, the general server 3 creates the progress display GUI 41 as described above. At that time, the general server 3 creates the entire image 43 or the part image 55 based on a data record relating to the object in the target data set 25, and embeds the entire image 43 or the part image 55 into the GUI 41 (S51). Furthermore, the general server 3 creates the progress mark 47 or 49 of each part based on a data record relating to the object in the progress data set 21, and maps the progress mark 47 or 49 onto the entire image 43 (S52). Furthermore, the general server 3 creates other parts on the GUI based on a data record relating to the object in the target data set 25 and the diagnostic data set 29, and embeds the other parts into the GUI 41 (S53).

The general server 3 transmits the created progress display GUI 41 to the user terminal 7, 9, or 11 that has requested display of the progress (S6). The user terminal 7, 9, or 11 displays the progress display GUI (S7). When the user has selected any part on the progress display GUI, the user terminal 7, 9, or 11 requests the general server 3 for a diagnostic task of the selected part (S8). When the general server 3 has received the above-mentioned diagnostic task request, the general server 3 creates a diagnosis GUI for performing a diagnostic task of the selected part (S9).

In Step S7 described above, the user checks the GUI for displaying the progress to know which part of the object is undiagnosed and which part of the object is diagnosed. In the next Step S8, when the user has selected an undiagnosed part, the user first diagnoses the selected part. On the other hand, when the user has selected a diagnosed part, the user can diagnose the part by referring to a diagnostic result obtained by another diagnoser before. As described above, the analyst selects an undiagnosed part, and the customer and the expert select a diagnosed part, so that it is possible to use the strength of each diagnoser and compensate for the weakness of each diagnoser in some cases.

Figure 6:
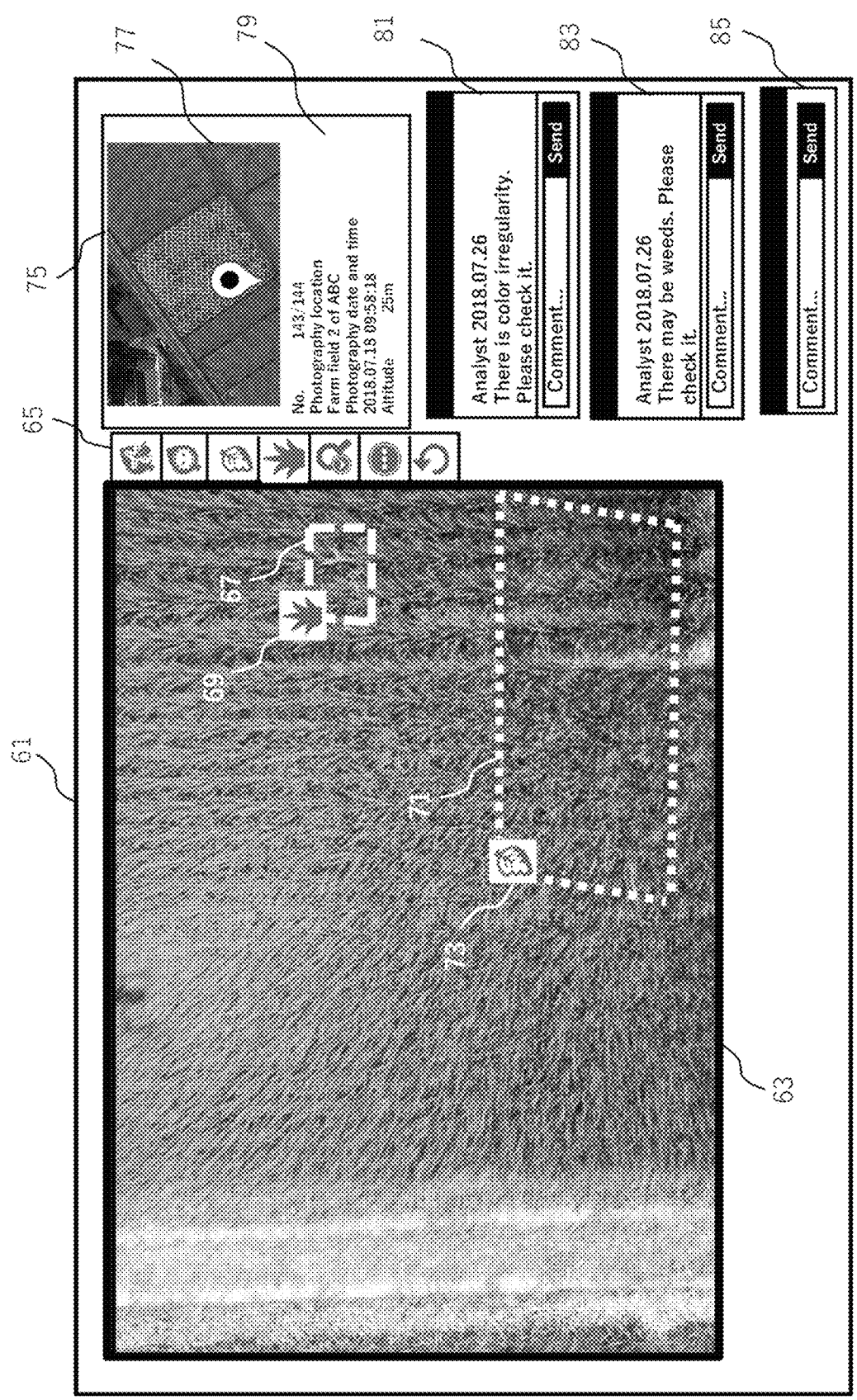
FIG. 6 is a diagram illustrating an example of a GUI for diagnosing a part of an object.

FIG. 6 illustrates an example of the diagnosis GUI.

The diagnosis GUI 61 illustrated in FIG. 6 displays a selected part image 63 representing the entire view of the selected part (for example, one sub-area selected from one form field). The user can specify any sites, which are considered to be abnormal, on the selected part image 63 by frames 61 and 71, and assign abnormality marks 69 and 73 indicating abnormality types (for example, pest, disease, color irregularity, and weed) to the frames 61 and 71 of the abnormal sites. The abnormality marks 69 and 73 can be selected from an abnormality mark list 65 on the diagnosis GUI 61 by a drag-and-drop operation, for example. The abnormality type indicated by the abnormality mark in the abnormality mark list 65 is, for example, "pest", "disease", "color irregularity", "weed", "check required (type is unclear or indefinite)", or "others" (in order from top to bottom on FIG. 6).

The diagnosis GUI 61 includes a selected part outline display column 75 for displaying an overview description 79 and a position display image 77 indicating the position of the selected part in the entire object. Furthermore, the diagnosis GU 61 includes, for example, comment columns 81, 83, and 85 for displaying a comment indicating the result of diagnosis of the selected part already input by another user or for inputting a comment (for example, new comment and comment on result of diagnosis by another user) on a new diagnostic result by each user.

In a case where one user has performed diagnosis of a part of an object by using the diagnosis GUI 61, after that, when the diagnosis GUI 61 for the same part is displayed for any other users, the result of diagnosis (for example, abnormal site frames 61 and 71, abnormality marks 69 and 73, and comments) by the user who has performed diagnosis before is displayed on the diagnosis GUI 61. As a result, the diagnostic results input by different users for the same part are shared by the different users. As a result, for example, the customer, the analyst, and the expert can cooperate with one another to alleviate the work load of each person and compensate for the diagnostic capabilities.

Referring back to FIG. 4, in Step S9, the general server 3 creates the diagnosis GUI 61 as described above. At that time, the general server 3 creates the selected part image 63 or the position display image 77 based on a data record of the object and a data record of the selected part in the target data set 25, and embeds the selected part image 63 or the position display image 77 into the GUI 61 (S91). Furthermore, the general server 3 creates the abnormal site frames 67 and 71, the abnormality marks 69 and 73, and the comment columns 81, 83, and 85 of the selected part based on the data record relating to the selected part in the diagnostic data set 29, and embeds the abnormal site frames 67 and 71, the abnormality marks 69 and 73, and the comment columns 81, 83, and 85 into the GUI 61 (S92). Furthermore, the general server 3 creates other parts of the GUI 61, and embeds the other parts into the GUI 61 (S93).

The general server 3 transmits the created diagnosis GUI 61 to the user terminal 7, 9, or 11 that has requested a diagnostic task (S10). The user terminal 7, 9, or 11 displays the diagnosis GUI (S11). When the user has input, for example, an abnormal site, an abnormality type, and a comment, the user terminal 7, 9, or 11 displays the diagnostic result on the diagnosis GUI, and then transmits the diagnostic result to the general server 3 (S12).

The general server 3, which has received the diagnostic result, registers a data record of the diagnostic result in the diagnostic data set 29, and updates the diagnostic data set 29 together with the progress data set 21 (S13).

In Step S12 described above, the user performs a diagnostic task of an object while checking the diagnosis GUI. In the case of complex diagnosis, one complete diagnostic task can be divided into a plurality of stages (a plurality of sub-diagnoses). For example, the example of a diagnostic task illustrated in Steps S121 to S124 of FIG. 4 is an example of a case in which a form field is diagnosed by checking several hundreds or thousands of pictures of the form field, which are photographed by a camera drone, and includes the following four sub-diagnoses.

(1) First Sub-Diagnosis (FIG. 4, S121)

In this task, several hundreds or thousands of picture images of one form field are checked in detail, a site (for example, a site in which disease, damage by pest, or underdevelopment has occurred) that is considered to be abnormal based on the region of the form field is detected, and the abnormal site is input to the user terminal. This task corresponds to an operation of inspecting the selected part image 63, detecting abnormal sites in the selected part image 63, and specifying the abnormal sites by the respective frames 67 and 71 on the diagnosis GUI 61 illustrated in FIG. 6. In the first sub-diagnosis, several hundreds or thousands of picture images are required to be checked in detail, and thus the work load is substantially large. Meanwhile, the diagnostic capabilities required for the first sub-diagnosis may be lower than the diagnostic capabilities required for the third and fourth sub-diagnoses described later.

(2) Second Sub-Diagnosis (FIG. 4, S122)

In this task, the abnormality type (for example, pest, disease, color irregularity, or weed) is identified for each abnormal site detected in the first sub-diagnosis, and the abnormality type is input to the user terminal. This task corresponds to determining or estimating an abnormality type by checking the abnormal site frames 67 and 71 and assigning the abnormality marks 69 and 73 corresponding thereto in the example of the diagnosis GUI 61 illustrated in FIG. 6, for example. The diagnostic capabilities required for the second sub-diagnosis may be lower than the diagnostic capabilities required for the third and fourth sub-diagnoses described later.

(3) Third Sub-Diagnosis (FIG. 4, S123)

In this task, a specific name (for example, a pest name, a disease name, a color irregularity cause, or a weed name) of an abnormality is identified for each of the abnormal sites detected in the first sub-diagnosis in the form field by referring to an abnormality type assigned in the second sub-diagnosis, and the specific abnormality name is input to the user terminal. For example, in the example of the diagnosis GUI 61 illustrated in FIG. 6, this corresponds to inputting abnormality names to the comment columns 81, 83, and 85 for each abnormal site (abnormality name is not input yet in the example of FIG. 6). Alternatively, this task corresponds to displaying an abnormality name list prepared in advance (the list is not displayed in the example of FIG. 6) in the example of the diagnosis GUI 61 illustrated in FIG. 6, selecting an abnormality name from the list, and assigning the abnormality name to each abnormal site. In the third sub-diagnosis, several hundreds or thousands of picture images are not required to be checked in detail by using the results of first and second sub-diagnoses, and thus the work load becomes smaller than that of the first sub-diagnosis. Meanwhile, the diagnostic capabilities required for the third sub-diagnosis are higher than the diagnostic capabilities required for the first and second sub-diagnoses.

(4) Fourth Sub-Diagnosis (FIG. 4, S124)

In this task, a picture image of each abnormal site is checked, a measure (for example, the name and amount of pesticides to be spread or the name and amount of fertilizers to be applied) for removing or solving the abnormality is identified based on the abnormality name obtained in the third sub-diagnosis, and the measure is input to the user terminal. For example, in the example of the diagnosis GUI 61 illustrated in FIG. 6, this corresponds to inputting measures to the comment columns 81, 83, and 85 for each abnormal site (the measure is not input yet in the example of FIG. 6). Alternatively, this task corresponds to displaying a measure list prepared in advance (the list is not displayed in the example of FIG. 6) in the example of the diagnosis GUI 61 illustrated in FIG. 6, selecting a measure from the list, and assigning the abnormality name to each abnormal site. In the fourth sub-diagnosis, several hundreds or thousands of picture images are not required to be checked in detail by using the results of first to third sub-diagnoses, and thus the work load becomes smaller than that of the first sub-diagnosis. Meanwhile, the diagnostic capabilities required for the fourth sub-diagnosis are higher than the diagnostic capabilities required for the first and second sub-diagnoses.

When such a complete diagnostic task includes a plurality of stages of sub-diagnoses, one user can perform all of the sub-diagnoses, but the work load on one user becomes too large or the diagnostic capabilities required for one user become too high, which means that it is realistically difficult for one user to perform the diagnostic task.

In view of this, in the diagnostic assistance system 1 according to this embodiment, each user is not required to perform all of the plurality of sub-diagnoses, and may select and perform only a part of the sub-diagnoses (for example, one or two sub-diagnoses). Thus, a plurality of users can perform a plurality of stages of sub-diagnoses by taking over those sub-diagnoses in order. As a result, it is possible to perform diagnosis practically and efficiently. The method of sharing the task is desirably to cause a plurality of types of users, namely, a customer, an analyst, and an expert to perform sub-diagnosis appropriate for the users by utilizing different characteristics and situations of the users.

An example of sharing the task is described below.

First, an appropriate task to be shared by a plurality of analysts is a task that requires investigation of a large amount of data, but does not require high diagnostic capabilities. For example, in the example of diagnosis of a form field described above, the analysts are desired to mainly perform first sub-diagnosis (identification of abnormal site) or second sub-diagnosis (identification of abnormality type). In the first and second sub-diagnoses, several hundreds or thousands of pictures of one form field are required to be checked in detail, but meanwhile, the first and second sub-diagnoses can be performed with such diagnostic capabilities as to distinguish between abnormality types, and thus are appropriately shared by a plurality of analysts. The plurality of analysts can efficiently start the first and second sub-diagnoses by selecting only a part assigned with the progress mark 47 indicating "undiagnosed" on the progress display GUI 41 as illustrated in FIG. 5.

The customer may perform all the sub-diagnoses as a person with the final authority who manages or holds an object, and in particular, mainly performs third sub-diagnosis (identification of abnormality name) and fourth sub-diagnosis (identification of measure) to alleviate the work load. In other words, the customer uses the results of the first sub-diagnosis and the second sub-diagnosis performed by the analysts before, to thereby alleviate the work load of the customer. The customer can efficiently start the third and fourth diagnoses by selecting only a part assigned with the progress mark 49 indicating "diagnosed" on the progress display GUI 41 as illustrated in FIG. 5.

The expert mainly performs third sub-diagnosis (identification of abnormality name) and fourth sub-diagnosis (identification of measure) to utilize his or her high diagnostic capabilities. The expert may play only the role of supporting diagnosis by the customer so that the expert is not forced to bear an excessive work load. In other words, for example, the expert does not always perform third sub-diagnosis (identification of abnormality name) and fourth sub-diagnosis (identification of measure) from the first, but may perform only the task of checking the results of third sub-diagnosis (identification of abnormality name) and fourth sub-diagnosis (identification of measure) input by the customer, and correcting or supporting those results as necessary. Alternatively, the expert may process a requested task only when the expert has received a diagnosis request (for example, question or check request) from the customer.

As described above, the analyst, the customer, and the expert can share a plurality of stages of tasks for completing a diagnostic task, to thereby support one another and improve the efficiency and accuracy of diagnosis. The customer can obtain an appropriate diagnostic result for an object managed or held by himself or herself without bearing a large work load by receiving help from the analyst or the expert while the diagnostic capabilities of the AI server 5 are low.

Furthermore, in the system according to this embodiment, the analyst, the customer, and the expert can share diagnostic results obtained by themselves and the AI server 5 by checking those results on the diagnosis GUI 63. As a result, in particular, a diagnoser (for example, inexperienced analyst or customer) with low diagnostic capabilities can improve his or her diagnostic capabilities based on the diagnostic result of a diagnoser having higher diagnostic capabilities. This leads to improvement in efficiency and accuracy of diagnosis of the entire system. In particular, even a person (for example, a person who owns a form field that is not managed by an agricultural cooperative or an agricultural experiment station) who cannot directly receive the help of the expert can indirectly receive the help of the expert of another form field through analysts as long as those analysts have learned a diagnostic result of an expert in a diagnostic task of a form field of another customer.

Furthermore, in the system according to this embodiment, it is possible to prepare training data for machine learning by the AI server 5 by using diagnostic results obtained by the analyst, the customer, and the expert. In other words, it is possible to provide the customer with a diagnostic assistance service while at the same time training the AI server 5 in the background, and then provide the customer with an automated diagnosis service that utilizes the result of training.

Figure 7:
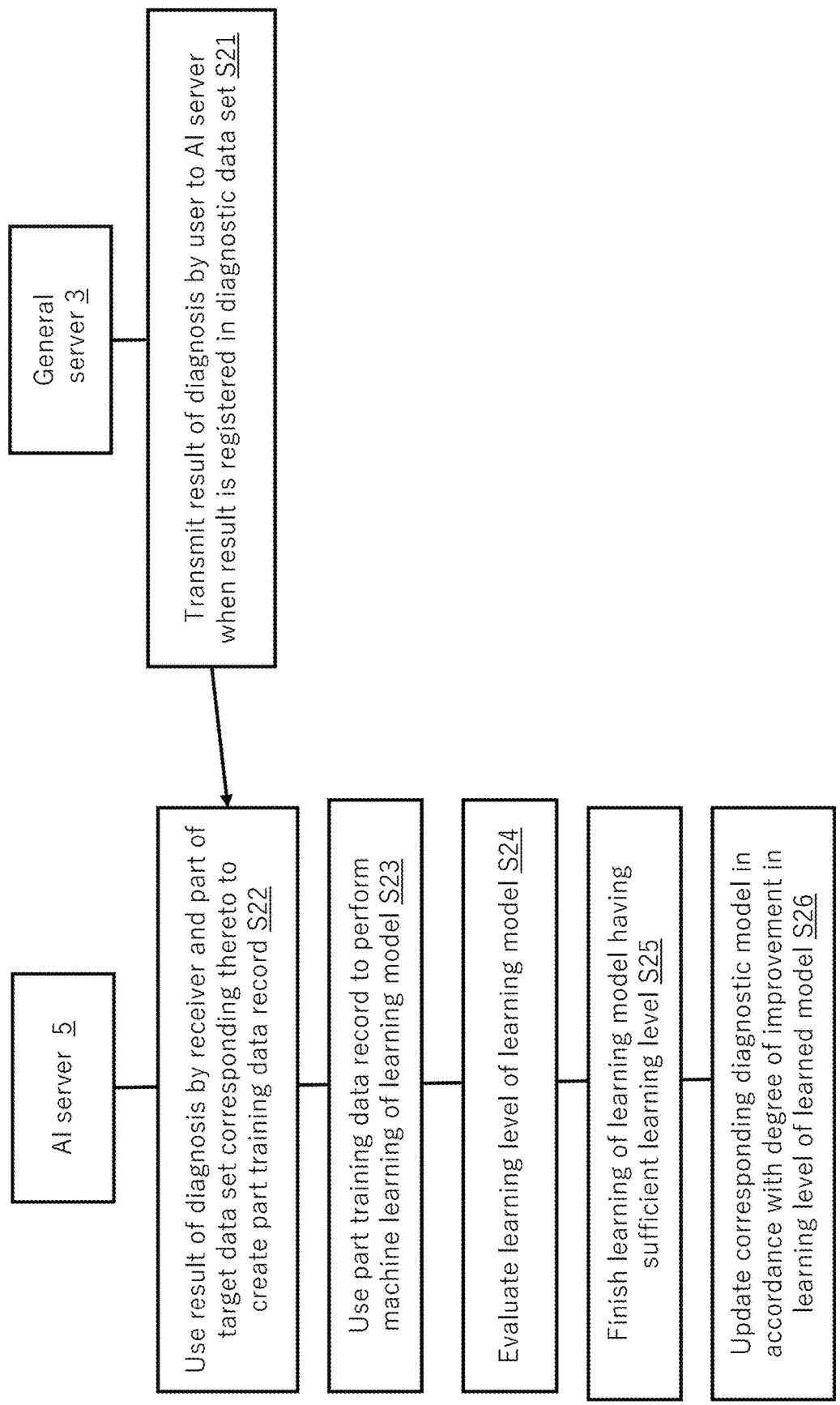
FIG. 7 is a flow chart illustrating a process of communication and control between the AI server and the general server at a time when the AI server performs machine learning of a diagnostic method.

FIG. 7 illustrates a process of communication and control between the AI server 5 and the general server 3 at a time when the AI server 5 performs machine learning of a diagnostic method.

When the result of diagnosis by the user (analyst, customer, or expert) is registered in the diagnostic data set 29 for each part of a known or new object, the general server 3 transmits the diagnostic result to the AI server 5 (S21). The AI server 5 uses the diagnostic result of each part of the object received from the general server 3 and the part data record 253 of each part of that object to create the part training data record 353 for each part, and registers the part training data record 353 in the individual training data record 351 corresponding to the object in the training data set 35 (S22). At this time, when a plurality of users have already performed diagnosis of the same part, as described above, the AI server 5 creates the part training data record 353 of the part by integrating the results of diagnosis by the plurality of users so as to match one another or by prioritizing the result of diagnosis by a user with a higher priority when those diagnostic results contradict one another.

After that, the AI server 5 uses the part training data record 353 to perform machine learning of one or more learning models for diagnosis of the object in the learning model set 33 (S23). After that, the AI server 5 evaluates the learning level (training accuracy) of the learning model (S24). Then, the AI server 5 finishes machine learning for a learning model evaluated to be improved sufficiently (S25).

Then, the AI server 5 updates the diagnostic model corresponding to the learning model as the copy of the latest learning model depending on the level of improvement in learning level of the learning model evaluated in Step S24 (S26). For example, the diagnostic level may be updated every time the learning level (diagnostic accuracy) is improved by some proportion or every time the amount of training data already used for learning has increased by a predetermined amount. In this manner, automated diagnosis capabilities of the AI server 5 are improved while the diagnostic assistance service is provided.

Figure 8:
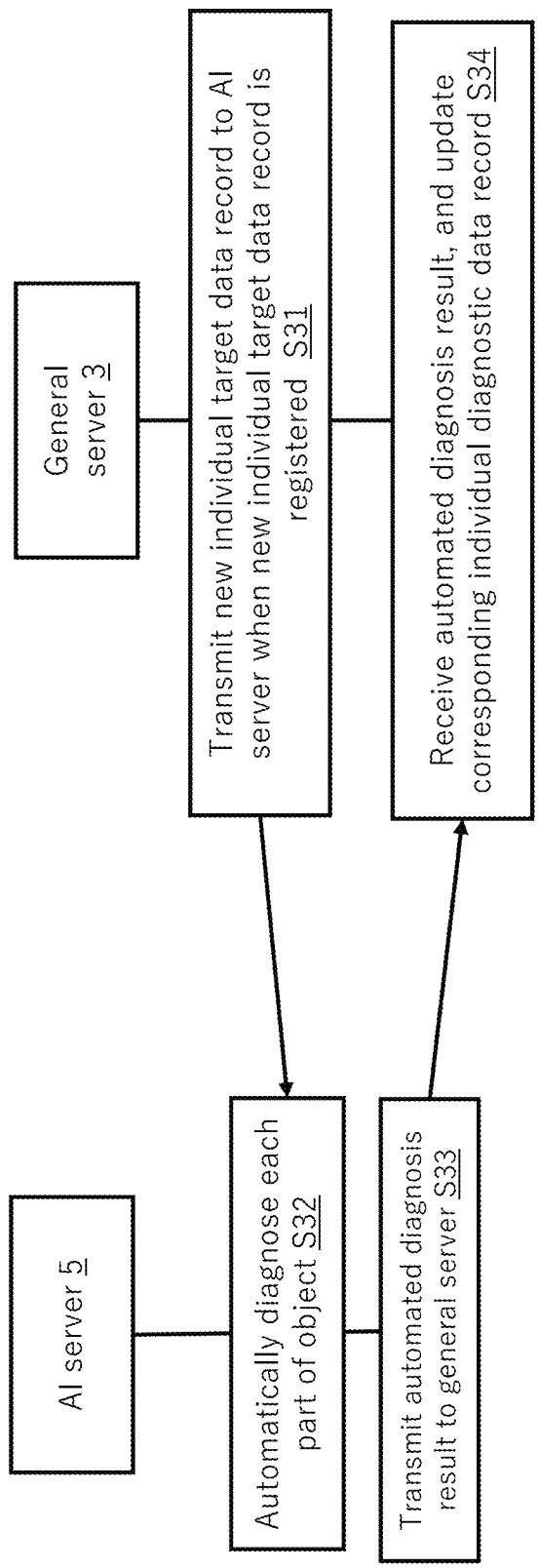
FIG. 8 is a flow chart illustrating a process of communication and control between the AI server and the general server at a time when the AI server performs diagnosis.

FIG. 8 illustrates a process of communication and control between the AI server 5 and the general server 3 at a time when the AI server 5 performs diagnosis.

When a new individual target data record 251 is registered in the target data set 25 for a known object or a new object, the general server 3 transmits the individual target data record 251 to the AI server 5 (S31). The AI server 5 inputs the plurality of part data records 253 included in the individual target data record 251 into one or more diagnostic models that are in charge of diagnosing the object in the diagnostic model set 37, to thereby obtain an automated diagnosis result for each part of the object based on the diagnostic models (S32).

After that, the AI server 5 returns the automated diagnosis results of those parts to the general server 3 (S33). The general server 3 stores the automated diagnosis result of each part of the object, which has been received from the AI server 5, into the individual diagnostic data record 291 of the corresponding object in the diagnostic data set 29 as the individual diagnostic task record 293.

The automated diagnosis result of each part of the object obtained by the AI server 5, which is stored in the diagnostic data set 29, is checked and shared by a plurality of users such as a customer, an analyst, and an expert via the diagnosis GUI 63 of each part. The automated diagnosis result is not reliable while the diagnostic capabilities of the AI server 5 are low, but the degree of reliability of the automated diagnosis result becomes larger as the diagnostic capabilities of the AI server 5 become higher.

Figure 9:
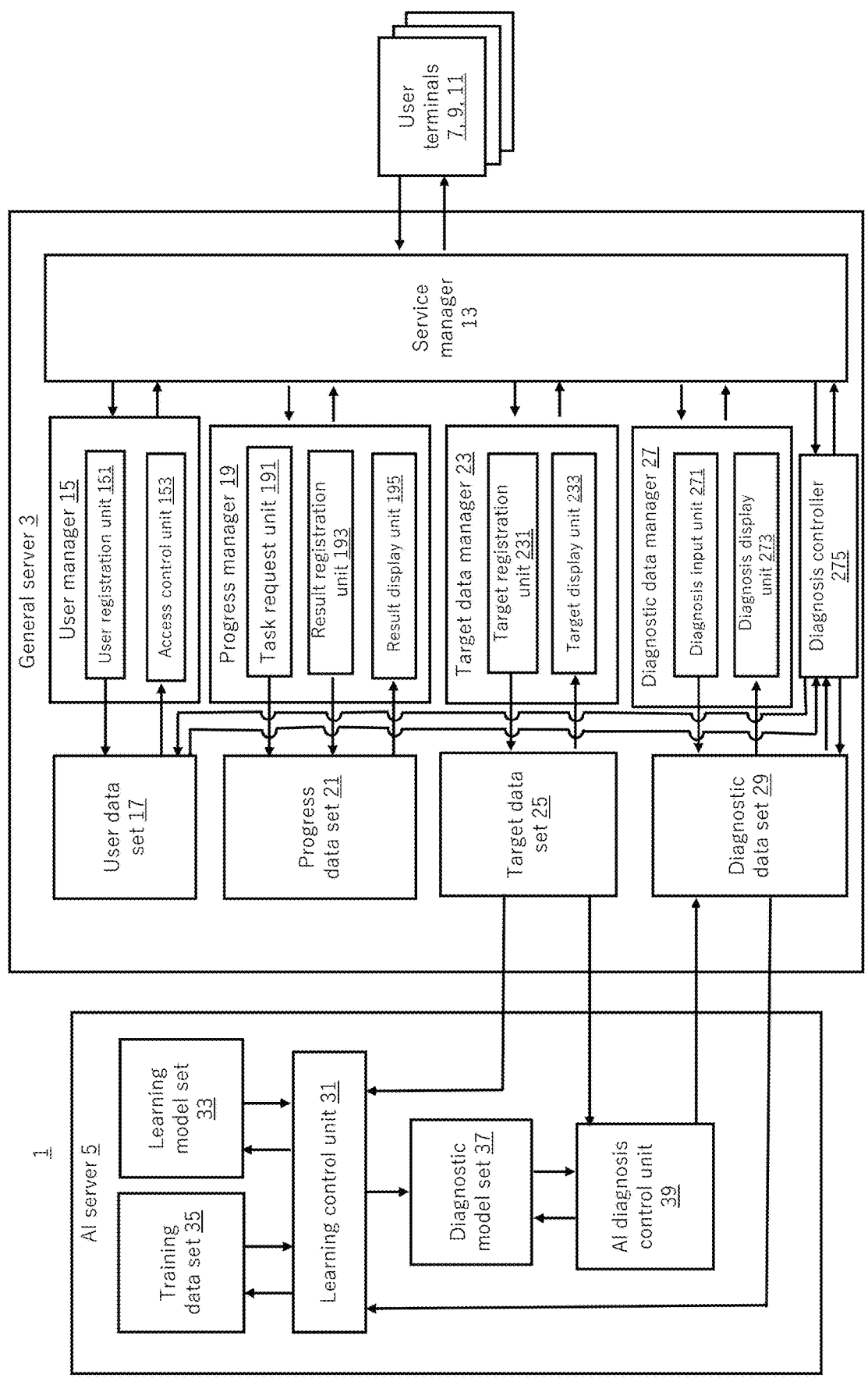
FIG. 9 is a block diagram illustrating a functional configuration of the diagnostic assistance system illustrated in FIG. 2 to which a diagnostic controller is added.

FIG. 9 illustrates a functional configuration of the diagnostic assistance system 1 illustrated in FIG. 2 to which an improvement for further alleviating the work load of the user is made. As illustrated in FIG. 9, the general server 3 includes a diagnostic controller 275 in addition to the configuration illustrated in FIG. 2. The diagnostic controller 275 can access the diagnostic data set 29 and the user data set 17, and performs control for further alleviating the load of the diagnostic task of the user.

The diagnostic control by the diagnostic controller 275 is applied to one or more processes among processes of a plurality of stages of sub-diagnoses illustrated in FIG. 4 described above, namely, the abnormality detection S121, the abnormality type identification S122, the abnormality name identification S123, and the measure identification S124. In the following, description is given in detail of an exemplary case in which the diagnostic control is applied to the abnormality detection S121, for example, sub-diagnosis of detecting a weed from an image of a form field. A person skilled in the art would easily understand details of a case in which the diagnostic control is applied to other diagnostic processes on the basis of the exemplary description.

Figure 10:
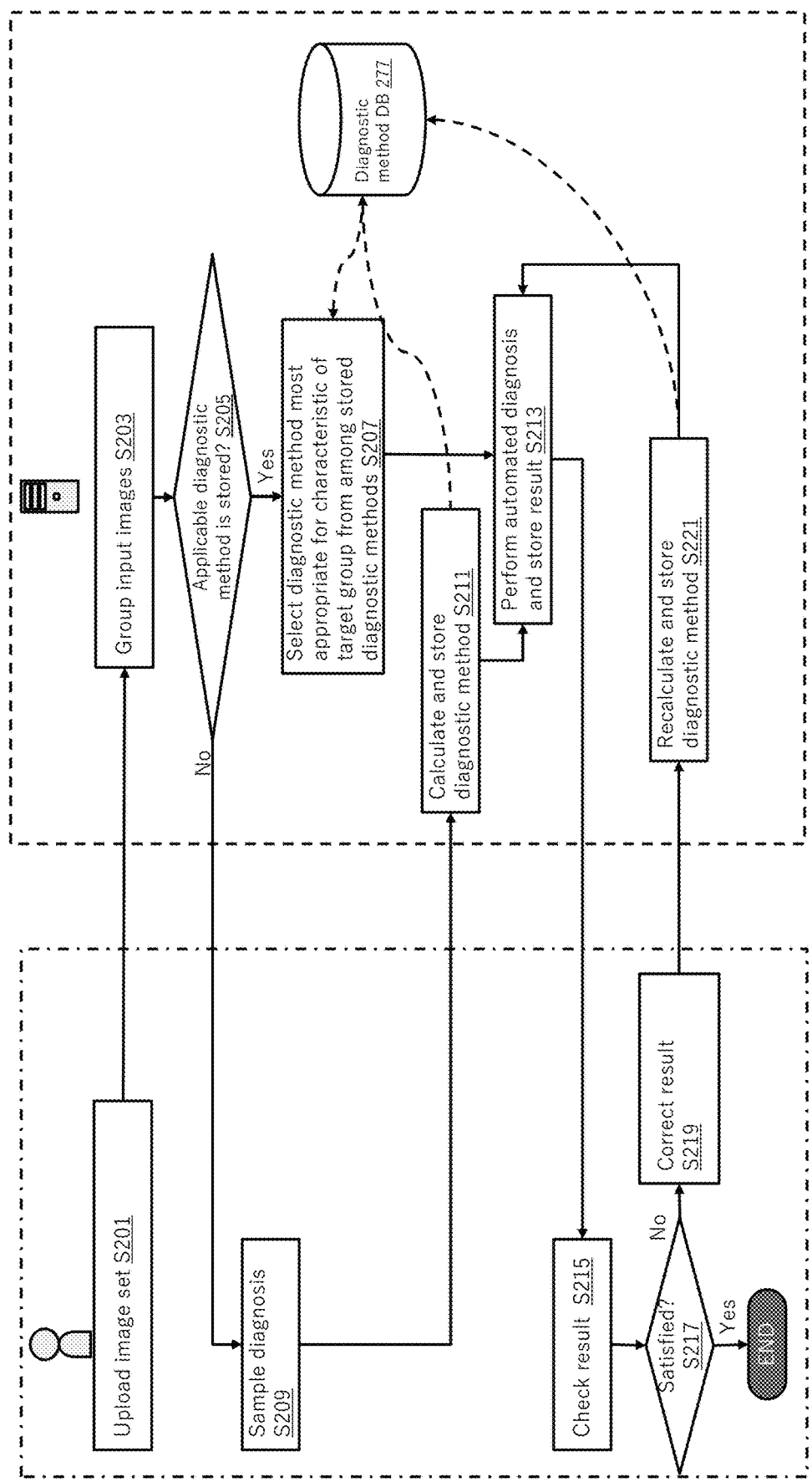
FIG. 10 is a flow chart illustrating a flow of diagnostic control, which is performed by a diagnostic controller applied to detection of a weed in a form field, in association with a flow of operations to be performed by the user.

FIG. 10 illustrates a flow of diagnostic control, which is performed by the diagnostic controller 275 applied to detection of a weed in a form field, in association with a flow of operations to be performed by the user.

In FIG. 10, the flow enclosed by a broken line indicates a flow of control to be performed by the diagnostic controller 275 of the general server 3, and a flow enclosed by a long dashed short dashed line indicates a flow of operations to be performed by the user under the control. As illustrated in FIG. 10, in Step S201, the user (typically, customer) uploads a set of images (a large number of picture images, for example, several hundreds or thousands of picture images) to the general server 3. The diagnostic controller 275 of the general server 3 groups the set of images (S203).

Figure 11:
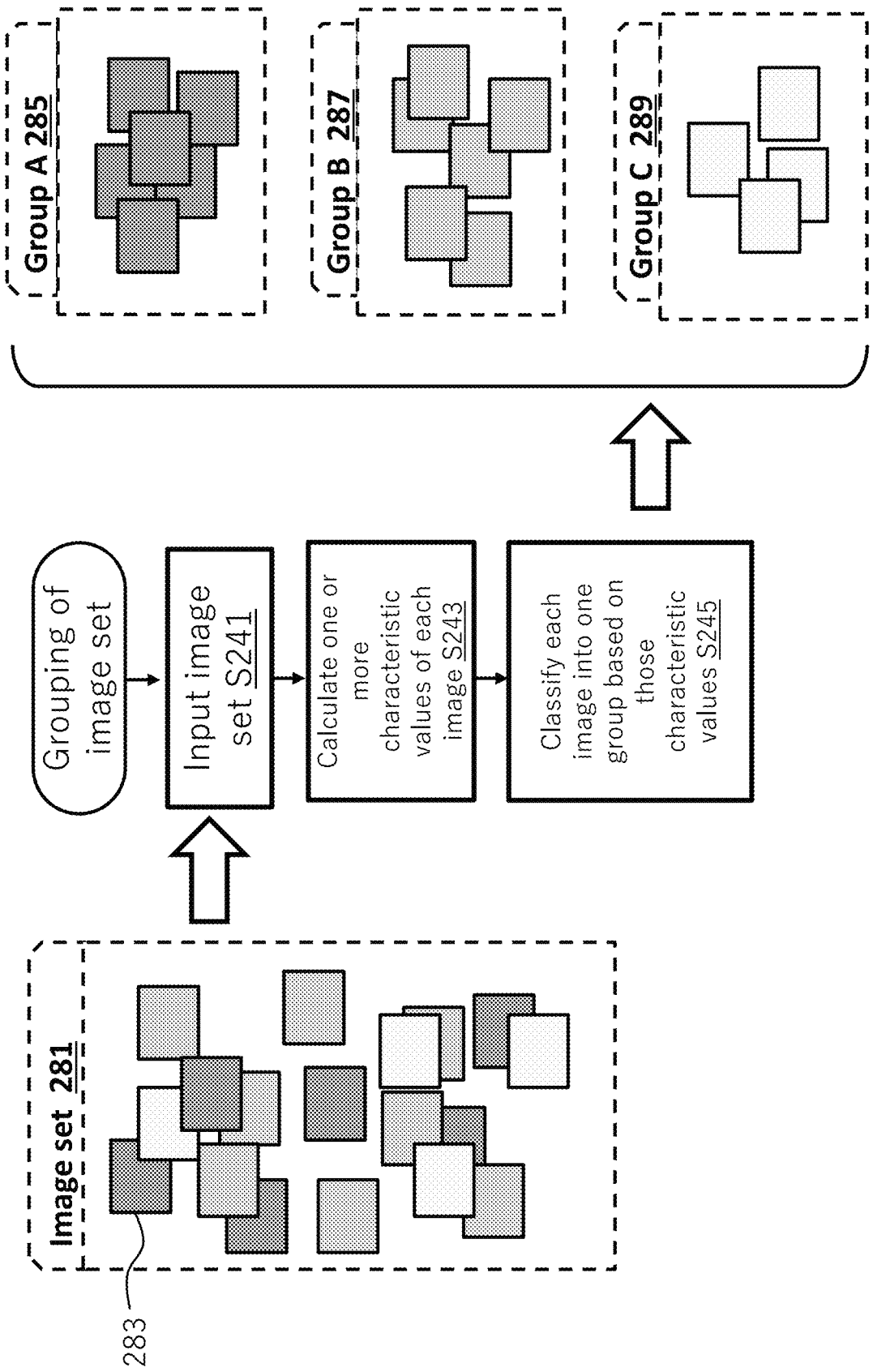
FIG. 11 illustrates an outline of grouping a set of images in diagnostic control.

As illustrated in FIG. 11, in the grouping of Step S201, the diagnostic controller 275 inputs the set of images 281 (S241), and calculates one or more characteristic values for each image 283 in the set of images 281 (S243). After that, the diagnostic controller 275 classifies each image 283 into one of one or more image groups 285 to 289 based on one or more characteristic values of each image 283 so that one or more images having the same or similar characteristic values are classified into the same image group (S245). As the above-mentioned one or more characteristics to be used for grouping, for example, a photographing condition such as the photography date and time of the form field, the location of the form field, the weather at the time of photography, or a white balance adjustment value of the camera, a condition of the form field such as the type of a crop, and a condition of the image such as the distribution of brightness, hue, and saturation of the image may be adopted. An accurate diagnostic result cannot be obtained unless different diagnostic methods (for example, weed detection methods) that depend on respective characteristic values are applied to a plurality of images having greatly different characteristic values. However, through the above-mentioned grouping, the same diagnostic method that suits the range of characteristic values of the image group is applied to a plurality of images of the same image group, to thereby obtain an accurate diagnostic result.

Referring back to FIG. 10, in Step S205, the diagnostic controller 275 checks whether a diagnostic method that may be applicable to the input image set (or each of image groups included in the input image set) is already stored in a diagnostic method database 277 managed by the diagnostic controller 275. As a result, when a diagnostic method that may be applicable to the image set (or certain image group) is not found in the diagnostic method database 277 (No in S205), the diagnostic controller 275 does not perform automated diagnosis of Step S213 described later for the image set (or image group thereof) at this time point.

On the other hand, as a result of checking of Step S205 described above, when one or more diagnostic methods that may be applicable to the input image set (or each of image groups included in the input image set) is found in the diagnostic method database 277 (Yes in S205), the diagnostic controller 275 selects, from one or more found diagnostic methods, one diagnostic method determined to be most appropriate to the characteristic (for example, the range of one or more characteristic values of the group described above) of each image group (S207). Then, the diagnostic controller 275 uses the selected diagnostic method for each image group to perform automated diagnosis (for example, detection of a weed) for all the images (or images covering broader region than image region subjected to sample diagnosis) of the image set of the object (S213). Details of the automated diagnosis of Step S213 are described later.

When the result of checking of Step S205 described above results in No, automated diagnosis is not performed for the image set (or corresponding image group) at that stage. In this case, when the user (typically, analyst or customer) accesses each image of the image set (or corresponding image group), the user can view an image that does not include any diagnostic result. Then, the user can perform simple diagnosis referred to as "sample diagnosis" in this specification while at the same time viewing the undiagnosed image (S209).

The "sample diagnosis" performed in Step S209 described above refers to diagnosis manually performed by the user to select a small number of images from an image set (for example, a large number of picture images of the form field) of one object (for example, form field) as sample images, and diagnose (for example, detect a weed) only the small number of sample images. This diagnosis puts a small burden on the user. In this case, the user is not required to diagnose all the regions of each sample image, and may diagnose only a part of the regions. For example, all the weeds are not required to be found in one sample image, and a part of the weeds, namely, several weeds may be found.

Figure 12:
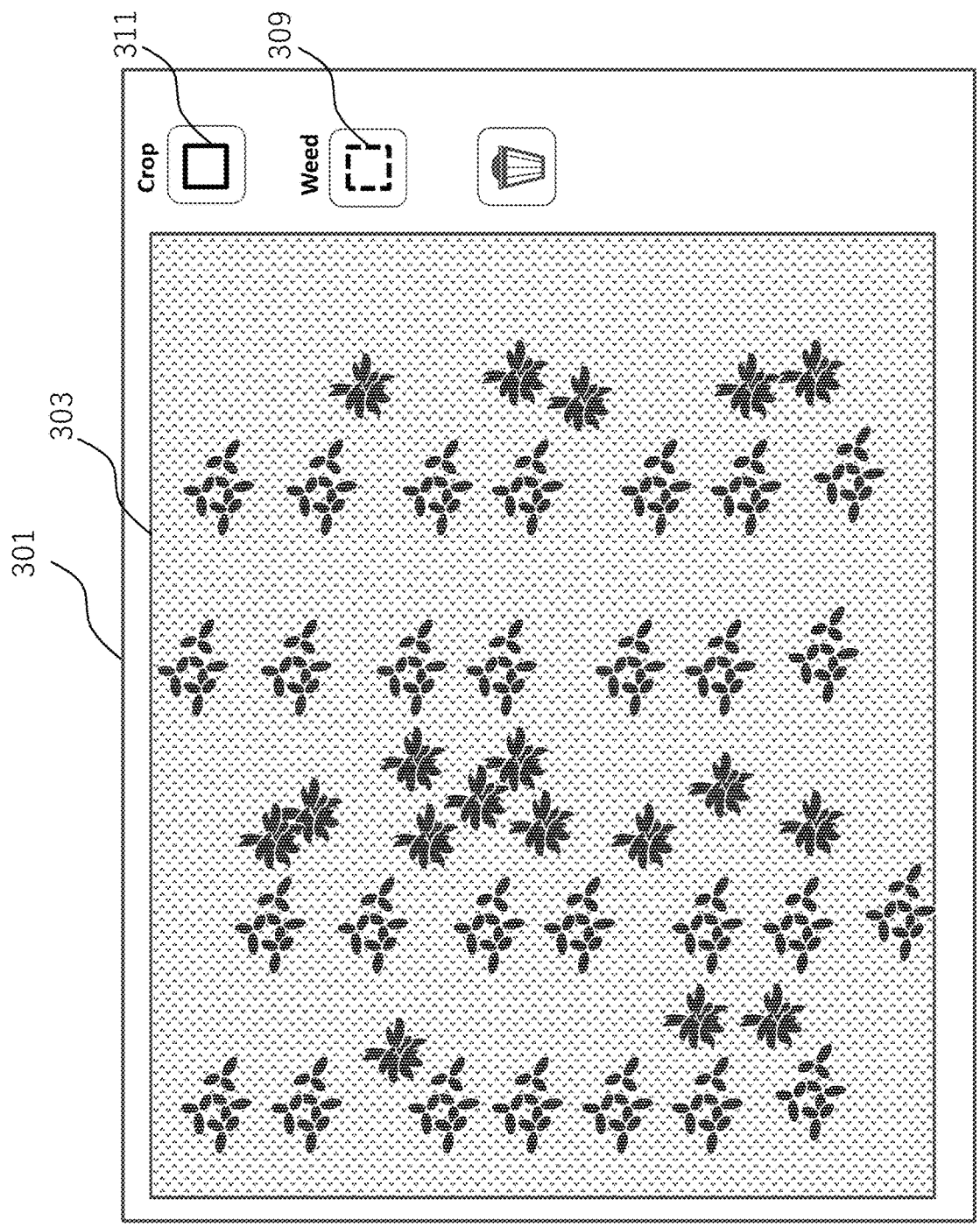
FIG. 12 illustrates an example of a GUI to be displayed on a user terminal at the time of start of sample diagnosis.

FIG. 12 illustrates an example of a GUI to be presented to a user at the time of start of sample diagnosis of Step S209 described above. One selected sample image 303 is displayed on the GUI 301 illustrated in FIG. 12, and no diagnostic result is displayed on the sample image 303. The GUI 301 further includes several diagnostic result input tools, for example, a weed (target object) specification tool 309 for specifying a weed being an object to be detected, and a crop (excluded object) specification tool 311 for specifying a crop to be excluded from detection. The user can use those tools 309 and 311 to perform sample diagnosis of the sample image 303.

Figure 13:
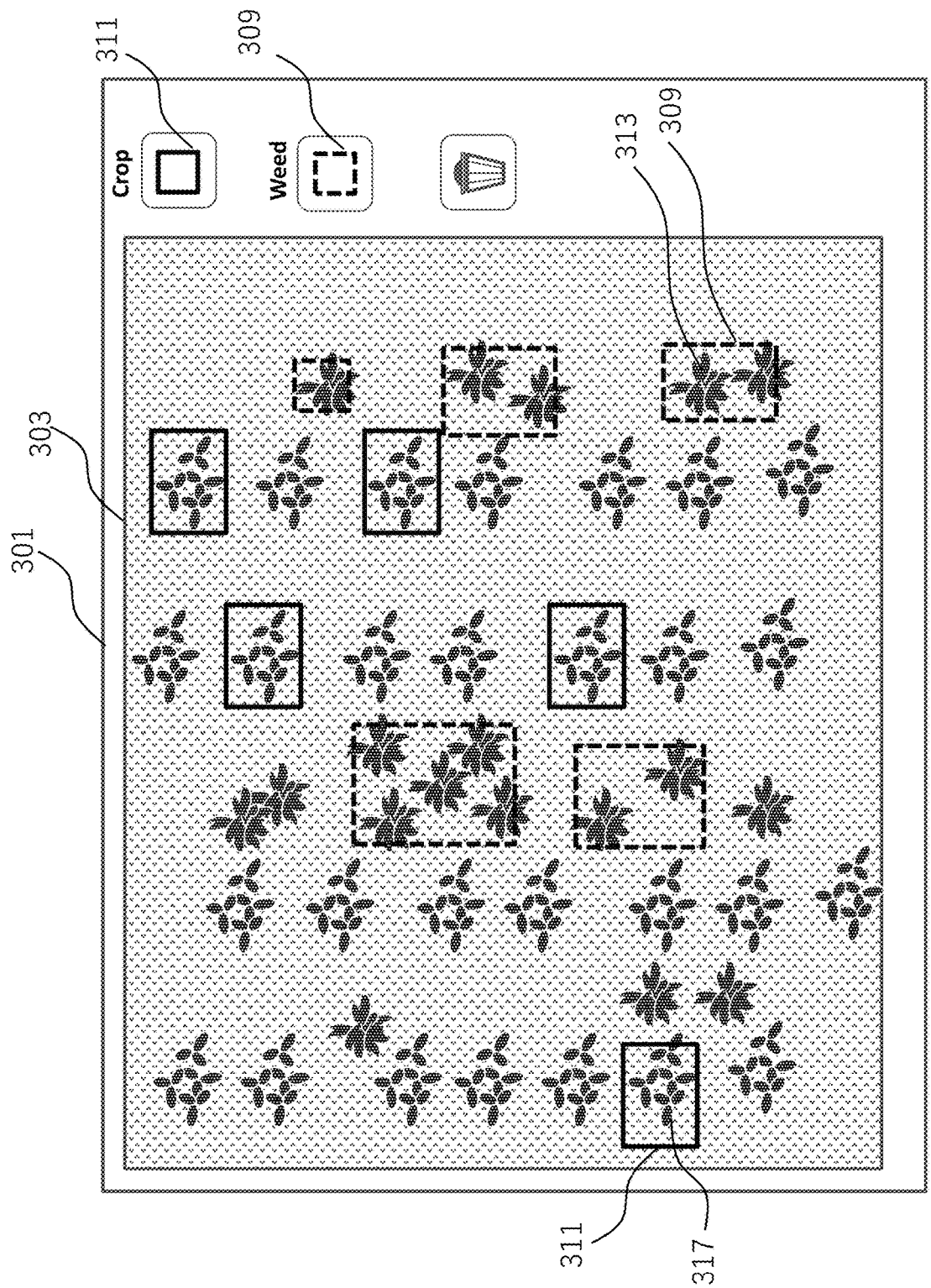
FIG. 13 illustrates an example of a GUI to be displayed on the user terminal when the user is performing sample diagnosis.

FIG. 13 illustrates an example of the situation of the GUI 301 at a time when the user is performing sample diagnosis (or has finished sample diagnosis) on the GUI 301 described above. As illustrated in FIG. 13, the user specifies any (typically, not all but one or more of the part) weed (target object) 313 from the sample image 303 by the weed (target object) specification tool (for example, square frame) 309. Preferably, the user further specifies any (typically, not all but one or more of the part) weed (excluded object) 317 from the sample image 303 by the crop (excluded object) specification tool (for example, square frame) 311. In the following description, a part of weeds (target object) specified as described above in sample diagnosis is referred to as "sample weed (sample target object)", a part of crops (excluded object) specified is referred to as "sample crop (sample-excluded object)", and both the objects are collectively referred to as "sample object".

Reference is drawn to FIG. 10 again. When sample diagnosis of Step S209 described above has finished, the result of sample diagnosis is input to the diagnostic controller 275 of the general server 3. Then, the diagnostic controller 275 uses the result of sample diagnosis to automatically calculate a diagnostic method, and store the calculated diagnostic method (S211).

The "diagnostic method" described above is a diagnostic method to be used for automated diagnosis of Step S213 described later, and a specific mode differs depending on the type of a computer system that performs automated diagnosis held by the diagnostic controller 275. An example of the type of the computer system for automated diagnosis is a computer system that performs diagnosis such as weed detection by using an image analysis algorithm programmed in advance. When this type of automated diagnosis system is used, a set of various kinds of control parameters for controlling a determination operation of the image analysis algorithm programmed in advance can be adopted as the above-mentioned diagnostic method. The set of control parameters may include, for example, control parameters such as a determination threshold value, a comparison criterion value, or an extraction range to be applied to one or more image characteristic values (for example, brightness, saturation, hue, pattern shape, pattern size, or statistic value such as a variance thereof) for distinguishing between an image of a weed and an image of a crop.

A computer system that has a machine learning function such as a neural network may be adopted as another type of the computer system for automated diagnosis. In this case, the above-mentioned diagnostic method is, for example, a diagnostic system itself obtained by performing machine learning using the result of sample diagnosis as training data.

In the following description, description is given of a case of using the former type of the above-mentioned two types of automated diagnosis systems. Referring to FIG. 10, in Step S211 described above, the diagnostic controller 275 calculates and stores a diagnostic method, namely, a set of control parameters of the above-mentioned image analysis algorithm based on the result of sample diagnosis. The diagnostic method (set of control parameters) is calculated for each of one or more image groups included in the target image set. This is because when characteristics of image groups differ from each other, diagnostic methods (set of control parameters) that fit those characteristics also differ from each other. Each calculated diagnostic method (set of control parameters) is associated with each corresponding image group and stored in the general server 3.

After that, in Step S213, the diagnostic controller 275 applies the diagnostic method (set of control parameters) associated with each image group to the automated diagnosis system, and uses the automated diagnosis system to perform automated diagnosis for an image belonging to each corresponding image group, and stores the diagnosis result.

Figure 14:
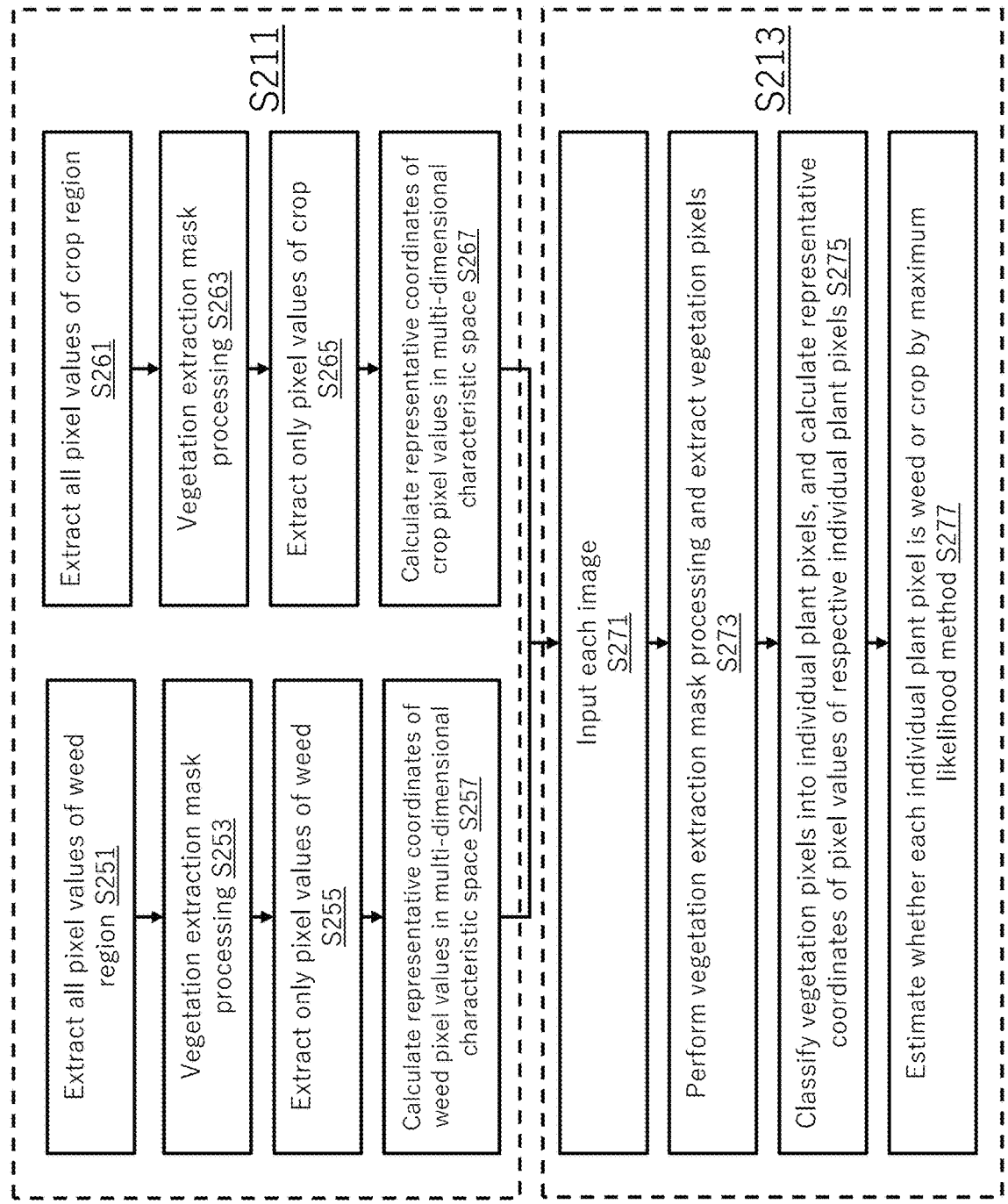
FIG. 14 is a flow chart illustrating a specific example of a flow of control of calculation of a diagnostic method and a flow of control of automated diagnosis.

FIG. 14 illustrates a specific example of a flow of control of calculation of the diagnostic method (set of control parameters) of Step S211 described above and a flow of control of automated diagnosis of Step S213. As illustrated in FIG. 14, in the process of calculating the diagnostic method (control parameter) of Step S211, Steps S251 to S257 are performed for a weed (target object) and Steps S261 to S267 are performed for a crop (excluded object) based on the image characteristics of a sample crop and a sample weed for each image group specified in sample diagnosis.

That is, in Step S251, all the pixel values of all the weed regions (region including weeds specified by weed specification tool 309 as exemplified in FIG. 14) specified in sample diagnosis are extracted from one or more sample images of each image group. In Step S253, a vegetation extraction mask is applied to all the extracted pixel values of the weed region. The vegetation extraction mask processing is processing of distinguishing an image region corresponding to vegetation such as a weed or crop (more generally, specific type of object to be diagnosed) from a region corresponding to a specific object that is not to be diagnosed, such as the ground or rock. This mask processing may be performed by applying, to all the pixels of the weed region, an HSV filter or RGB filter for identifying a pixel having a color characteristic unique to vegetation, for example.

After that, in Step S255, a large number of pixels (hereinafter referred to as "weed pixel") corresponding to weeds of the weed region are extracted based on the result of vegetation extraction mask processing. In Step S257, representative coordinates (for example, pixel value of center of gravity of weed pixels) of weed pixels in a multi-dimensional image characteristic space (for example, RGB space or HVC space) are calculated based on the pixel values of the large number of extracted weed pixels.

Furthermore, Steps S261 to S267 are performed for one or more crop regions specified in sample diagnosis. Description of those steps is the same as that of Steps S251 to S257 corresponding to the above-mentioned weed region, which replaces "weed" with "crop".

Through the above-mentioned Steps S251 to S257 and S261 to S267, the representative coordinates of weed pixels and representative coordinates of crop pixels of each image group are obtained. Those two representative coordinates are the diagnostic method for automated diagnosis, namely, a set of control parameters. The above-mentioned two representative coordinates are merely examples for description, and other types of values (for example, a threshold plane distinguishing between a weed pixel and a crop pixel in a multi-dimensional characteristic space, or a representative value of the size of a weed and a representative value of the size of a crop) may be adopted as the control parameter instead of or in addition to the representative coordinates. Steps S251 to S257 and S261 to S267 are performed all the image groups included in the target image set, and a diagnostic method applicable to each image group is determined.

After that, the determined diagnostic method (set of control parameters) for each image group is used to perform automated diagnosis of Step S213 (Steps S271 to S277) for each image group.

That is, in Steps S271, each of one or more images belonging to each image group is input to the diagnostic controller 285. In Step S273, vegetation extraction mask processing similar to Steps S253 and S263 described above is performed for all the pixels of the input image, and a large number of pixels (hereinafter referred to as "vegetation pixel") corresponding to vegetation are extracted from the input image based on the result. At this stage, which one of the weed and the crop each of those vegetation pixels belongs is unknown.

In Step S275, the large number of extracted vegetation pixels are classified into a mass of pixels whose positions are consecutive on the image. Each mass of pixels obtained in this manner may be considered to correspond to an individual plant (each mass of pixels is hereinafter referred to as "individual plant pixel"). Then, representative coordinates (for example, pixel value of center of gravity) of those pixel values in the multi-dimensional characteristic space are calculated for each individual plant pixel. In Step S277, for each individual plant pixel, whether the individual plant pixel is a weed (target object) or a crop (excluded object) is estimated by, for example, a maximum likelihood method using the representative coordinates of those pixel values and the representative coordinates of weed pixels and representative coordinates of crop pixels calculated before. The weed (target object) and the estimated individual plant pixel are extracted based on the result of estimation.

Steps S271 to S277 described above are performed for all the image groups included in the target image set. In this manner, the region estimated to be a weed (target object) in the form field is stored as the automated diagnosis result.

Referring back to FIG. 10, in Step S213, automated diagnosis (for example, detection of weed in form field) is executed as described above, and a result thereof is stored in the general server 3. After that, in Step S215, the user (for example, customer or expert) can display the automated diagnosis result on the user terminal. Then, the user can check the automated diagnosis result to determine whether the automated diagnosis result is satisfactory (or appropriate) (S217), and finish the diagnostic process when the automated diagnosis result is satisfactory. On the other hand, when the automated diagnosis result is unsatisfactory (No in S217), the user can manually correct the automated diagnosis result (S219). In correction of Step S219, the user is not required to find and correct all the unsatisfactory or inappropriate parts (for example, failure to detect some weed or erroneous detection of some crop as a weed) of the automated diagnosis result, and may select and specify a part of the inappropriate parts by the same method as that of sample diagnosis. In other words, the process of Steps S215 to S219 described above means that the user manually performs diagnosis by referring to the automated diagnosis result. This manual diagnosis can be performed by the same method as that of sample diagnosis, and thus the work load on the user is small.

When the user is satisfied with the automated diagnosis result in Step S217 described above, the automated diagnosis result is stored as the definitive diagnostic result. On the other hand, when the automated diagnosis result is corrected in Step S219, the correction result may be stored as the definitive diagnostic result. Alternatively, as described later, when the user is satisfied with the result of automated diagnosis performed again based on the correction result, the result of automated diagnosis performed again may be stored as the definitive diagnostic result. In any case, the stored definitive diagnostic result and the image set (namely, target data) of the target form field may be used for creating training data for machine learning by the AI server 5 illustrated in FIG. 9.

The result of correction of the automated diagnosis result performed in Step S219 is input to the diagnostic controller 275. Then, in Step S221, the diagnostic controller 275 recalculates the diagnostic method based on the correction result, that is, corrects the diagnostic method. The diagnostic method corrected in this manner is stored in the general server 3. The flow of control of recalculation (correction) of the diagnostic result at this stage may be similar to the flow of Step S211 described with reference to FIG. 14. After the diagnostic controller 275 has corrected the diagnostic method, the diagnostic controller 275 can return to Step 213 described above, and perform automated diagnosis again by the corrected diagnostic method. The user can check again the result of automated diagnosis performed again, and additionally correct the result if the necessity arises. As a result, the accuracy of automated diagnosis is improved further.

Figure 15:
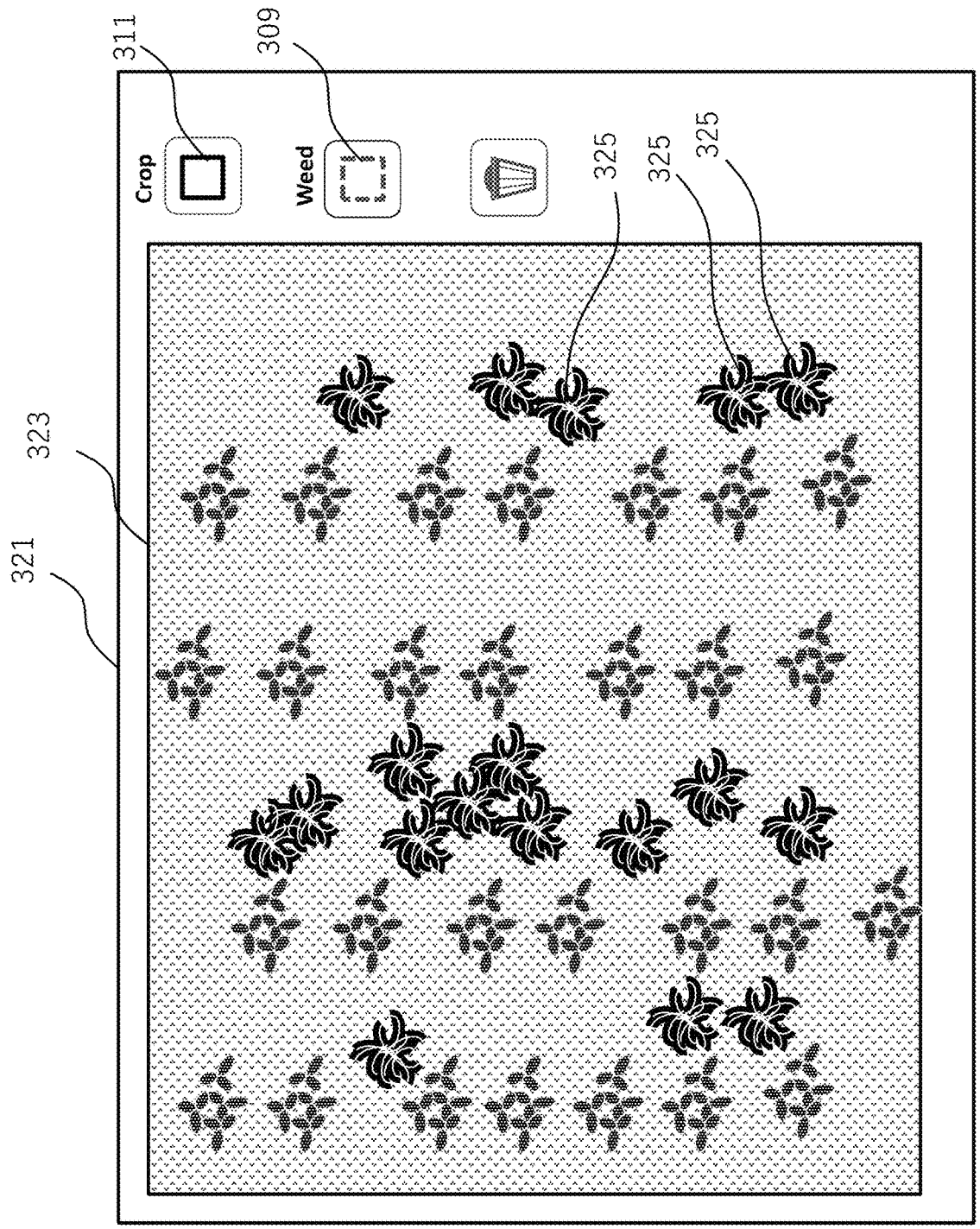
FIG. 15 illustrates an example of a GUI representing an automated diagnosis result displayed on the user terminal.

FIG. 15 illustrates an example of the GUI representing an automated diagnosis result displayed on the user terminal in Step S215 of FIG. 10 described above. As illustrated in FIG. 15, an image 323 of the form field on the GUI 321 displays a weed 325, which has been detected as a result of automated diagnosis, that is, detected from the image 323, in such a manner as to enable the user to recognize the weed 325 by his or her eyes (for example, a contour line of each detected weed is highlighted to be displayed). In the example of FIG. 15, the automated diagnosis result is appropriate, that is, all the weeds existing in the region of the image 323 are detected, and no crop is detected. The user is assumed to be satisfied with this automated diagnosis result.

Figure 16:
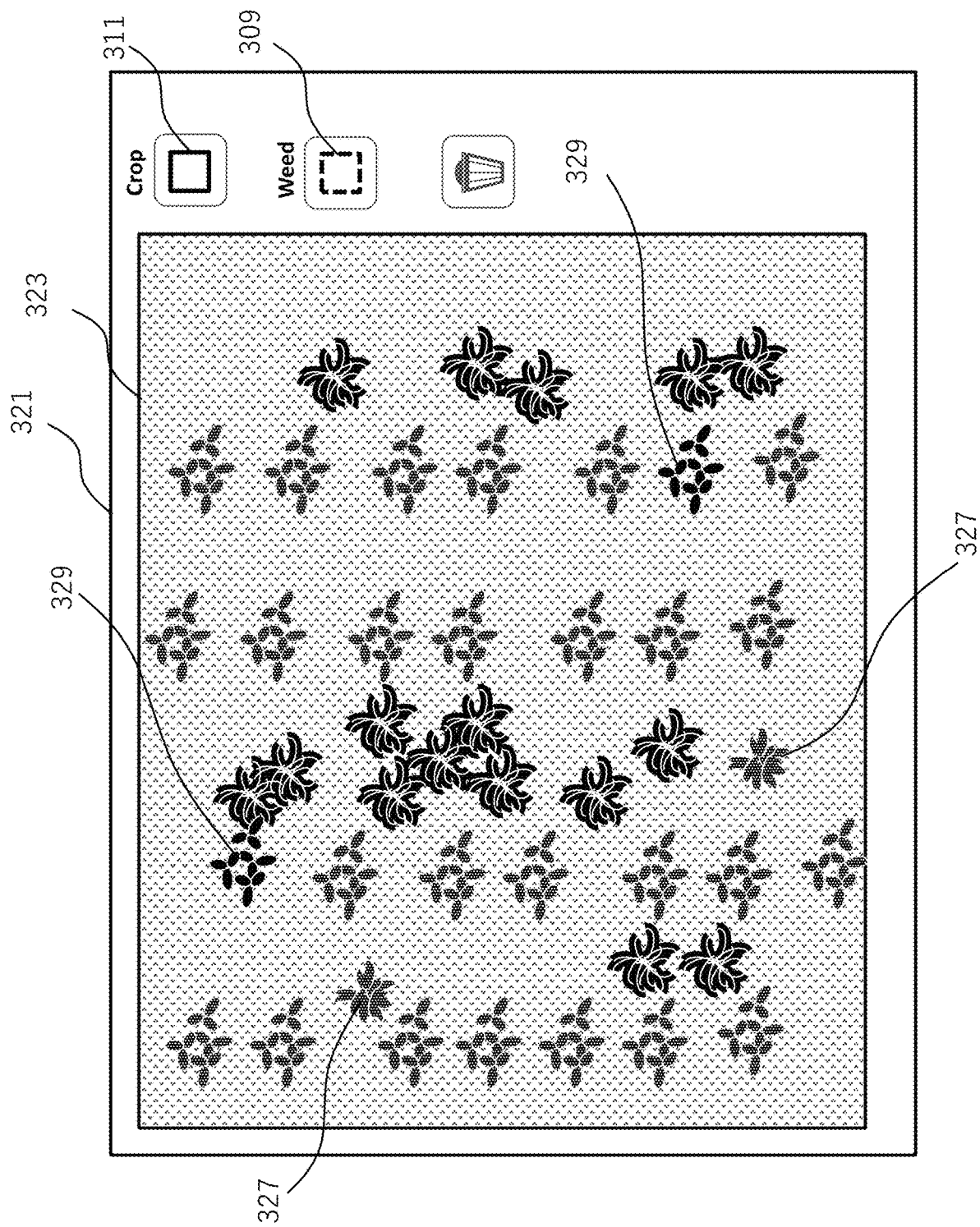
FIG. 16 illustrates an example of a GUI representing an inappropriate automated diagnosis result.

FIG. 16 illustrates an example of the GUI representing an inappropriate automated diagnosis result. In the example illustrated in FIG. 16, a part of weeds 327 existing in the region of the image 323 has failed to be detected, and a part of crops 329 has erroneously been detected. In such a case, the user can proceed to Step S219 of FIG. 10 described above, and correct the part of detection failure or erroneous detection.

Figure 17:
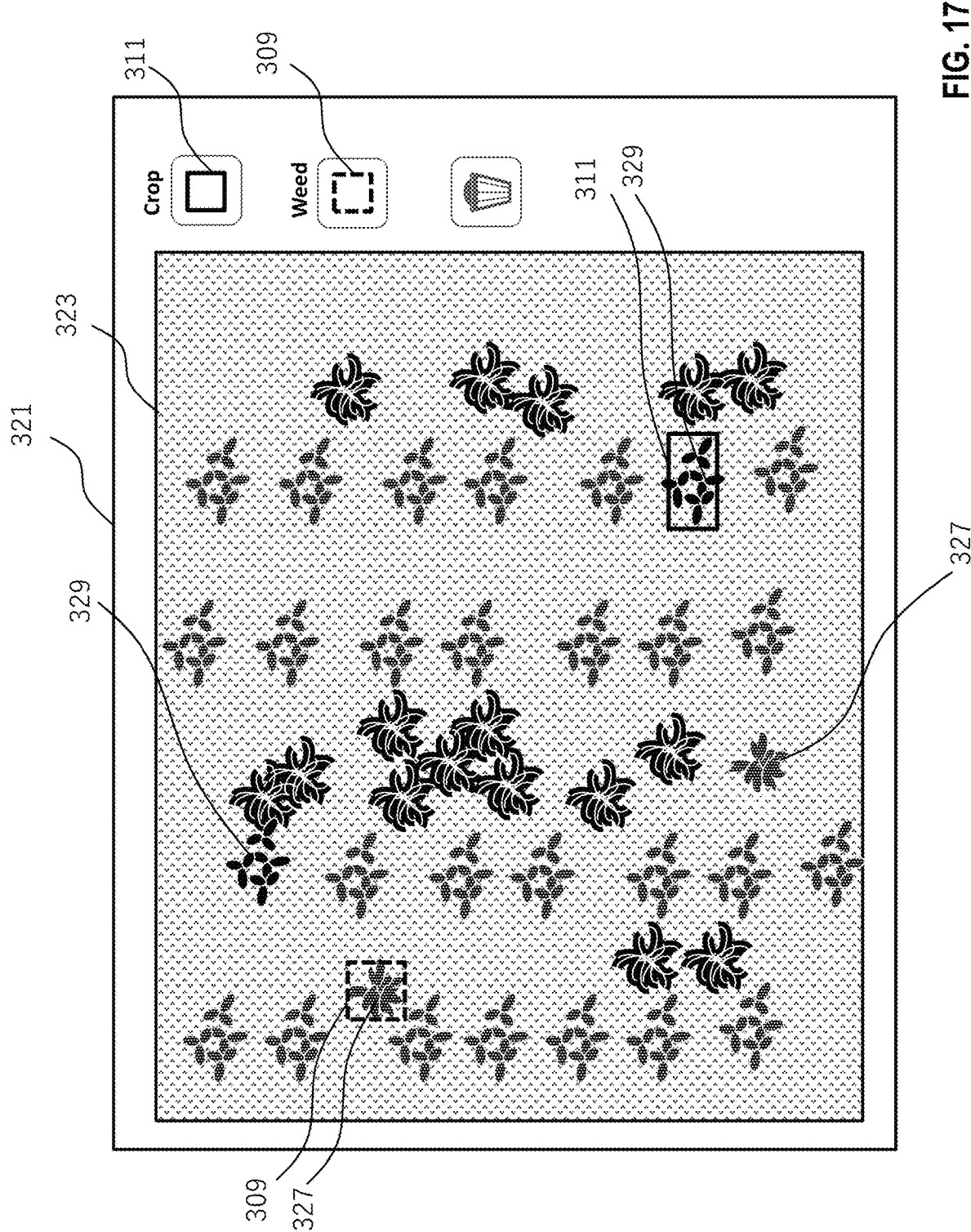
FIG. 17 illustrates an example of a GUI at a time when the user has corrected the automated diagnosis result.

FIG. 17 illustrates an example of the GUI at a time when the user has corrected the automated diagnosis result. As illustrated in FIG. 17, the user can correct the automated diagnosis result by specifying one or more weeds 327, which have failed to be detected, by the weed specification tool 309, or by specifying one or more erroneously detected crops 329 by the crop specification tool 311. At this time, the user is not required to find and specify all of the weeds 327 that have failed to be detected and all of the crops 329 that have been erroneously detected, and may specify only a part thereof. As described above, this correction result is used for recalculating the diagnostic method, and the diagnostic method is corrected.

Through diagnostic control as described above, the work load of diagnosis performed by the user is alleviated.

Figure 18:
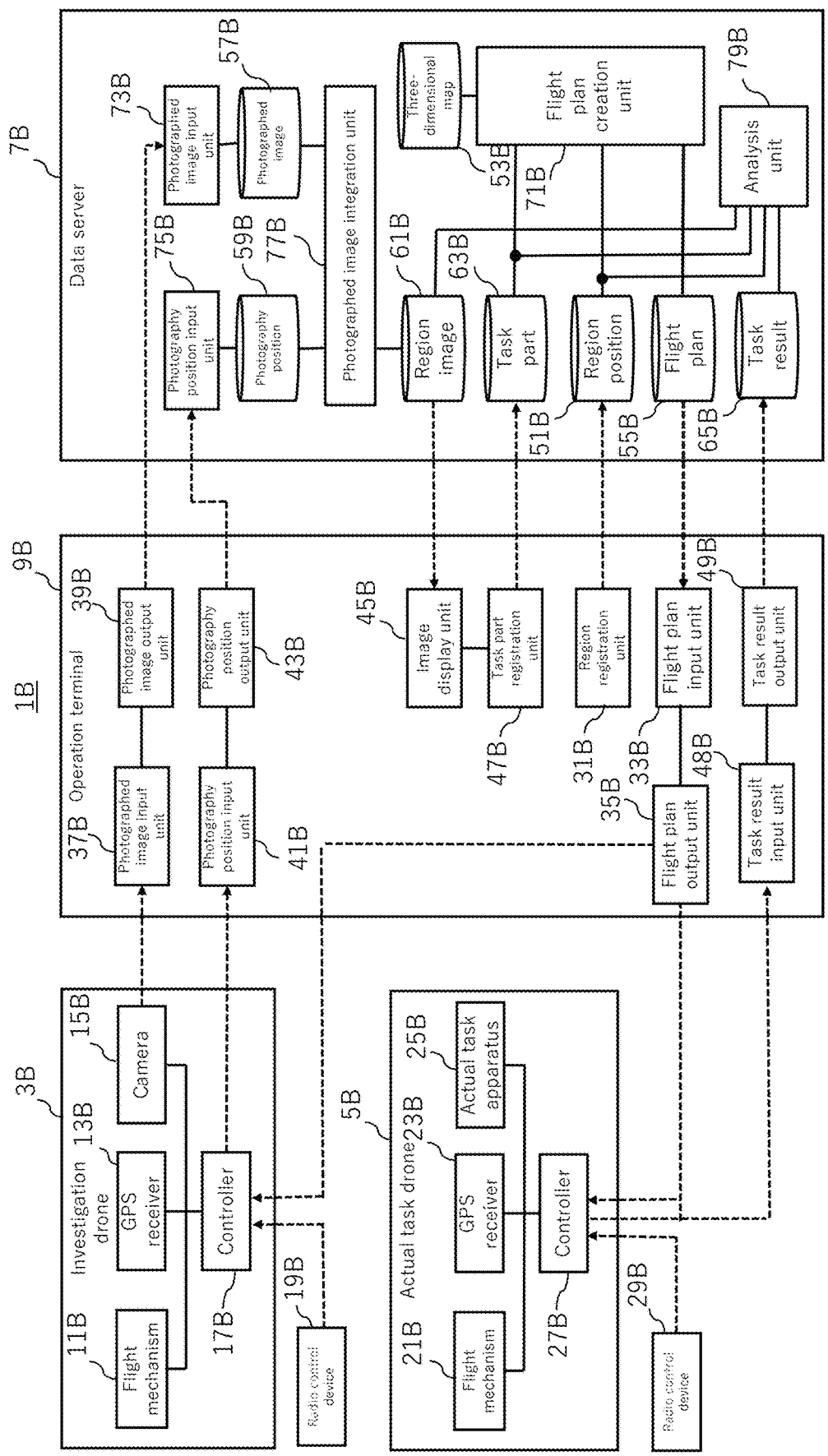
FIG. 18 is a block diagram illustrating an exemplary overall configuration of a system for assisting in performing a task using a drone, to which the diagnostic system illustrated in FIG. 1 can be applied.

FIG. 18 illustrates an exemplary functional configuration of the system for assisting in performing a task such as investigation, inspection, or maintenance using an unmanned mobile machine (hereinafter referred to as "drone"), to which the diagnostic system according to an embodiment of the present invention illustrated in FIG. 1 can be applied.

An example of the task assistance system illustrated in FIG. 18 is directed to the use for inspection or maintenance (for example, identification of a part in which a disease or physiological disorder has occurred and spread of a pesticide or fertilizer to that part) of a form field. However, on the basis of description of the system for that purpose, a person skilled in the art would also easily understand the configuration of a system for another use (for example, investigation, inspection, maintenance, processing, construction, or destruction of artificial object or natural object such as building, facility, ground, or forests).

A task assistance system 1B illustrated in FIG. 18 can typically be used by a plurality of different users. However, the following description is given with focus on a use scene of one user among a plurality of users.

As illustrated in FIG. 18, when the task assistance system 1B is used, the user can use different types of drones (in this case, unmanned aerial vehicle) that suit different tasks, for example, two types of drones 3B and 5B. One type of the different types of drones is an investigation drone 3B, and the investigation drone 3B serves to investigate the state of a geographic region, namely, a region desired by the user (for example, a form field owned or used by the user), that is, collect information on the region. In this embodiment, photographing of the region from the sky is adopted as the method of region investigation. However, photographing is one example, and an information collection method using other investigation methods such as a radio radar, a sonic radar, or various kinds of sensors may be adopted. Furthermore, different investigation methods may be combined.

Another type of drone is an actual task drone 5B, and serves to execute one type of task (hereinafter referred to as "actual task") to be performed in the region, for example, a task of selectively spreading a pesticide to a part of a large form field in which a disease has occurred.

The same drone may be used as the investigation drone 3B and the actual task drone 5B, but in many cases, it may be desirable that different drones are used to optimally achieve respective roles. Furthermore, in one region, a plurality of investigation drones 3B and/or a plurality of actual task drones 5B can also be used. However, the following description is given by taking an exemplary case in which one user uses one investigation drone 3B and another actual task drone 5B.

The task assistance system 1B includes a data server 7B, which is a computer system for managing and processing various kinds of data required for using the drones 3B and 5B. The functional components of the data server 7B illustrated in FIG. 18 are provided in the general server 3 of the diagnostic assistance system 1 illustrated in FIG. 1, to thereby enable the general server 3 to be used as the data server 7B.

When the task assistance system 1B illustrated in FIG. 18 is used, the user uses an operation terminal 9B. The operation terminal 9B has a function of performing data communication with the data server 7 via a communication network such as the Internet. The operation terminal 9B also has a function of exchanging data with the drones 3B and 5B (for example, the operation terminal 9B can exchange data with the drones 3B and 5B by a wired or wireless communication method or via a portable data storage).

A general-purpose mobile information processing terminal having such a function (for example, so-called mobile phone, smartphone, tablet terminal, mobile personal computer, or laptop personal computer), or another type of computer (for example, desktop personal computer) can be adopted as the operation terminal 9B. In that case, a computer program for using the task assistance system 1B (for example, an application dedicated to this system or a general-purpose web browser that can access a website being an external interface of the data server 7B) is installed into the general-purpose information processing terminal, and the computer program is executed on the terminal, to thereby cause the general-purpose terminal to function as the operation terminal 9B for the task assistance system 1B. Alternatively, dedicated hardware may be prepared for the task assistance system 1B as the operation terminal 9B.

When each user uses the task assistance system 1B, the user may always use only the same operation terminal 9B, or may select one of the plurality of operation terminals 9B appropriately and use the selected one of the plurality of operation terminals 9B depending on the time and situation. Furthermore, a plurality of different users can also use each operation terminal 9B to refer to information on the same region (for example, the same form field) and input desired information. The following description is given by taking an exemplary case in which one user uses one operation terminal 9B.

The investigation drone 3B includes a flight mechanism 11B for causing the investigation drone 3B to fly, a GPS receiver 13B for measuring a three-dimensional position (latitude, longitude, and altitude), a camera 15B for photographing a picture, and a controller 17B for controlling each of the apparatus 11B, 13B, and 15B. Furthermore, a radio control device 19B (so-called transmitter) for wirelessly controlling the investigation drone 3B by the user at a remote location is accompanied with the investigation drone 3B. The radio control device 19B can wirelessly communicate with the controller 17B, and transmit various kinds of control commands to the controller 17B in response to various kinds of operations of the radio control device 19B performed by the user.

The actual task drone 5B includes a flight mechanism 21B for causing the actual task drone 5B to fly, a GPS receiver 23B for measuring a three-dimensional position (latitude, longitude, and altitude), an actual task apparatus 25B for performing an actual task, and a controller 27B for controlling each of the apparatus 21B, 23B, and 25B. When the actual task is to spread a pesticide on a form field, the actual task machine 25B is a pesticide spread apparatus, and an auxiliary apparatus, for example, a camera for photographing the situation of an actual task may be added to the actual task machine 25B. Furthermore, a radio control device 29B (so-called transmitter) for wirelessly controlling the actual task drone 5B by the user at a remote location is accompanied with the actual task drone 5B. The radio control device 29B can wirelessly communicate with the controller 27B, and transmits various kinds of control commands to the controller 27B in response to various kinds of operations of the radio control device 29B performed by the user.

The operation terminal 9B includes information processing components such as a region registration unit 31B, a flight plan input unit 33B, a flight plan output unit 35B, a photographed image input unit 37B, a photographed image output unit 39B, a photography position input unit 41B, a photography position input unit 43B, an image display unit 45B, a task part registration unit 47B, a task result input unit 48B, and a task result output unit 49B along the order of normal steps used by the user.

The region registration unit 31B registers, in the data server 7B, the position (for example, the latitude and longitude of a vertex of a region) (hereinafter referred to as "region position") of a geographic region, namely, a region desired by the user (for example, a form field owned by the user) in response to input by the user.

The flight plan input unit 33B downloads a flight plan desired by the user from the data server 7B in response to input by the user. The flight plan output unit 35B transmits the downloaded flight plan to the drone 3B or 5B desired by the user in response to input by the user, and causes the controller 17B or 27B of the drone 3B or 5B to install the flight plan. The flight plan is one type of movement plan that defines a geographic path along which the drone is planned to fly.

The photographed image input unit 37B receives an image (a large number of images are photographed in one region) (hereinafter referred to as "photographed image") photographed by the investigation drone 3B in response to input by the user. The photographed image output unit 39B transmits the large number of received photographed images to the data server 7B in response to input by the user.

The photography position input unit 41B receives the position and angle (the position and angle of photography are hereinafter collectively referred to as "photography position") of the investigation drone 3B (or camera 15B) at the time of photography of each photographed image measured by the investigation drone 3B in response to input by the user. The photography position input unit 43B transmits the received photography position to the data server 7B in response to input by the user.

The image display unit 45B downloads an entire image (hereinafter referred to as "region image") of a region already registered by the user from the data server 7B in response to input by the user, and displays the entire image on a display screen (not shown) of the operation terminal 9B. Each region image is created by the data server 7B integrating a large number of photographed images of the region.

The task part registration unit 47B identifies one or more geographic small regions, namely, parts (hereinafter referred to as "task part") of the region to be subjected to an actual task on the displayed region image in response to input by the user, and registers the task part in the data server 7B. For example, when the actual task is to spread a pesticide in a form field, the user observes the color or shape of a crop or leaf and recognizes occurrence of a disease for a part in the region image of one form field, and the part can be set as the task part. At the time of registration of this task part, the user also specifies details (for example, spreading of a pesticide A and a pesticide B) of a task to be performed for the task part, and registers the details into the data server 7B in association with the task part.

The task result input unit 48B receives the result (for example, position and amount of pesticide to be spread) of the actual task performed by the actual task drone 5B in response to input by the user. The task result output unit 49B transmits the received task result to the data server 7B in response to input by the user.

The data server 7B includes databases such as a region position database 51B, a three-dimensional map database 53B, a flight plan database 55B, a photographed image database 57B, a photographed position database 59B, a region image database 61B, a task part database 63B, and a task result database 65B. Furthermore, the data server 7B includes information processing components such as a flight plan creation unit 71B, a photographed image input unit 73B, a photography position input unit 75B, a photographed image integration unit 77B, and an analysis unit 79B.

The region position database 51B registers and manages the region position of the region (for example, form field of the user) specified by the user in response to the region registration unit 31B of the operation terminal 9B.

The three-dimensional map database 53B stores and manages a three-dimensional map that defines the latitude, longitude, and altitude of each position. The three-dimensional map database 53B is used by the flight plan creation unit 71B to create flight plans for the drones 3B and 5B. The data server 7B may use an external three-dimensional map on the Internet without storing the three-dimensional map database 53B in the data server 7B.

The flight plan database 55B stores and manages flight plans for the drones 3B and 5B. In response to a request from the flight plan input unit 33B of the operation terminal 9B, the flight plan database 55B transmits the requested flight plan to the flight plan input unit 33B. The flight plan managed by the flight plan database 55B is mainly classified into two types of plans, for example, an investigation flight plan and an actual task flight plan. The investigation flight plan is a flight plan for investigating (for example, photographing a picture) each registered region by the investigation drone 3B. The actual task flight plan is a flight plan for performing an actual task (for example, spreading a pesticide) by the actual task drone 5B for one or more task parts of each registered region.

The photographed image database 57B stores and manages a photographed image received from the photographed image output unit 39B of the operation terminal 9B. The photographed position database 59B stores and manages a photography position received from the photography position input unit 43B of the operation terminal 9B.

The region image database 61B stores and manages a region image representing an entire image of each region created by integrating photographed images of each region. In response to a request from the image display unit 45B of the operation terminal 9B, the region image database 61B transmits the requested region image to the image display unit 45.

The task part database 63B registers and manages a task part specified by the user in response to the task part registration unit 47B of the operation terminal 9B.

The task result database 65B stores and manages the task result received from the task result output unit 49B of the operation terminal 9B.

The photographed image input unit 73B and the photography position input unit 75B receive, from the operation terminal 9B, the photographed image and photography position given by the investigation drone 3B to the operation terminal 9B, respectively, and store the photographed image and photography position into the photographed image database 57B and the photographed position database 59B, respectively.

The flight plan creation unit 71B creates an investigation flight plan for each region and an actual task flight plan for one or more task parts in each region, and registers the created flight plan in the flight plan database 55B. The flight plan creation unit 71B may be a fully automated tool that can create a flight plan fully automatically, or may be a semi-automated tool that can create a flight plan through operation by the user.

The investigation flight plan for each region is created by using the region position (for example, latitude and longitude of vertex of contour of each region) of each region in the region position database 51B and the three-dimensional position (for example, latitude, longitude, and altitude) of each location in each region in the three-dimensional map database 53B. The actual task flight plan for one or more task parts in each region is created by using the position (for example, latitude and longitude of vertex of contour of task part) of a corresponding task part in the task part database 63B and the three-dimensional position (for example, latitude, longitude, and altitude) of each location in each task part in the three-dimensional map database 53B.

The photographed image input unit 73B receives the photographed image of each region from the photographed image output unit 39B of the operation terminal 9B, and registers the received photographed image in the photographed image database 57B. The photography position input unit 75B receives the photography position of each region from the photography position input unit 43B of the operation terminal 9B, and registers the received photography position in the photographed position database 59B.

The photographed image integration unit 77B integrates photographed images of each region in the photographed image database 57B based on each region photography position in the photographed position database 59B, creates a region image representing an entire image of each region, and registers the region image in the region image database 61B. The region image of each region serves as an investigation report for notifying the user of the result of investigation (for example, photographing a picture) of the region. The user can determine for which part of the region an actual task (for example, spreading a pesticide) is to be performed and specify the part by referring to the region image of each region.

The analysis unit 79B analyzes a task result stored in the task result database 65B. The result of analyzing the task result can be used for improvement of subsequent task methods or for other purposes.

Figure 19:
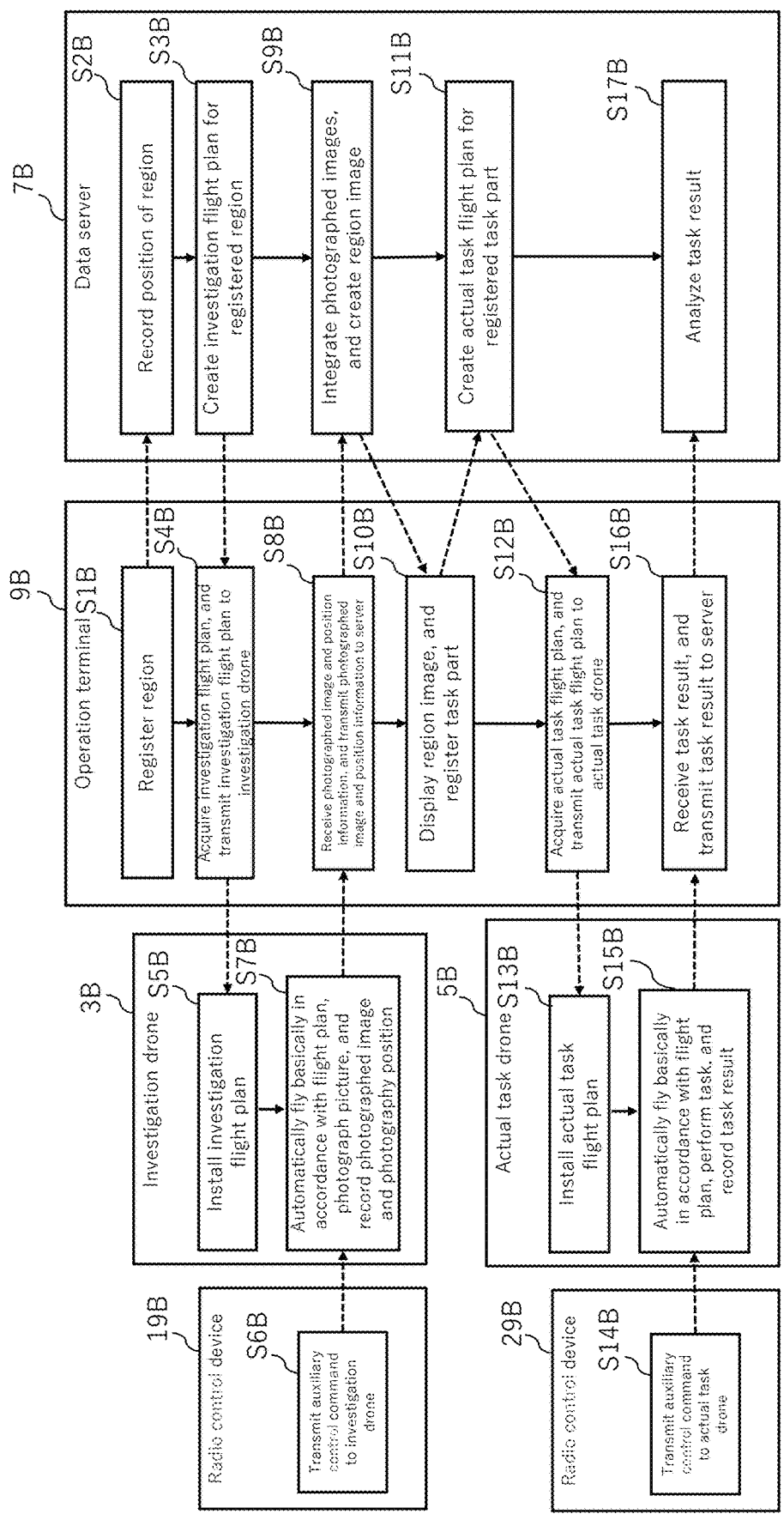
FIG. 19 is a flow chart illustrating an exemplary flow of overall control of the task assistance system.

FIG. 19 illustrates an exemplary flow of overall control of the task assistance system 1B.

As illustrated in FIG. 19, in the operation terminal 9B, the user performs an operation for registering a desired region (for example, a form field owned by the user) (Step S1B). The registration operation is, for example, an operation of displaying a map as provided on the Internet on the screen of the operation terminal 9B and specifying a region position of a region on the map. The data server 7B records the region position of the region to register the region in response to the registration operation (Step S2B). After that, the data server 7B creates an investigation flight plan of the region based on the region position (Step S3B).

After that, the user operates the operation terminal 9B to download an investigation flight plan for the region into the operation terminal 9B from the data server 7B, and transmits the investigation flight plan from the operation terminal 9B to the investigation drone 3B (Step S4B). Then, the investigation flight plan is installed into the investigation drone 3B (Step S5B).

Next, the user takes the investigation drone 3B to the region (for example, the form field owned by the user), and operates the radio control device 19B to transmit a control command for take-off and other auxiliary control commands to the investigation drone 3B (Step S6B). The investigation drone 3B flies above the region in the sky automatically, autonomously and basically in accordance with the investigation flight plan while at the same time repeating photography of a picture of the ground region at various positions on the flight path, to thereby record a large number of photographed images and photography positions (Step S7B). This flight control is performed automatically, autonomously and basically in accordance with the investigation flight plan, and a control command from the radio control device 19B is used auxiliarily to start take-off or correct the flight position or speed a little, for example.

A large number of photographed images and photography positions of the region are passed from the investigation drone 3B to the operation terminal 9B, and then are transmitted from the operation terminal 9B to the data server 7B (Step S8B). The data server 7B integrates the photographed images depending on respective photography positions, and creates a region image of the entire region (Step S9B).

After that, the user operates the operation terminal 9B to receive the region image of the region from the data server 7B and display the region image on the screen, identify a task part (for example, a part of the form field in which a disease is visually recognized to have occurred) on the displayed region image, and request the server 7B to register the task part (Step S10B). The data server 7B registers the task part, and then creates an actual task flight plan (for example, a flight plan for spreading a pesticide in that part) for the task part (Step S11B).

After that, the user operates the operation terminal 9B to download the actual task flight plan from the data server 7B into the operation terminal 9B, and transmit the actual task flight plan from the operation terminal 9B to the actual task drone 5B (Step S12B). Then, the actual task flight plan is installed into the actual task drone 5B (Step S13B).

The user takes the actual task drone 5B to the region (for example, the form field owned by the user), and operates the radio control device 29B to transmit a control command for take-off and other auxiliary control commands to the actual task drone (Step S14B). The actual task drone 5B flies above the task part in the sky basically in accordance with the actual task flight plan while at the same time performing an actual task (for example, spreading a pesticide in the disease part of the form field), to thereby record the task result (Step S15B). This flight control is performed automatically, autonomously and basically in accordance with the investigation flight plan, and a control command from the radio control device 19B is used auxiliarily to start take-off or correct the flight position or speed slightly, for example.

The task result is passed from the actual task drone 5B to the operation terminal 9B, and then is transmitted from the operation terminal 9B to the data server 7B (Step S16B). The data server 7B stores and analyzes the task result (Step S17B).

As can be understood from the flow of control described above, the user can use the operation terminal 9B to perform a desired task in a desired region by using the drones 3B and 5B comparatively easily.

Figure 20:
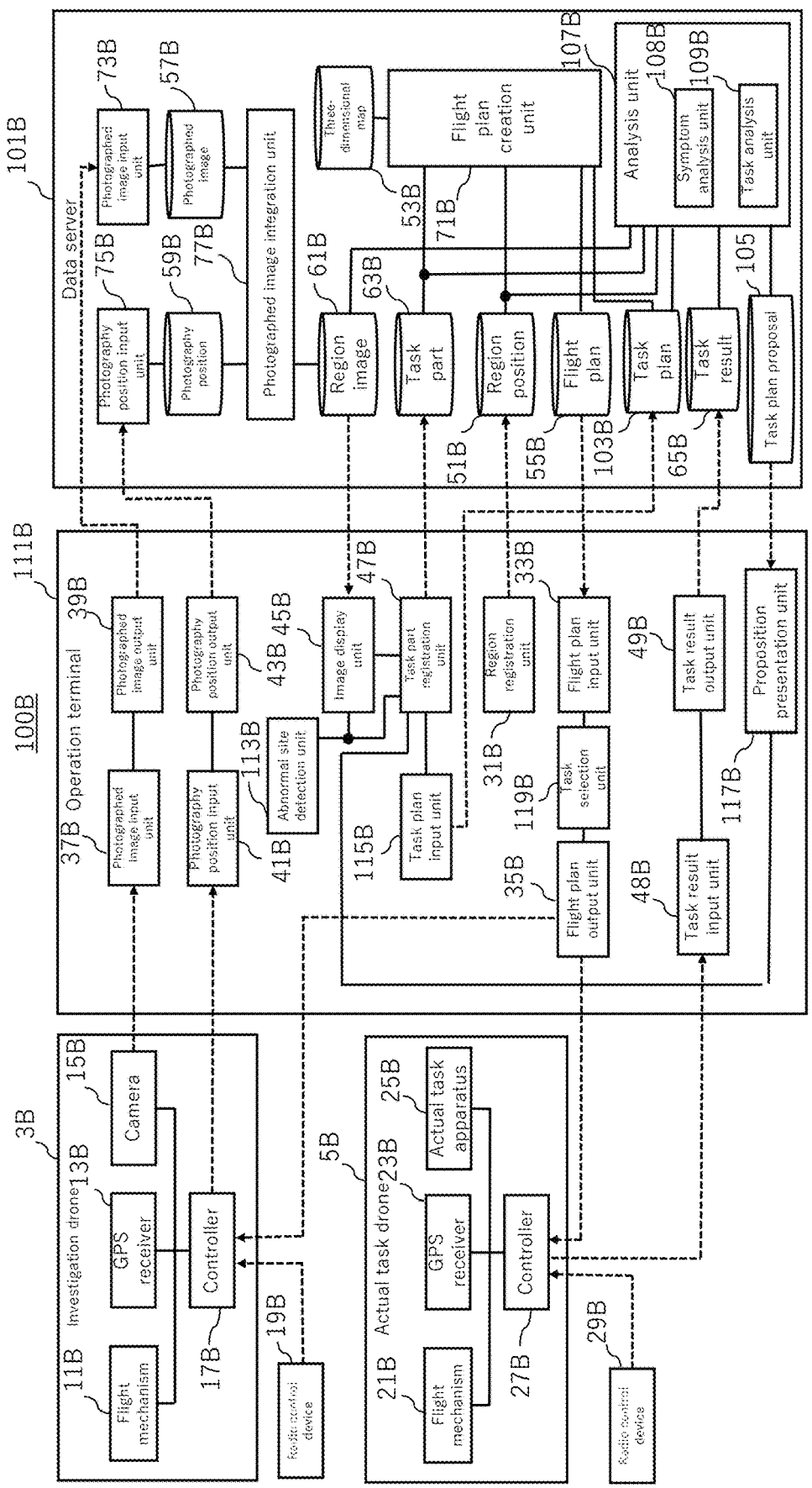
FIG. 20 is a block diagram illustrating another exemplary overall configuration of the system for assisting in performing a task using a drone, to which the diagnostic system illustrated in FIG. 1 can be applied.

FIG. 20 illustrates another exemplary functional configuration of the system for assisting in performing a task, to which the diagnostic assistance system 1 illustrated in FIG. 1 can be applied.

A task assistance system 100B illustrated in FIG. 20 includes several additional components for facilitating setting of a task plan for obtaining an expected task effect in addition to the configuration of the task assistance system 1B illustrated in FIG. 18. In the description and drawings of the task assistance system 100B described below, components common to those of the task assistance system 1B described above are assigned with the same reference numerals, and redundant description thereof is omitted here.

In the task assistance system 100B illustrated in FIG. 20, a data server 101B and an operation terminal 111B include several additional components in addition to the respective components of the data server 7B and the operation terminal 9B illustrated in FIG. 17. The functional components of the data server 7B illustrated in FIG. 20 are provided in the general server 3 of the diagnostic assistance system 1 illustrated in FIG. 1, so that the general server 3 can be used as the data server 101B.

As illustrated in FIG. 20, the data server 101B includes a task plan database 103B, a task plan proposal database 105B, and an analysis unit 107B in addition to the additional components described above. The operation terminal 111B includes an abnormal site detection unit 113B, a task plan input unit 115B, a proposal presentation unit 117B, and a task selection unit 119B as the additional components.

The abnormal site detection unit 113B of the operation terminal 111B automatically analyzes the result of investing the region, namely, the region image (for example, the image of a specific registered form field) displayed by the image display unit 45B on the display screen of the operation terminal 111B, and detects an abnormal site (for example, a region of the form field in which a disease is estimated to have occurred) in the region image. The abnormal site detection unit 113B displays a region (for example, frame line indicating the contour of the region) of the detected abnormal site in the region image on the display screen.

The abnormal site detection unit 113B may be provided in the data server 101B instead of the operation terminal 111B. For example, the analysis unit 107B of the data server 101B may include the abnormal site detection unit 113B. The abnormal site detection unit 113B may be constructed by using a deep neural network and may perform machine learning of an inference method of detecting an abnormal site in the region image by deep learning similarly to the symptom analysis unit 108B or the task analysis unit 109B in the analysis unit 107B described later.

The image display unit 45B displays the region image (for example, the image of a specific registered form field) on the display screen of the operation terminal 111B, and when the user has specified a task part in the region image using the task part registration unit 47B, the task plan input unit 115B of the operation terminal 111B enables the user to input a task plan for the identified task part. In other words, the task plan input unit 115B displays, on the display screen, a task plan input tool for the user to input any task plan for each task part on the display screen. The user can operate the task plan input tool to input any task plan into the system 100B for each task part. When the user has finished inputting a task plan (for example, when the user has requested registration of a task plan on the display screen), the task plan input unit 115B transmits the input task plan to the data server 101B, and the task plan is registered in the task plan database 103B of the data server 101B in association with the corresponding task part.

The task plan is data that defines an actual task to be performed for each task part. As one example, the task plan for each task part can include a symptom name (for example, the name of a disease or a physiological disorder) of the task part and the name (for example, the name of a pesticide, a fertilizer, or other maintenance tasks to be applied to the task part) of an actual task to be executed depending on the symptom. Alternatively, the task plan may not include a symptom name, but may include only the task name, or may include additional information (for example, information or an image identifying the task part or the amount of a pesticide or fertilizer to be spread) in addition to the symptom name and the task name.

The task plan (for example, a symptom name and an actual task name for each abnormal site in each form field) of each task part in each region registered in the task plan database 103B may be used in the following manner when the flight plan creation unit 71B of the data server 101B creates a flight plan for each region. Specifically, when different task plans are registered for different task parts in the same region, for example, the flight plan creation unit 71B classifies task parts to which the same task plan (same task name) is assigned into the same group, and creates one flight plan for each group, that is, creates different flight plans for different groups. For example, when a task plan of applying a pesticide C is registered for task parts A and B and a task plan of applying another pesticide F is registered for other task parts D and E in one form field, the flight plan creation unit 71B creates a flight plan of applying the pesticide C for the group of the task parts A and B, and creates a flight plan of spreading another pesticide F for the group of the other task parts D and E.

When the user uses the task plan input unit 115B to input a task plan for each task part, the proposal presentation unit 117B of the operation terminal 111B reads a task plan proposal for each task part from the task plan proposal database 105B of the data server 101B, and displays each task plan proposal on the display screen of the operation terminal 111B in association with each task part.

The task plan proposal refers to a proposal of a task plan recommended for each task part, which has been generated through inference by the analysis unit 107B of the data server 101B. The task plan proposal of each task part generated by the analysis unit 107B is stored in the task plan proposal database 105B in association with each task part.

The user refers to the task plan proposal displayed on the display screen of the operation terminal 111B when the user uses the task plan input unit 115B to input a task plan. In particular, the task plan proposal is helpful for determining a more appropriate task plan for the user having a small knowledge or experience for determining a task plan. As the inference capabilities of the analysis unit 107B become larger, the performance of helping the user by the task plan proposal becomes higher. The analysis unit 107B has a configuration described below in order to improve the inference capabilities of the analysis unit 107B.

The task selection unit 119B of the operation terminal 111B causes the user to select a flight plan for a specific task to be executed by the actual task drone 5B this time from among flight plans for a specific region (for example, specific form field) read by the flight plan input unit 33B from the flight plan database 55B. For example, when a flight plan of spreading the pesticide C and a flight plan of spreading another pesticide F are read by the flight plan input unit 33B for the specific form field, the task selection unit 119B displays those flight plans on the display screen, and causes the user to select a desired flight plan from among those flight plans. The task selection unit 119B provides the flight plan output unit 35B with the selected flight plan. The selected flight plan is supplied from the flight plan output unit 35B to the controller 27B of the actual task drone 5B.

The analysis unit 107B of the data server 101B reads, from the region image database 61B, the task part database 63B, the region position database 51B, the task plan database 103B, and the task result database 65B, data such as the image of (for example, each form field) each registered region, the position of each task part in each region, the task plan (for example, symptom name and actual task name) for each task part, the image of each region (each task part) after an actual task based on each task plan is executed, and the task plan (particularly, symptom name) input by the user again based on the image after the task is executed. The analysis unit 107B performs machine learning by using those read pieces of data to create an inference method for automatically generating the proposal of task plan for each task part (including improvement in inference method created before). Furthermore, the analysis unit 107B uses the inference method created by machine learning to create a task plan proposal that depends on the image based on the image of each task part. The created proposal of a task plan for each task part is stored in the task plan proposal database 105B in association with each task part.

The proposal of a task plan for each task part includes, for example, a proposal of a symptom (for example, disease name) estimated for the task part, and a proposal of an actual task (for example, pesticide name or fertilizer name) recommended for the task part depending on the symptom.

Figure 21:
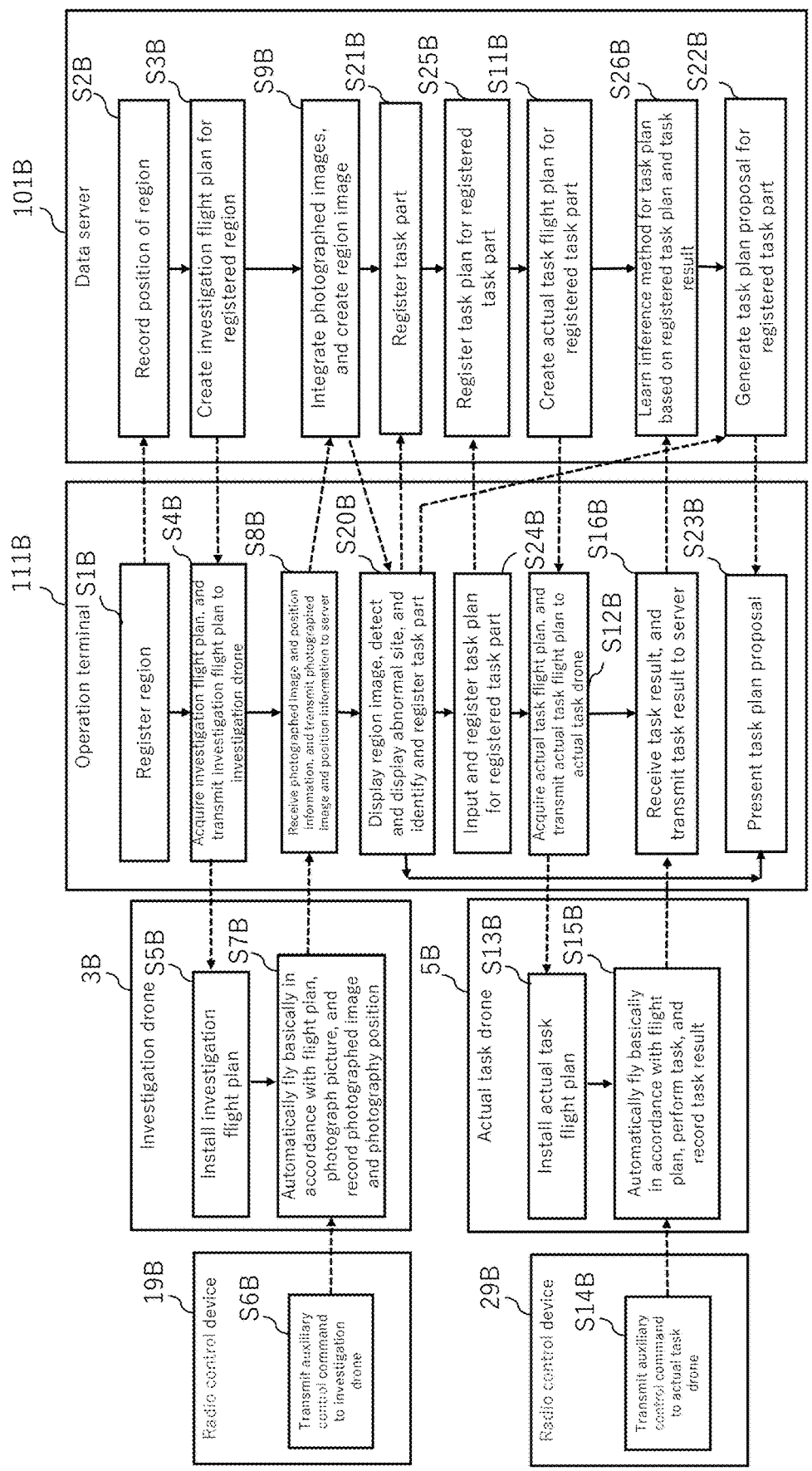
FIG. 21 is a flow chart illustrating an exemplary flow of overall control of the task assistance system.

FIG. 21 is a flow chart illustrating an exemplary flow of overall control of the task assistance system 100B.

After the region image of the region desired by the user is registered in the data server 101B (Step S9B), the user can display the region image on the display screen of the operation terminal 111B (Step S20B). In Step S20B, the operation terminal 111B automatically analyses the region image to automatically detect an abnormal site, and displays the location of the detected abnormal site in the region image on the display screen. Then, the user identifies a task part by his or her own eyes by referring to the displayed abnormal site, and requests the operation terminal 111B to register the identified task part. Then, the task part is notified from the operation terminal 111B to the data server 101B, and is registered in the data server 101B (Step S21B).

In Step S21B, when the task part is registered in the data server 101B, the analysis unit 107B of the data server 101B executes inference for the image of the registered task part, and automatically generates a task plan proposal for the task part (Step S22B). The operation terminal 111B receives the task plan proposal from the data server 111B, and displays the task plan proposal on the display screen in association with the task part displayed on the display screen (Step S23B).

The user determines a task plan (for example, symptom name and actual task name) for the task part by referring to the task plan proposal for the task part displayed on the operation terminal 111B, inputs the task plan into the operation terminal 111B, and requests the operation terminal 111B to register the task plan (Step S23B). Then, the input task plan is notified to and registered in the data server 101B in association with the task part (Step S25B).

After an actual task is performed for a certain region, the picture image (the effect of the actual task is exhibited there) of the region is photographed again to obtain a region image thereof, and when a task part (the same part as the previous task part, a part different from the previous task part, or there may be no task part) identified again by the user based on the region image and a symptom name (the same symptom as the previous symptom, or a symptom different from the previous symptom may be included) are input and registered, the inference unit 107B of the data server 101B receives, as training data, the task plan of the actual task performed, the image exhibiting the effect of the task, and the task part and symptom name identified again based on the image, and performs machine learning to automatically create an inference method of the task plan (Step S26B). The analysis unit 107B can apply the learned inference method to inference of Step S22B to be executed later.

Through the above-mentioned control, the performance of the inference method for generating a task plan proposal held by the data server 101B is improved as photographing of pictures in many regions and an actual task are repeated, so that it is possible to provide the user with a more appropriate task plan proposal. As a result, the user can design a task plan for obtaining an expected action and effect more easily.

Referring back to FIG. 20, the analysis unit 107B of the data server 101B includes a symptom analysis unit 108B and a task analysis unit 109B. The symptom analysis unit 108B analyzes the image (a part corresponding to each task part in the region image) of each task part to estimate the symptom of the task part, and stores the estimated symptom (for example, disease name or physiological disorder) into the task plan proposal database 105B in association with the task part as a symptom proposal. The task analysis unit 109B estimates an actual task (for example, pesticide name or fertilizer name) recommended to be applied to the task part based on the symptom of each task part, and stores the estimated actual task into the task plan proposal database 105B in association with the task part as a task proposal. The symptom proposal and task proposal for each task part form a task plan proposal for the task part.

The symptom analysis unit 108B and the task analysis unit 109B can be adapted to perform machine learning and inference that suit their respective purposes by using a neural network, for example.

Figure 22:
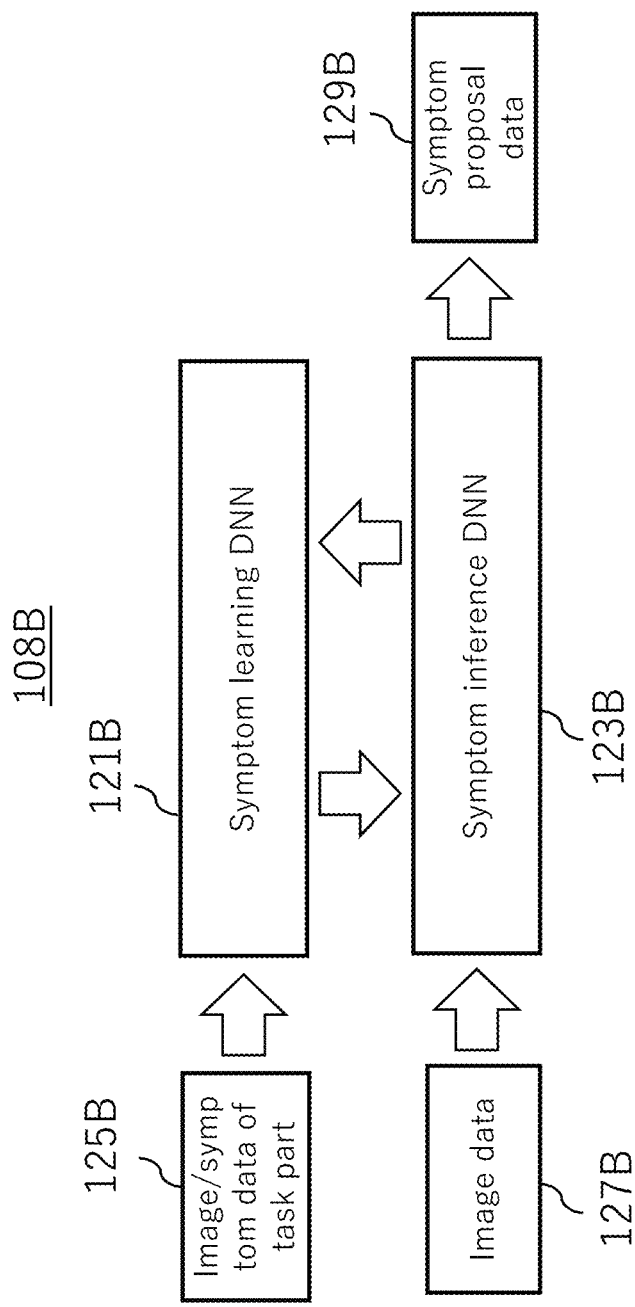
FIG. 22 is a block diagram illustrating an exemplary configuration of a symptom analysis unit.
Figure 23:
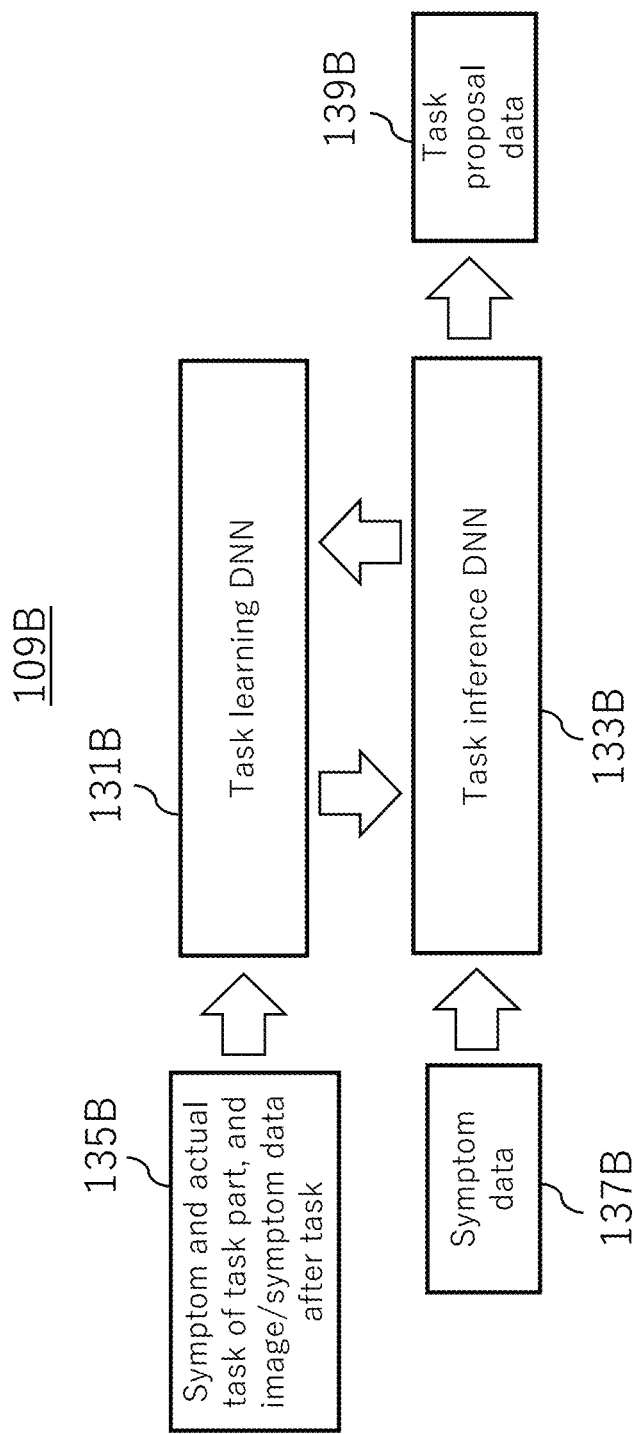
FIG. 23 is a block diagram illustrating an exemplary configuration of a task analysis unit.

FIG. 22 and FIG. 23 illustrate exemplary configurations of the symptom analysis unit 108B and the task analysis unit 109B, respectively.

As illustrated in FIG. 22, the symptom analysis unit 108B includes the following two types of deep neural networks (hereinafter abbreviated as "DNN"). One type of deep neural network is a symptom learning DNN 121B, and the other type of deep neural network is a symptom inference DNN 123B.

The symptom learning DNN 121B inputs, as a large amount of training data 125B, images and symptoms of a large number of task parts, and images, symptoms, and histories (transition records) of actual tasks from the past to the current time, and executes machine learning, for example, deep learning to learn an inference method for inferring the symptom based on an image (that is, create inference neural network).

The symptom inference DNN 123B includes an inference method (that is, inference neural network) created at a certain time point in the past through machine learning by the symptom learning DNN 121B, inputs data of the image and history of each task part into the inference method (inference neural network) to perform inference, and outputs symptom proposal data 129B for the task part.

The symptom learning DNN 121B and the symptom inference DNN 123B may be constructed as different pieces of hardware or different pieces of computer software. In that case, an inference method created by the symptom learning DNN 121B performing a certain amount of learning during a certain period is reproduced in the symptom inference DNN 123B, so that the symptom inference DNN 123B can execute the inference method after that. Such reproduction is repeated at appropriate time intervals, which improves the inference performance of the symptom inference DNN 123B along with elapse of time.

Alternatively, the symptom learning DNN 121B and the symptom inference DNN 123B may be constructed as the same piece of hardware or the same piece of computer software. In that case, the same piece of hardware or computer software can operate as the symptom learning DNN 121B in a certain time band and operate as the symptom inference DNN 123B in a different time band. Through alternate repetition of learning and inference in different time bands, a learning result in a previous time band is repeatedly used for inference in the next time band, which improves the inference performance of the symptom inference DNN 123B along with elapse of time.

As illustrated in FIG. 20, similarly to the symptom analysis unit 108B described above, the task analysis unit 109B also includes two types of DNNs. Those two types of DNNs are a task learning DNN 131B and a task inference DNN 133B.

The task learning DNN 131B inputs, as a large amount of training data 135B, symptoms of a large number of task parts, actual tasks applied thereto, images of task parts photographed again after those actual tasks are performed, and symptoms determined again based on the images, and executes machine learning, for example, deep learning to learn an inference method for inferring, based on a symptom, an actual task to be applied thereto (that is, create inference neural network).

The task inference DNN 133B includes an inference method (that is, inference neural network) created at a certain time point in the past through machine learning by the task learning DNN 131B, inputs the symptom of each task part into the inference method (inference neural network) to perform inference, and outputs task proposal data 139B for the task part.

Being similar to the symptom learning DNN 121B and the symptom inference DNN 123B described above, the task learning DNN 131B and the task inference DNN 133B may be constructed as different pieces of hardware or different pieces of computer software. In that case, an inference method created by the task learning DNN 131 performing a certain amount of learning during a certain period is reproduced in the task inference DNN 133B, so that the task inference DNN 133B can execute the inference method after that. Such reproduction is repeated at appropriate time intervals, which improves the inference performance of the task inference DNN 133B along with elapse of time.

Alternatively, the task learning DNN 131B and the task inference DNN 133B may be constructed as the same piece of hardware or the same piece of computer software. In that case, the same piece of hardware or computer software can operate as the task learning DNN 131B in a certain time band and operate as the task inference DNN 133B in a different time band. Through alternate repetition of learning and inference in different time bands, a learning result in a previous time band is repeatedly used for inference in the next time band, which improves the inference performance of the task inference DNN 133B along with elapse of time.

Figure 24:
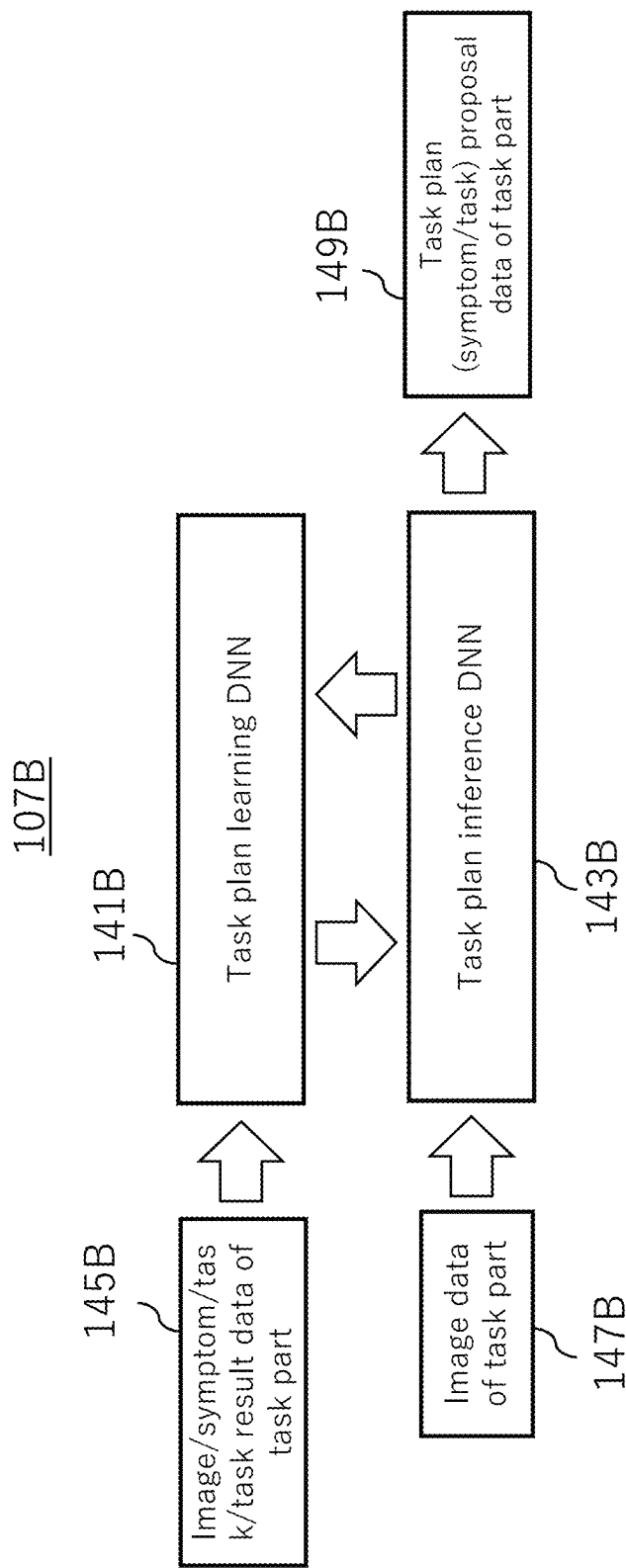
FIG. 24 is a block diagram illustrating another exemplary configuration of the analysis unit.

FIG. 24 illustrates another exemplary configuration of the analysis unit 107B of the data server 101B.

In the exemplary configuration of FIG. 24, the analysis unit 107B can output a task plan proposal for each task part, namely, a symptom proposal and an actual task proposal at the same time without separation. In other words, the analysis unit 107B includes a task plan learning DNN 141B and a task plan inference DNN 143B.

The task plan learning DNN 141B inputs, as a large amount of training data 145B, images and task plans (symptom name and actual task name) of a large number of task parts, images and symptoms of the same task parts after execution of actual tasks based on the task plans, and histories (transition records) of images, symptoms, and actual tasks for the task parts from the past to the current time, and executes machine learning, for example, deep learning to learn an inference method for inferring the task plan based on an image (that is, create inference neural network).

The task plan inference DNN 143B includes an inference method (that is, inference neural network) created at a certain time point in the past through machine learning by the task plan symptom learning DNN 141B, inputs the symptom of each task part into the inference method (inference neural network) to perform inference, and outputs task proposal data 149B for the task part.

The task plan learning DNN 141B and the task plan inference DNN 143B may be constructed as different pieces of hardware or different pieces of computer software, or may be constructed as the same piece of hardware or the same piece of computer software.

Figure 25:
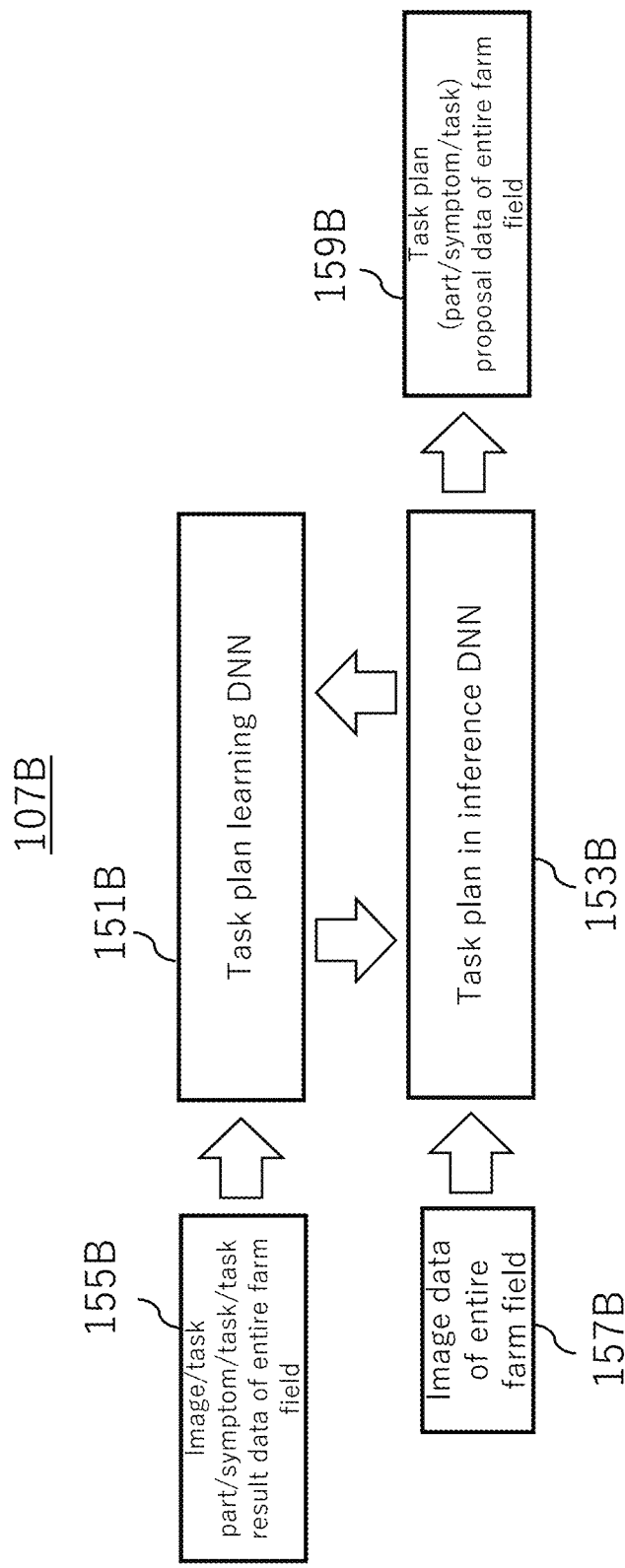
FIG. 25 is a block diagram illustrating still another exemplary configuration of the analysis unit.

FIG. 25 illustrates still another exemplary configuration of the analysis unit 107B.

In the exemplary configuration of FIG. 25, the analysis unit 107B can create and output a task plan proposal not for each task part in a region but for each region (the positions of one or more task parts in the region and the symptom name and actual task name of each task part are included). In other words, the analysis unit 107B includes a task plan learning DNN 151B and a task plan inference DNN 153B.

The task plan learning DNN 151B inputs, as a large amount of training data 155B, entire images of a large number of regions, positions of respective task parts in those images and symptom names and actual task names thereof, entire images, task parts, and symptoms of those regions after execution of actual tasks, and histories (transition records) of entire images, task parts, symptoms, and actual tasks of those regions from the past to the current time, and executes machine learning, for example, deep learning to learn an inference method for inferring the task plan (the position of a task part in a region and the symptom name and actual task name of each task part) based on an entire image of a region (that is, create inference neural network).

The task plan inference DNN 153B includes an inference method (that is, inference neural network) created at a certain time point in the past through machine learning by the task plan symptom learning DNN 151B, inputs the image of a task part in each region into the inference method (inference neural network) to perform inference, and outputs a task plan proposal 159 for the region.

The task plan learning DNN 151B and the task plan inference DNN 153B may be constructed as different pieces of hardware or different pieces of computer software, or may be constructed as the same piece of hardware or the same piece of computer software.

Referring back to FIG. 20, data accumulated in the region image database 61B, the task part database 63B, the region position database 51B, the flight plan database 55B, the task plan database, the task result database 65B, and the task plan proposal database 105B of the data server 101B, and the inference method or inference neural network created by the analysis unit 107B through machine learning can be used for various kinds of beneficial applications other than the application of display on the operation terminal 111 to assist the user. Thus, the data accumulated in those databases and all or any part of the inference neural network can be output to the outside from the data server 101.

The task assistance systems 1B and 100B described above may include a correction system for performing data correction that removes a noise (for example, error from the actual data due to, for example, a color tone or brightness of a picture image that occurs due to an environmental condition such as a weather or time band at the time of photography) contained in data (for example, an image of a region such as a form field obtained by photography of a picture) collected in an investigation by a drone. For example, the task assistance systems 1B and 100B according to the two embodiments described above may include such correction systems in, for example, the data servers 7B and 10B1 or, for example, the operation terminals 9B and 111B, respectively.

The diagnostic assistance system according to the present invention is not limited to a system for assisting in performing tasks of inspection and maintenance of a form field as described above, but can be applied to task assistance systems for other various kinds of applications. For example, the present invention can be applied to assistance of various kinds of tasks such as monitoring or transfer of an object using a drone at a material yard, monitoring or maintenance of the state of a transmission line or a steel tower, or photography of a picture or a video at a district or location desired by the user.

Depending on the application, in addition to a task including two stages of flight, namely, investigation flight and actual task flight of a drone as described above, it is also possible to assist in performing a task including only actual task flight. For example, when a video is planned to be recorded at a certain location, it is possible to assist in performing a similar task such as specification of the location via an operation terminal by the user, creation of a flight plan for photography at the location by the server, downloading of the flight plan and installation of the flight plan into a drone by the user, and performing photography flight by the drone.

Furthermore, depending on the application, it is also possible to assist in performing a task including a larger number of stages of drone flight. For example, in the case of spread of a pesticide in a form field, a system to which the present invention is applied can assist in performing a more complex task by, for example, performing investigation flight (in this case, investigation flight for the entire region may be performed, or investigation flight with focus on a task part may be performed) again to investigate the effect of a pesticide after elapse of a certain period of time since the date of spread of the pesticide, repeating investigation flight and spread of a pesticide periodically, or performing flight for sowing seeds or applying fertilizers.

Furthermore, a part or all of the servers described above may be implemented in an operation terminal used by the user. For example, a software tool for creating a flight plan may be installed into the operation terminal 7, and the user may be able to create a flight plan by himself or herself using the tool, or the tool may automatically create a flight plan.

Furthermore, depending on the type or situation of a task target, the present invention may be applied to assistance of a task using a drone that executes a movement method other than flight such as traveling on the ground, sailing on the water, or cruising underwater.

Figure 26:
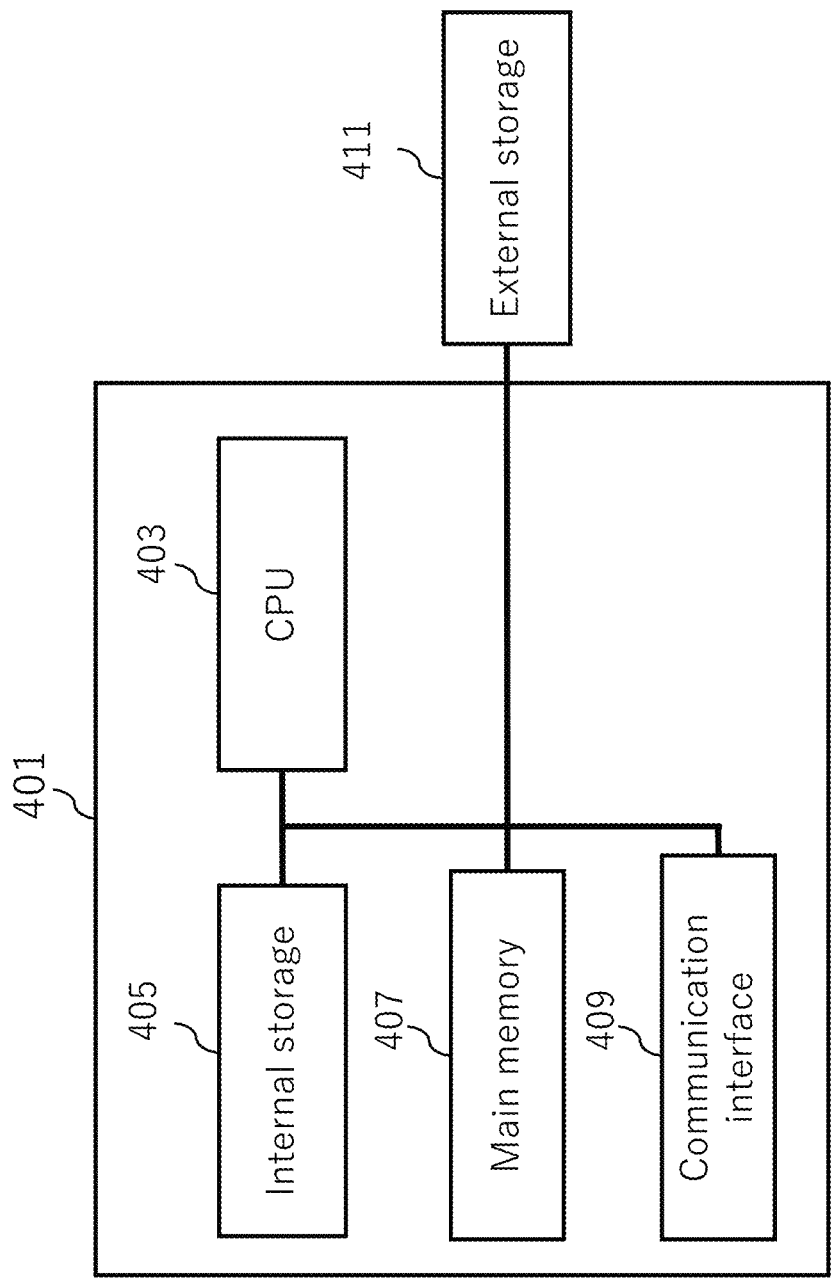
FIG. 26 is a block diagram illustrating an example of a basic configuration of a computer system that can be used as any one of various kinds of servers and terminals.

FIG. 26 illustrates an example of a basic configuration of a computer system that can be used as various kinds of servers and terminals included in the above-mentioned diagnostic assistance system and task assistance system.

As illustrated in FIG. 26, a computer system 401 includes a CPU 403, an internal storage 405, a main memory 407, a communication interface 409, and an external storage 411. The internal storage 405 and the external storage 411 can hold a computer program (that is, a set of a large number of command codes capable of being executed by the CPU 403). The CPU 403 can load the computer program into the main memory 407 from the internal storage 405 or the external storage 411 and execute the computer program, to thereby perform various kinds of functions or operations corresponding to a set of various kinds of command codes of the computer program, for example, functions or operations of various kinds of servers or various kinds of terminals described above. In that process, the CPU 403 can communicate with an external device via the communication interface 409.

Each of various kinds of servers or various kinds of terminals described above can be implemented by using one or a plurality of computer systems having the basic configuration illustrated in FIG. 26.

The description given above is only an example, and does not limit the scope of the present invention to the range of the description given above. The present invention may be implemented in various kinds of other modes without departing from the gist of the present invention.

REFERENCE SIGNS LIST

1 Diagnostic assistance system
3 Supervisor server
5 AI (artificial intelligence) server
7, 9, 11 User terminal
7 Customer terminal
9 Analyst terminal
11 Expert terminal
13 Service terminal
15 User manager
17 User data set
19 Progress manager
21 Progress data set
23 Target data manager
25 Target data set
27 Diagnostic data manager
29 Diagnostic data set
31 Learning control unit
33 Learning model set
35 Training data set
37 Diagnostic model set
39 AI diagnosis control unit
275 Diagnostic controller
1B Task assistance system
3B Investigation drone
5B Actual task drone
7B Data server
9B Operation terminal

The invention claimed is:

1. A diagnostic assistance system for assisting a person in performing diagnosis of an object, the diagnostic assistance system comprising:
target data storage means for storing target data indicating a state of the object;
diagnostic task means for providing each of a first user and a second user with the target data to enable each of the first user and the second user to perform a diagnostic task of the object;
diagnostic result means for receiving a result of diagnosis of the object by each of the first user and the second user;
sharing means for enabling the first user and the second user to share the result of diagnosis by each of the first user and the second user;
an artificial intelligence that learns a diagnostic method by using the result of diagnosis by the first user or the second user to perform automated diagnosis of the object; and
automated diagnosis result provision means for providing the first user with a result of automated diagnosis of the object by the artificial intelligence,
wherein the diagnostic task includes a first sub-task of investigating the target data to input a first diagnostic result and a second sub-task of using the first diagnostic result to input a second diagnostic result,
wherein the diagnostic task means is adapted to enable the second user to perform at least the first sub-task of the diagnostic task, and to enable the first user to perform at least the second sub-task of the diagnostic task, and
wherein the sharing means is adapted to enable the first user and the second user to share the first diagnostic result obtained by the second user.

2. The diagnostic assistance system according to claim 1,
wherein the first user is a customer who requests or requires diagnosis of the object, and
wherein the second user is an analyst who performs preliminary diagnosis of the object prior to the customer.

3. The diagnostic assistance system according to claim 1,
wherein the diagnostic assistance system is capable of communicating with a plurality of the second users,
wherein the object includes a plurality of different parts,
wherein the target data includes a plurality of part data records representing respective states of the different parts of the object, and
wherein the diagnostic task means distributes the plurality of part data records to the plurality of second users to enable the plurality of second users to perform diagnostic tasks for the different parts of the object in a shared manner.

4. The diagnostic assistance system according to claim 3, further comprising third progress notification means for providing each of the plurality of second users with progress information on whether the diagnostic task has already been performed for each of the different parts of the object.

5. The diagnostic assistance system according to claim 3, further comprising fourth progress notification means for providing the first user with progress information on whether the diagnostic task has already been performed for each of the different parts of the object.

6. The diagnostic assistance system according to claim 1,
wherein the diagnostic task means provides not only the first user and the second user but also a third user with the target data to enable each of the first user, the second user, and the third user to perform a diagnostic task of the object,
wherein the diagnostic result means receives a result of diagnosis of the object by each of the first user, the second user, and the third user,
wherein the sharing means enables the first user, the second user, and the third user to share the result of diagnosis by each of the first user, the second user, and the third user, and
wherein the artificial intelligence learns the diagnostic method by using the results of diagnosis by the first user, the second user, and the third user.

7. The diagnostic assistance system according to claim 6, wherein the third user is an expert who assists the first user in a case in which the first user has a difficulty in performing diagnosis.

8. The diagnostic assistance system according to claim 1, further comprising:
operation terminal communication means for communicating with one or more communication terminals capable of communicating with a drone;
geographic region storage means for storing a position of a geographic region of the object;
movement plan creation means for creating, based on the position of the geographic region, a movement plan for controlling the drone such that the drone acquires the target data while moving in the geographic region;
movement plan storage means for storing the movement plan;
movement plan provision means for providing at least one of the communication terminals with the movement plan to enable the at least one of the communication terminals to input the movement plan to the drone; and
target data acquisition means for acquiring the target data acquired by the drone.

9. The diagnostic assistance system according to claim 1,
wherein the first sub-task is to investigate the target data to find an abnormal site in the object, and to input the found abnormal site as the first diagnostic result, and
wherein the second sub-task is to identify an abnormality name or measure for the abnormal site found in the first sub-task.

10. The diagnostic assistance system according to claim 1, wherein the sharing means is adapted to enable the first user and the second user to share the second diagnostic result obtained by the first user.

11. The diagnostic assistance system according to claim 1, further comprising first progress notification means for providing the first user with progress information on whether the first sub-task has already been performed for the object.

12. The diagnostic assistance system according to claim 1, further comprising second progress notification means for providing the second user with progress information on whether the first sub-task has already been performed for the object.

13. The diagnostic assistance system according to claim 12, wherein the diagnostic task means provides the first user with a plurality of part data records, and enable the first user to perform diagnostic tasks for different parts of the object.

14. A diagnostic assistance system for assisting a person in performing diagnosis of an object, the diagnostic assistance system comprising:
one or more CPUs;
one or more storages; and
a computer program stored in the one or more storages,
wherein the CPU executes the computer program to execute:
preparing target data indicating a state of the object;
providing each of a first user and a second user with the target data, and enabling each of the first user and the second user to perform a diagnostic task of the object;
receiving a result of diagnosis of the object by each of the first user and the second user;
enabling the first user and the second user to share the result of diagnosis by each of the first user and the second user;
learning a diagnostic method by using the result of diagnosis by the first user or the second user;
performing automated diagnosis of the object by using the learned diagnostic method; and
providing the first user with the automated diagnosis result, and
wherein the diagnostic task includes a first sub-task of investigating the target data to input a first diagnostic result and a second sub-task of using the first diagnostic result to input a second diagnostic result,
wherein the second user is enabled to perform at least the first sub-task of the diagnostic task, and to enable the first user to perform at least the second sub-task of the diagnostic task, and
wherein the first user and the second user are enabled to share the first diagnostic result obtained by the second user.

15. The diagnostic assistance system according to claim 14, wherein the first user is a customer who requests or requires diagnosis of the object, and wherein the second user is an analyst who performs preliminary diagnosis of the object prior to the customer.

16. The diagnostic assistance system according to claim 14, wherein the first sub-task is to investigate the target data to find an abnormal site in the object, and to input the found abnormal site as the first diagnostic result, and
wherein the second sub-task is to identify an abnormality name or measure for the abnormal site found in the first sub-task.

17. The diagnostic assistance system according to claim 14, wherein the CPU executes the computer program to enable the first user and the second user to share the second diagnostic result obtained by the first user.

18. The diagnostic assistance system according to claim 14, wherein the CPU executes the computer program to provide the first user with progress information on whether the first sub-task has already been performed for the object.

19. The diagnostic assistance system according to claim 14, wherein the CPU executes the computer program to provide the second user with progress information on whether the first sub-task has already been performed for the object.

20. The diagnostic assistance system according to claim 19, wherein the CPU executes the computer program to provide the first user with a plurality of part data records, and enable the first user to perform diagnostic tasks for different parts of the object.

21. The diagnostic assistance system according to claim 14, wherein the diagnostic assistance system is capable of communicating with a plurality of the second users, wherein the object includes a plurality of different parts,
wherein the target data includes a plurality of part data records representing respective states of the different parts of the object, and
wherein the CPU executes the computer program to distribute the plurality of part data records to the plurality of second users to enable the plurality of second users to perform diagnostic tasks for the different parts of the object in a shared manner.

22. The diagnostic assistance system according to claim 21, wherein the CPU executes the computer program to provide each of the plurality of second users with progress information on whether the diagnostic task has already been performed for each of the different parts of the object.

23. The diagnostic assistance system according to claim 21, wherein the CPU executes the computer program to provide the first user with progress information on whether the diagnostic task has already been performed for each of the different parts of the object.

24. The diagnostic assistance system according to claim 14, wherein the CPU executes the computer program to:
provide not only the first user and the second user but also a third user with the target data to enable each of the first user, the second user, and the third user to perform a diagnostic task of the object;
receive a result of diagnosis of the object by each of the first user, the second user, and the third user; and
enable the first user, the second user, and the third user to share the result of diagnosis by each of the first user, the second user, and the third user, and
wherein the diagnostic method is learned by using the results of diagnosis by the first user, the second user, and the third user.

25. The diagnostic assistance system according to claim 24, wherein the third user is an expert who assists the first user in a case in which the first user has a difficulty in performing diagnosis.

26. The diagnostic assistance system according to claim 14, wherein the CPU executes the computer program to:
communicate with one or more communication terminals capable of communicating with a drone;
store a position of a geographic region of the object;
create, based on the position of the geographic region, a movement plan for controlling the drone such that the drone acquires the target data while moving in the geographic region;
store the movement plan;
provide at least one of the communication terminals with the movement plan to enable the at least one of the communication terminals to input the movement plan to the drone; and
acquire the target data acquired by the drone.

27. A diagnostic assistance system for assisting a person in performing diagnosis of an object, the diagnostic assistance system comprising:
target data storage means for storing target data indicating a state of the object;
sample data selection means for selecting, from the target data, sample data indicating a state of a sample part being a part of the object;
sample data transmission means for transmitting the sample data to one or more users, and enabling the one or more users to perform first manual diagnosis being diagnosis of the sample data;
first manual diagnosis result reception means for receiving a result of the first manual diagnosis from the one or more users;
diagnostic method calculation means for calculating a diagnostic method for automatically diagnosing the object by using the result of the first manual diagnosis;
automated diagnosis means for applying the diagnostic method to the target data to automatically diagnose all of the object or a part wider than the sample part;
automated diagnosis result transmission means for transmitting a result of the automated diagnosis to the one or more users to enable the one or more users to be satisfied with the result of the automated diagnosis or to perform second manual diagnosis of finding an unsatisfactory part from at least a part of the result of the automated diagnosis and correcting the unsatisfactory part; and
second manual diagnosis result reception means for receiving a result of the second manual diagnosis from the one or more users,
wherein, when a result of correcting the unsatisfactory part is included in the result of the second manual diagnosis, the diagnostic method calculation means is adapted to recalculate the diagnostic method by using the result of correcting the unsatisfactory part,
wherein the automated diagnosis means performs the automated diagnosis again by using the recalculated diagnostic method, and
wherein the automated diagnosis result transmission means transmits the result of automated diagnosis performed again to the one or more users.

28. The diagnostic assistance system according to claim 27,
wherein the one or more users include a first user and a second user, wherein the diagnostic assistance system enables the first user to perform the first manual diagnosis, and wherein the diagnostic assistance system enables the second user to perform the second manual diagnosis.

29. The diagnostic assistance system according to claim 27, further comprising:

an artificial intelligence that learns a second diagnostic method by using the result of the second manual diagnosis to perform second automated diagnosis of the object by using the learned second diagnostic method; and automated diagnosis result provision means for providing the one or more users with a result of the second automated diagnosis by the artificial intelligence.

30. The diagnostic assistance system according to claim 27, further comprising:

data grouping means for classifying a plurality of pieces of part data included in the object data into one or more data groups based on a characteristic of each of the plurality of pieces of part data, wherein the diagnostic method calculation means calculates the one or more diagnostic methods associated with each of the one or more data groups, and wherein the automated diagnosis means is adapted to perform automated diagnosis for each of the one or more data groups by using the one or more diagnostic methods associated with each of the one or more data groups.

31. The diagnostic assistance system according to claim 27, further comprising:

operation terminal communication means for communicating with one or more communication terminals capable of communicating with a drone;

geographic region storage means for storing a position of a geographic region of the object;

movement plan creation means for creating, based on the position of the geographic region, a movement plan for controlling the drone such that the drone acquires the target data while moving in the geographic region;

movement plan storage means for storing the movement plan;

movement plan provision means for providing at least one of the communication terminals with the movement plan to enable the at least one of the communication terminals to input the movement plan to the drone; and target data acquisition means for acquiring the target data acquired by the drone.

32. A diagnostic assistance system for assisting a person in performing diagnosis of an object, the diagnostic assistance system comprising:

one or more CPUs;

one or more storages; and a computer program stored in the one or more storages, wherein the CPU executes the computer program to execute the following processing of:

storing target data indicating a state of the object;

selecting, from the target data, sample data indicating a state of a sample part being a part of the object;

transmitting the sample data to one or more users to enable the one or more users to perform first manual diagnosis being diagnosis of the sample data;

receiving a result of the first manual diagnosis from the one or more users;

calculating a diagnostic method for automatically diagnosing the object by using the result of the first manual diagnosis;

applying the diagnostic method to the target data to automatically diagnose all of the object or a part wider than the sample part;

transmitting a result of the automated diagnosis to the one or more users to enable the one or more users to be satisfied with the result of the automated diagnosis or to perform second manual diagnosis of finding an unsatisfactory part from at least a part of the result of the automated diagnosis and correcting the unsatisfactory part;

receiving a result of the second manual diagnosis from the one or more users;

recalculating, when a result of correcting the unsatisfactory part is included in the result of the second manual diagnosis, the diagnostic method by using the result of correcting the unsatisfactory part;

performing the automated diagnosis again by using the recalculated diagnostic method, and transmitting the result of automated diagnosis performed again to the one or more users.

* * * * *